United States Patent [19]
Kamada et al.

[11] Patent Number: 5,785,628
[45] Date of Patent: Jul. 28, 1998

[54] AUTOMATIC TRANSMISSION CONTROL SYSTEM

[75] Inventors: Shinya Kamada; Kenji Sawa; Hiroshi Shinozuka, all of Hiroshima; Tomoo Sawazaki, Higashihiroshima; Koichi Yamamoto, Hiroshima; Kazushi Kurokawa, Hiroshima; Takamichi Teraoka, Hiroshima; Masakazu Hombo, Hiroshima; Naotaka Hirami, Hiroshima; Yasunori Kanda, Higashihiroshima; Akinobu Aoki, Higashihiroshima; Tatsuhiko Iwasaki, Hiroshiman; Takeyoshi Kawa, Hiroshima, all of Japan

[73] Assignee: Mazda Motor Corporation, Hiroshima-ken, Japan

[21] Appl. No.: 594,836

[22] Filed: Jan. 30, 1996

[30] Foreign Application Priority Data

| Jan. 31, 1995 | [JP] | Japan | 7-036256 |
| Mar. 7, 1995 | [JP] | Japan | 7-047267 |
| Mar. 31, 1995 | [JP] | Japan | 7-100005 |
| Dec. 29, 1995 | [JP] | Japan | 7-354276 |

[51] Int. Cl.$^6$ .................................................. F16H 61/00
[52] U.S. Cl. .......................... 477/130; 477/143; 477/155
[58] Field of Search ............................ 477/62, 64, 86, 477/130, 131, 143, 144, 155, 156, 158

[56] References Cited

U.S. PATENT DOCUMENTS

| 4,791,568 | 12/1988 | Hiramatsu et al. | 477/146 X |
| 4,944,200 | 7/1990 | Benford et al. | 477/155 |
| 5,003,842 | 4/1991 | Hatta et al. | 477/155 X |
| 5,027,676 | 7/1991 | Fujiwara et al. | 477/156 X |
| 5,109,734 | 5/1992 | Fujiwara | 477/143 X |
| 5,507,706 | 4/1996 | Jang et al. | 477/156 X |

FOREIGN PATENT DOCUMENTS

| 4429129 | 2/1995 | Germany . |
| 62-61838 | 3/1987 | Japan . |
| 62-75162 | 4/1987 | Japan . |
| 2138562 | 5/1990 | Japan . |
| 2278076 | 11/1990 | Japan . |
| 621643 | 3/1994 | Japan . |
| 2222644 | 3/1990 | United Kingdom . |
| 2276425 | 9/1994 | United Kingdom . |

*Primary Examiner*—Khoi Q. Ta
*Attorney, Agent, or Firm*—Sixbey, Friedman, Leedom & Ferguson; Gerald J. Ferguson, Jr.; Donald R. Studebaker

[57] ABSTRACT

A control system for an automatic transmission having friction coupling elements, at least one of which is locked in 3rd and 4th gears and unlocked in 1st and 2nd gears, includes a first shift valve shiftable between 3rd and 4th gears, and second shift valve shiftable between in 2nd gear and 1st gear in which engine brake available, and a solenoid valve providing control pressure which is selectively directed to these shift valves and cause them to shift so as to lock or unlock the friction coupling elements.

25 Claims, 55 Drawing Sheets

Fig. 19 4TH GEAR

Fig. 20 1ST GEAR (L RANGE)

REVERSE GEAR

REVERSE GEAR (FAIL SAFE)

Fig. 23 2ND GEAR (LOCK-UP)

AUTOMATIC TRANSMISSION CONTROL SYSTEM

BACKGROUND OF THE INVENTION

1. Field of the Invention

The present invention relates to an automatic transmission control system, and, more particularly, to a hydraulic control system, for an automatic transmission, having a switching means which provides selective pressure transfer to and from friction coupling elements according to control pressure applied thereto.

2. Description of Related Art

Typically, an automatic transmission for an automobile has a torque converter and a transmission gear mechanism operationally coupled to and driven by the torque converter. Such a transmission gear mechanism includes a plurality of friction coupling elements, such as clutches and brakes, which in turn are selectively coupled or locked and released or unlocked so as thereby to place automatically the automatic transmission into desired gears according to driving conditions. Selectively locking and unlocking those friction coupling elements is performed by means of a hydraulic pressure control system. A number of torque converters are equipped with a locking feature. A locking unit, i.e. a lock-up clutch, mechanically locks its input and output shafts, such as, for instance, an engine output shaft and a turbine shaft when activated to prevent slippage allowed even at cruising speeds due to that the only connection between pump and turbine is transmission fluid. A lock-up condition is allowed in driving conditions in which there is not so strong demand for torque multiplication or torque reduction. Locking and unlocking the lock-up clutch are governed by means of the hydraulic pressure control system as well as locking and unlocking the friction coupling elements.

As is well known in the art, the hydraulic pressure control system is provided with various valves, such as, for instance, a pressure regulator valve for regulating pressure discharged from an oil pump to a fixed level, a manually operated shift valve for manually placing the automatic transmission into desired ranges, and a plurality of shift valves, which are selectively operated to control pressure transfer, including pressure supply to and pressure discharge from the frictional coupling elements so as to lock and unlock the frictional coupling elements, thereby shifting the automatic transmission into selected gears. In order for those shift valves to timely operate or timely shift their spools between two operative positions, the hydraulic pressure control system is typically provided with a timing means, by means of which control pressure is timely and independently supplied to the shift valves. In many instances where the control pressure is differed in order for the shift valves to shift the spool positions, a control pressure transfer means must be installed one for each shift valve, which is always undesirable for the hydraulic pressure control system in the light of space and cost efficiency.

In an automatic transmission control system equipped with a down-shift timing valve for controlling a down-shift timing and an engine brake control valve for causing a specific friction coupling element which makes engine brake available in a specific gear, an approach to eliminate those problems is that described in Japanese Unexamined Patent Publication No. 62(1987)-61838. Means used in the Japanese Unexamined Patent Publication No. 62-61838 is a shuttle valve installed between the control pressure transfer means and those down-shift timing valve and engine brake control valve. The shuttle valve is able to change its spool position according to engine load proportional pressure and operates as a control pressure transfer means commonly to engine brake control and down-shift timing control.

Another approach is to utilize a single control pressure transfer means which bears the function of supplying control pressure commonly to a plurality of shift valves, such as a 3-2 down-shift timing control valve and a low-clutch timing control valve, which are differed in operation timing. The control pressure transfer means operates to control selectively and directly the shift valves at desired timings. Such a hydraulic pressure control system is known from, for instance, Japanese Unexamined Patent Publication No. 2(1989)-138562.

Further, Japanese Unexamined Patent Publication No. 2(1989)-278076 has proposed a hydraulic pressure control system making utilization of a single control pressure transfer means which provides control pressure which effects selectively control of an engine brake clutch for making engine brake available in some specific gears and a lock-up clutch according to manually selected ranges.

Some automatic transmissions controlled by means of hydraulic pressure control system of these kinds include a friction coupling element, as one of elements necessary for providing forward gears, which is differed in operation between for high speed gears and for low speed gears. In such an automatic transmission, there is installed in the hydraulic pressure control system valves which are selectively operated to provide high speed gears and low speed gears, respectively. For example, what is called a 3-4 clutch is installed in a four forward gear automatic transmission, which is locked in a high speed gear such as a third gear and a fourth gear and unlocked in a low speed gear such as a first gear and a second gear. This type of automatic transmission typically has a switch valve operative between the third gear and fourth gear and a switch valve operative between the second gear and first gear in which engine brake is available.

While the automatic transmissions controlled by these types of hydraulic pressure control systems have various advantages, nevertheless, various constraints must be imposed on mechanical structures, which are always undesirable for simplified and inexpensive hydraulic pressure control systems.

SUMMARY OF THE INVENTION

It is an object of the present invention to provide a hydraulic pressure control system for an automatic transmission of the type having a friction coupling element differed in operation between different speed ranges, such as a range covering high speed gears and a range covering low speed gears, in which only one control pressure transmission means is made of common utilization for connecting and disconnecting transmission of control pressure to switching valves used in the different speed ranges, respectively.

The foregoing object of the present invention is accomplished by providing a hydraulic pressure control system for an automatic transmission of a type having a plurality of friction coupling elements, such as clutches and brakes which in turn are selectively locked and unlocked so as to provide for the automatic transmission desired gears, including, for instance, first and second gears for a low speed gear range and at least third and fourth gears for a high speed gear range, a specific one of the friction coupling elements being operated only in the high speed gear range. The hydraulic pressure control system includes first and second switching means, each of these switching means being able to operate in two operative conditions in which transmission of operating pressure is connected to and disconnected from the related friction coupling element, respectively, and a control pressure developing means, such as a solenoid valve, which develops or provides control pressure with which each switching means is caused to switch over from one operative condition to another operative condition. The hydraulic pressure control system further includes a pressure connecting means which selectively connects transmission of the control pressure to the first and second switching means according to and during supply of the operating pressure to the specific friction coupling element. In a four forward speed automatic transmission, the specific friction coupling elements may comprise a 3-4 clutch, at least which is locked in third and fourth gears of the high speed gear range and is unlocked in first and second gears of the low speed gear range. In this instance, the first switching means connects and disconnects transmission of the operating pressure to one of the friction coupling elements, which is locked in the second and fourth gears and is unlocked in the first and third gears, such as a 2-4 brake of a type having a brake apply pressure chamber and a brake release pressure chamber. The 2-4 brake is locked in the second gear and fourth gear when the operating pressure is supplied to the brake apply pressure chamber only, and is unlocked in the first gear and third gear when the operating pressure is released from both the brake apply pressure chamber and brake release pressure chamber, when the operating pressure is supplied to both brake apply pressure chamber and brake release pressure chamber, and when the operating pressure is supplied to the brake release pressure chamber only. Alternatively, the one of the friction coupling elements may comprise a lock-up clutch for mechanically coupling input and output shafts of a torque converter together. Further, the second switching means connects and disconnects transmission of the operating pressure to another one of the friction coupling elements which is locked in the second and fourth gears and is unlocked in the first and third gears, such as a low-reverse brake locked in at least the first gear in which engine brake is available.

According to another aspect of the present invention, in the hydraulic pressure control system for an automatic transmission having a plurality of friction coupling elements, of which a second friction coupling element is controlled to lock while a first friction coupling element is locked and a third friction coupling element is controlled to lock while the first friction coupling element is unlocked, in addition to first to third operating pressure supply means for supplying the operating pressure to the first to third friction coupling elements, respectively, there are installed first and second switching means, a control pressure providing means and a pressure connecting means. The first switching means switches over between two operative conditions, in one of which transmission of the operating pressure is connected to the second friction coupling element, and in another of which transmission of the operating pressure is disconnected from the second friction coupling element. Similarly, the second switching means switches over between two operative conditions, in one of which transmission of the operating pressure is connected to the third friction coupling element, and in another of which transmission of the operating pressure is disconnected from the third friction coupling element. The pressure connecting means selectively connects transmission of the control pressure to the first switching means and second switching means according to and during supply of the operating pressure to the first friction coupling element. With the control pressure, each of the second friction coupling element and third friction coupling element is forced to switch over from one operative condition to another. The control pressure providing means may comprises a solenoid valve for transmits the control pressure developed or provided as a specified level of source pressure. The pressure connecting means may comprises a shift valve having a spool shiftable between two operative positions according to which the pressure connecting means selectively connects and disconnects transmission of the control pressure to the first switching means and second switching means, and a return spring for forcing the spool to one operative positions. Exerted on the spool is the operating pressure supplied to the first friction coupling means which serves against the return spring to force the spool to another operative position. The second switching means may comprise a means for providing connection and disconnection of sub-control pressure according to the control pressure and a means for causing the second switching means to selectively connect and disconnect transmission of the operating pressure to the third friction coupling element according to the sub-control pressure.

These second and third friction coupling elements are operated in at least a high speed gear range and at least a low speed gear range, respectively. More specifically, when the first friction coupling element is a 3-4 clutch, at least which is locked in the third and fourth gears for the high speed gear range and unlocked in the first and second gears for the low speed gear range, the second friction coupling element may comprise a 2-4 brake, at least which is locked in the second gear and fourth gear and unlocked in the first gear and third gear, and the third friction coupling element may comprise a low-reverse brake, which is locked in at least the first gear in which engine brake is available.

Alternatively, when the first friction coupling element employs the 3-4 clutch, the second friction coupling element may comprise a lock-up clutch for mechanically coupling a torque converter incorporated in the automatic transmission, and the third friction coupling element may comprise a low-reverse brake which is locked in at least the first gear in which engine brake is available.

The hydraulic pressure control system may further comprise a means for providing sub-control pressure and a means such as comprising a shift valve having a spool shiftable between two operative positions where providing connection and disconnection of transmission of the sub-control pressure, respectively and a return spring for forcing the spool to one operative position. The spool is applied with the operating pressure to the first friction coupling means so as thereby to shift to another operative position against said return spring. Specifically, in the case where each of the first and second switching means, which may comprise a solenoid valve having a spool shiftable between two operative positions and a return spring, the sub-control pressure switching means provides connection of transmission of the sub-control pressure on one operative position while transmission of the operating pressure to the 3-4 clutch is disconnected and withdraws transmission of the sub-control pressure in another operative position while said operating pressure is supplied to said 3-4 clutch while transmission of said operating pressure is connected. Further, the pressure connecting means connects transmission of the control pressure to the second switching means so as to cause it to switch over to the one operative position where the second switching means connects transmission of the operating pressure to the low-reverse brake while the sub-control pressure switching means is in the one operative position and connects transmission of the control pressure to the first switching means so as to cause it to switch over to the one operative condition where the second switching means connects transmission of the operating pressure to the lock-up clutch while the sub-control pressure switching means is in the other operative position.

According to still another aspect of the present invention, the hydraulic pressure control system for an automatic transmission of the type having a plurality of friction coupling elements selectively locked and unlocked with operating pressure for changing transmission paths for transmitting driving power from a power source, which include at least a first friction coupling element, a second friction coupling element which is controlled to lock while the first friction coupling element is locked, a third friction coupling element which is controlled to lock while the first friction coupling element is unlocked, and a fourth friction coupling means which is controlled to lock while the first friction coupling element is locked and the third friction coupling element is unlocked. The control system includes first to fourth operating pressure supply means, each supplying operating pressure to a related first friction coupling element, a first control pressure providing means for providing first control pressure with which one of the second to fourth friction coupling element is controlled to lock, a second control pressure providing means for providing second control pressure with which one of the third and fourth friction coupling elements are controlled to lock, first to third switching means for switching over between their two operative conditions of operating pressure transmission to the second to fourth friction coupling elements, respectively, according to the first and second control pressure, a first control pressure connecting means for selectively connecting transmission of the second control pressure to the second and third switching means, and a second control pressure connecting means for connecting transmission of the first control pressure selectively to the first control pressure connecting means and first switching means according to the operating pressure to the first friction coupling element. The first control pressure connecting means connects transmission of the second control pressure selectively to the second and third switching means when the second control pressure connecting means connects transmission of the first control pressure to the first control pressure connecting means.

In the cases where the first to fourth friction coupling elements are, respectively a 3-4 clutch which is locked in the high speed gear range and unlocked in the low speed gear range, a 2-4 brake which is locked in the second and fourth gear and unlocked in the first gear and third gear, a low-reverse brake which is locked in the first gear in which engine brake is available, and a lock-up clutch for mechanically coupling a torque converter, each of the first to third switching means may comprise a shift valve having a spool shiftable between two operative positions where transmission of the operating pressure is connected and disconnected, selectively, and a return spring for forcing the spool to one operative position. The spool is applied with the control pressure so as thereby to shift to another operative position against the return spring. Further, the second control pressure connecting means connects transmission of the first control pressure to the first control pressure connecting means while the first operating pressure supply means does not supply the operating pressure to the 3-4 clutch and connects the first control pressure to the first switching means while supplying the operating pressure to the 3-4 clutch. On the other hand, the first control pressure connecting means connects transmission of the second control pressure to the second switching means so as to cause it to provide one operative condition where transmission of the operating pressure is connected to the low-reverse brake while the second control pressure connecting means connects transmission of the first control pressure to the first control pressure connecting means, and connects the second control pressure to the third switching means so as to cause it to provides one operative condition where the operating pressure transmission is connected to the lock-up clutch while disconnecting the first control pressure transmission to the first control pressure connecting means.

With the hydraulic pressure control system of the present invention, the means for providing the control pressure, such as a solenoid valve, cooperates selectively with the first and second switching means through connection and disconnection of transmission of the control pressure by the pressure connecting means according to whether a gear shift is intended to a high speed gear or a low speed gear. That is, the control pressure is common to the first and second switching means and timely supplied to each switching means in response to operative conditions of the first or specific friction coupling element. Specifically, the control pressure developing or providing means is used to cause, on one hand, the 2-4 brake to operate in the high speed gear range and, on the other hand, to cause the low-reverse brake to operate in the low speed gear range. Otherwise, the control pressure developing or providing means is used to cause, on one hand, the lock-up clutch to operate in the high speed gear range and, on the other hand, to cause the low-reverse brake to operate in the low speed gear range.

The utilization is made of a single control pressure developing or providing means common to two switching means, or two friction coupling elements, which do in no way experience coincidental activation, resulting in simplified and inexpensive hydraulic pressure control systems.

Further the utilization is made of two control pressure developing or providing means common to three switching means, or three friction coupling elements, also resulting in simplified and inexpensive hydraulic pressure control systems.

BRIEF DESCRIPTION OF THE DRAWINGS

The above and other objects and features of the present invention will be clearly understood from the following description with respect to a preferred embodiment thereof when considered in conjunction with the accompanying drawings, wherein same reference numerals has been used throughout the drawings to denote the same or similar elements, and in which.

DETAILED DESCRIPTION OF THE PREFERRED EMBODIMENTS

It is to be noted that the term "left end" position used in the following description shall means and refer to one of operative positions of a valve as viewed throughout in figures which a valve spool occupies and the term "right end" position used in the following description shall means and refer to another one of the operative positions of the valve as viewed throughout in figures which the valve spool occupies.

Figure 1:
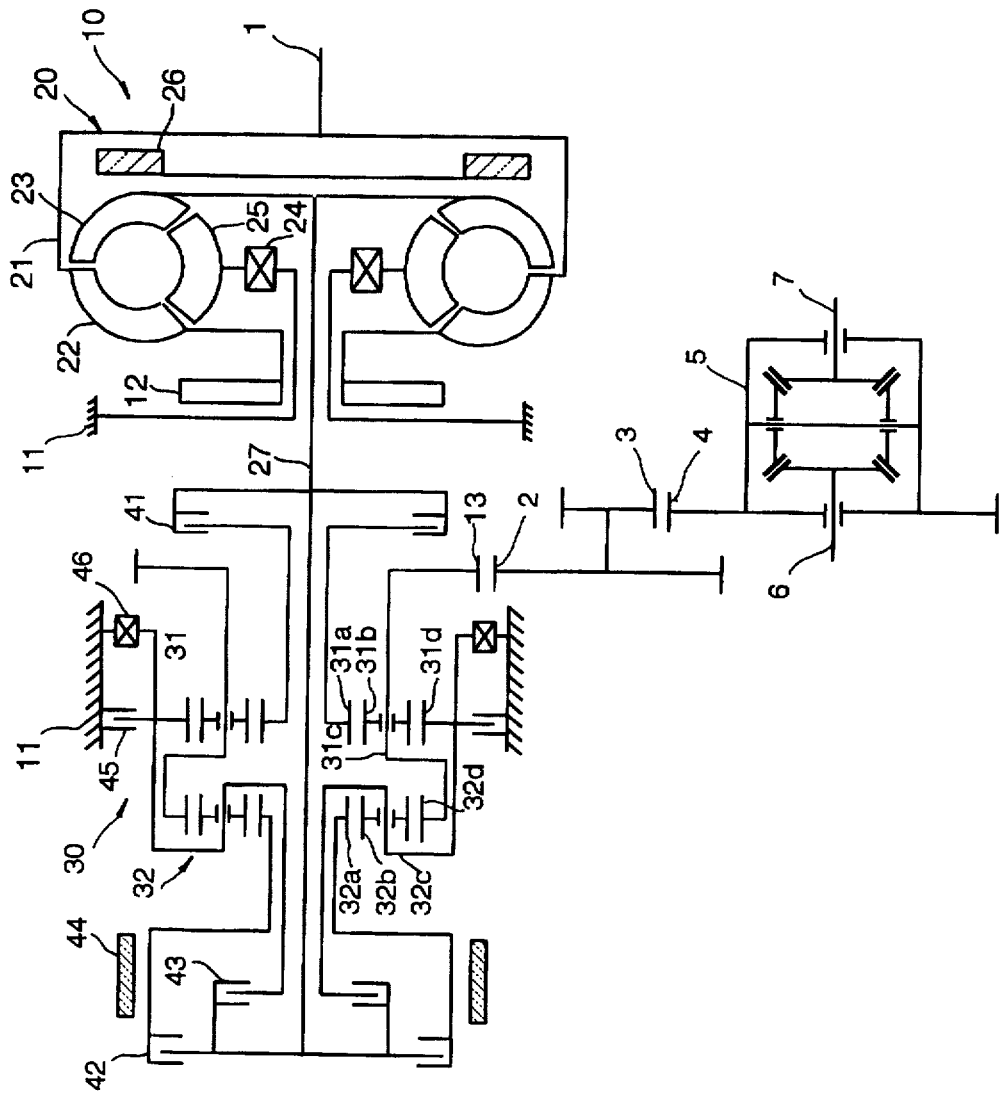
FIG. 1 is a schematic illustration of an automatic transmission incorporating a hydraulic control system of the present invention.
Figure 2:
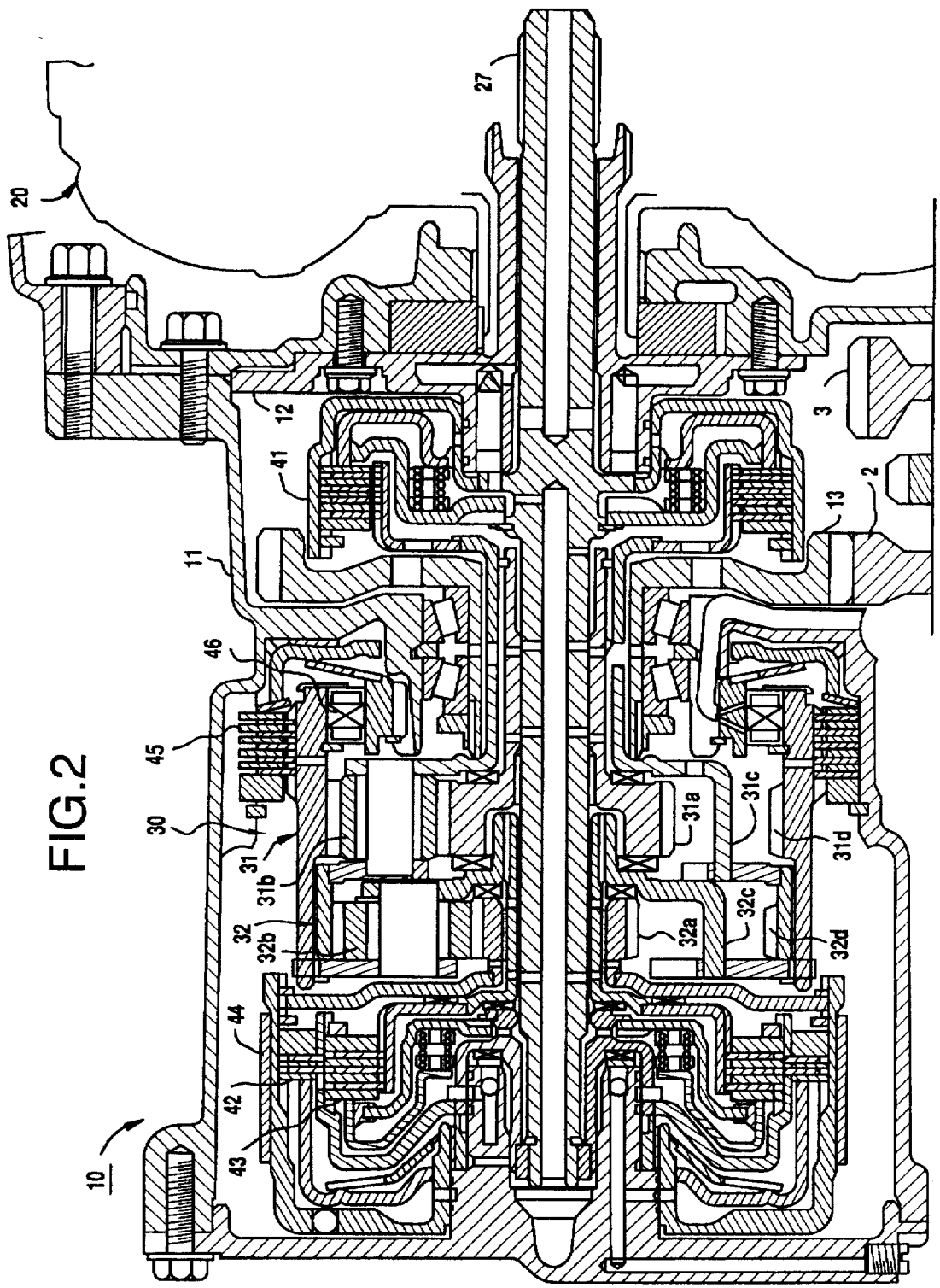
FIG. 2 is a cross-sectional view of the automatic transmission shown in FIG. 1.

Referring to the drawings in detail, in particular to FIGS. 1 and 2 showing an overall structure of an automatic transmission equipped with a torque converter which incorporates a hydraulic control system in accordance with a preferred embodiment of the present invention, an automatic transmission 10 has a mechanical configuration including, as main components, a torque converter 20, a transmission gear mechanism 30 driven by means of the torque converter 20, and a plurality of friction coupling elements 41–45, such as clutches and brakes, and a one-way clutch 46 which are selectively coupled and uncoupled by the hydraulic control system to change power transmission paths of the transmission gear mechanism 30 so as to place the automatic transmission into desired gears and ranges, namely first (1) to fourth (4) forward gears in a drive (D) range, a second speed (S) range and a low speed (L) range, and a reverse gear in a reverse (R) range.

The torque converter 20 has a pump 22, a turbine 23 and a stator 25. The pump 22 is placed within and secured to an transmission housing 11 secured to an engine output shaft 1. The turbine 23 is placed facing the pump 22 within the transmission housing 11 and driven by the pump 22 by means of a special lightweight oil. The stator 25 is inserted between the pump 22 and turbine 23 and mounted on the transmission housing 11 through a one-way clutch 24 so as to multiply engine torque. The torque converter 20 further has a lock-up clutch 26 placed between a converter housing 21 and turbine 23 for mechanically coupling the engine shaft 1 and the turbine 23 together when it is activated. The torque converter 20 thus structured connects transmission of turbine rotation to the transmission gear mechanism 30 through a turbine shaft 27. Behind the torque converter 20, i.e. on one side of the torque converter 20 opposite to the engine 1, there is provided an oil pump 12 driven by the engine output shaft 1 through the housing 21 of the torque converter 20.

The transmission gear mechanism 30 comprises a first planetary gearset 31 and a second planetary gearset 32. The first planetary gearset 31 is comprised of a sun gear 31a, a plurality of pinion gears 31b in mesh with the sun gear 31a, a pinion carrier 31c for carrying the pinion gears 31b, and a ring gear 31d in mesh with the pinion gears 31b. Similarly, the second planetary gearset 32 is comprised of a sun gear 32a, a plurality of pinion gears 32b in mesh with the sun gear 32a, a pinion carrier 32c for carrying the pinion gears 32b, and a ring gear 32d in mesh with the pinion gears 32b. The automatic transmission includes a forward clutch (FWD) 41 disposed between the turbine shaft 27 and the sun gear 31a of the first planetary gearset 31, a reverse clutch (REV) 42 disposed between the turbine shaft 27 and the sun gear 32a of the second planetary gearset 32, a 3-4 clutch (3-4C) 43 disposed between the turbine shaft 27 and the pinion carrier 32c of the second planetary gearset 30, and a 2-4 brake (2-4B) 44 for locking the sun gear 32a of the second planetary gearset 32. Further, a low-reverse brake (L/R) 45 and a one-way clutch (OWC) 46 are disposed in parallel with each other between the transmission housing 11 and the ring gear 31d of the first planetary gearset 31 connected to the pinion carrier 32c of the second planetary gearset 32. A transmission output gear 13 is connected to the pinion carrier 31c of the first planetary gearset first 31 connected to the ring gear 32d of the second planetary gearset 32. Rotation of the transmission output gear 13 is transmitted to right and left axles 6 and 7 through a differential 5 via gears 3 and 4.

Those frictional coupling elements 41–45 and the one-way clutch 46 are selectively activated so as to place the automatic transmission 10 into available gears as shown in the following Table I. In Table I, a circle indicates that a frictional coupling element is locked; a circle in parentheses indicates that a frictional coupling element is locked in the low speed (L) range only; and a dark spot indicates that a friction coupling element (the 2-4 brake 44) is not locked as a result of both servo apply pressure chamber (S/A) and servo release pressure chamber (S/R) being supplied with hydraulic pressure as will be described later.

TABLE I

| Gear | FWD(41) | 2-4B(44) | | 3-4C(43) | L/R(45) | REV(42) | OWC(46) |
| | | S/A | S/R | | | | |
|---|---|---|---|---|---|---|---|
| 1ST | ○ | | | | (○) | | ○ |
| 2ND | ○ | ○ | | | | | |
| 3RD | ○ | ● | ○ | ○ | | | |
| 4TH | | ○ | | ○ | | | |
| REVERSE | | | | | ○ | ○ | |

Specifically, the forward clutch (FWD) 41 locks in the first, second and third gears; the reverse gear (REV) 42 locks in the reverse gear; the 2-4 brake (2-4B) 44 locks in the second and fourth gears; and the low reverse brake (L/R) 45 locks in the reverse gear and in the first gear in the low speed (L) range where engine brake is available.

In gears where simultaneously locking of two of the friction coupling elements 41–45, such as the 3-4 clutch 43 and low reverse brake 45, the low reverse brake 45 and 2-4 brake 44, and the 2-4 brake 44 and reverse clutch 42, will occur, what is called interlocking causes in the automatic transmission 10. In order for the automatic transmission 10 to be prevented from interlocking, the hydraulic control system includes a shift valve which will be described in detail later.

Figure 3:
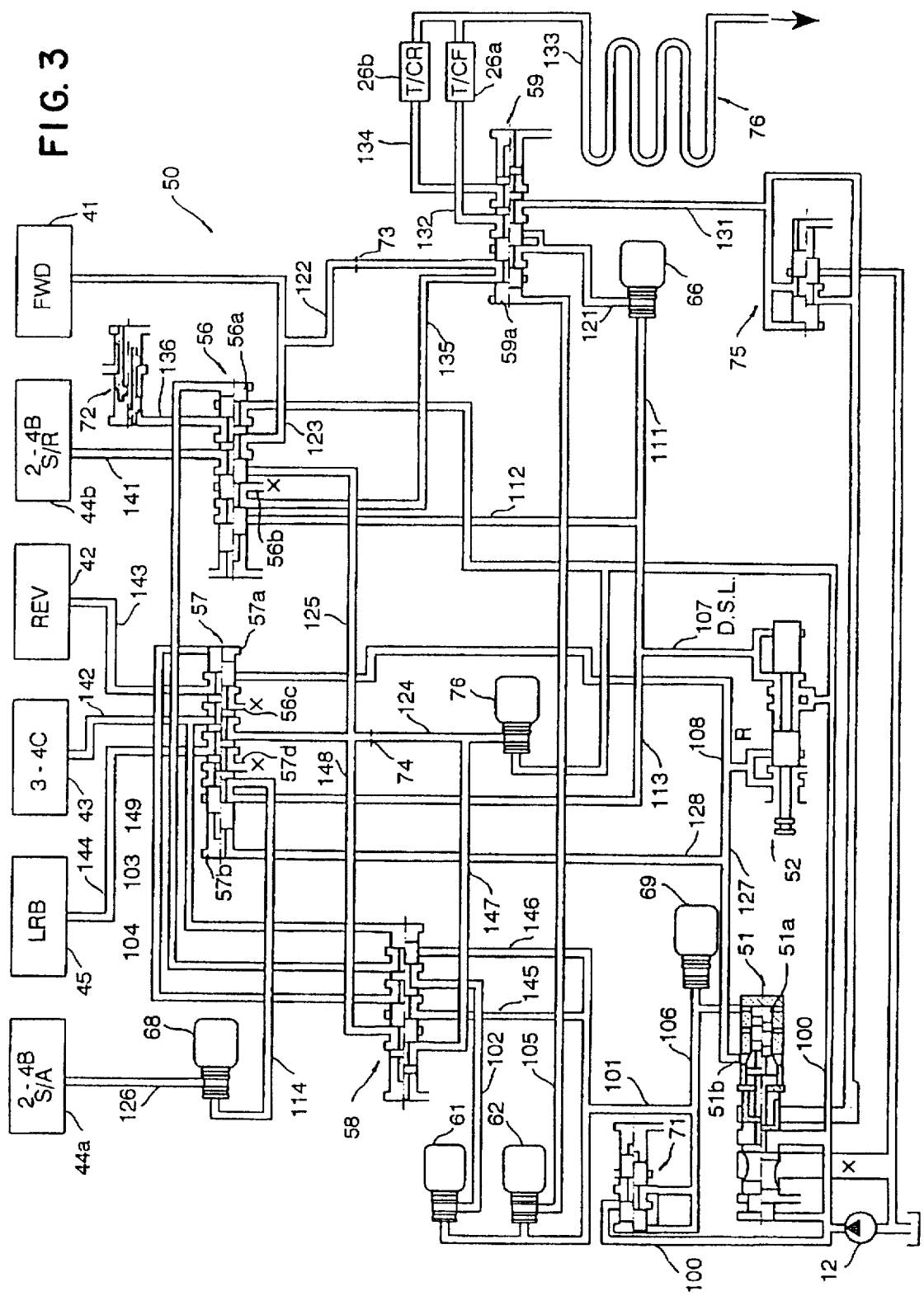
FIG. 3 is a diagrammatic view of a hydraulic control circuit according to an embodiment of the present invention.

The following description will be directed to a hydraulic control circuit shown in FIG. 3 for controlling operating hydraulic pressure supply to and operating hydraulic pressure discharge from a pressure chamber of each friction coupling element 41–45. Valves utilized in the hydraulic control system have two different spool positions which are shown by upper and lower halves in FIG. 3.

One of the friction coupling elements 41–45, for instance the 2-4 brake (2-4B) 44 including a band brake, has a servo apply pressure chamber (S/A) 44a and a servo release pressure chamber (S/R) 44b to which operating pressure is supplied. Specifically, the 2-4 brake (2-4B) 44 locks when the operating pressure is supplied to the servo apply pressure chamber (S/A) 44a only, and unlocks when the operating pressure is not supplied to both pressure chambers (S/A and S/R) 44a and 44b, when the operating pressure is supplied to both pressure chambers (S/A and S/R) 44a and 44b, or when the operating pressure is supplied to the servo release pressure chamber (S/R) 44b only. The remaining friction coupling elements 41–43 and 45 have single hydraulic pressure chambers and lock when operating pressure is supplied to the related hydraulic pressure chambers.

As shown in FIG. 3, a hydraulic pressure control circuit 50 includes various valves as essential elements, such as a regulator valve 51 for generating a line pressure (control source pressure), a manual shift valve 52 for shifting ranges of the automatic transmission 10 according to manual range selections through a shift lever, first to third shift valves 56–58 for changing pressure lines according to gears, first and second ON-OFF solenoid valves 61 and 62 (which are hereafter referred to as 1st and 2nd SVs, respectively for simplicity) utilized as an actuating pressure generator means for supplying actuating pressure to these shift valves 56–58 and a lock-up control valve 59, first to third duty solenoid valves 66–68 (which are hereafter referred to as 1st, 2nd and 3rd DSVs, respectively, for simplicity) utilized as operating pressure supply means for generating, regulating and discharging operating pressure supplied to pressure chambers of the friction coupling elements 41–45. These duty valves 66–68 as the operating pressure supply means are utilized with the effect of accurate regulation of operating pressure for the friction coupling elements 41–45 and, in particular, precise timing control of supply and discharge of operating pressure during gear shifts, which yield a reduction in shift shock caused in the automatic transmission and, consequently, improve feelings of gear shifting. In this instance, those solenoid valves 61 and 62 and duty valves 66–68 are of a three-way type having operating modes, namely a communication mode where hydraulic pressure is allowed to flow in a pressure line from the upstream side to the downstream side and vice versa and a drain mode where hydraulic pressure is drawn from the downstream pressure line. In the drain mode, since the valve shuts of its related upstream pressure line during draining hydraulic pressure from the downstream pressure lines, there is no aimless drainage of hydraulic pressure from the upstream pressure line, decreasing driving loss of the oil pump 12. As is well known, each of the solenoid valve valves 61 and 62 opens the downstream pressure line when it is ON or is applied with electric current and brings the upstream and downstream pressure lines into communication with each other when it is OFF or is not applied with electric current. On the other hand, each of the duty valves 66–68 develops a specifically regulated level of hydraulic pressure in the downstream pressure line according to a given level of line pressure in the upstream pressure line by means of duty control.

The regulator valve 51 regulates operating pressure discharged by the oil pump 12 to a fixed level of line pressure which in turn is delivered to the manual shift valve 52 through a main pressure line 100 and also to a reducing valve 71 and the second duty valve 67 as control source pressure. Further, as described later, according to operated conditions of the first shift valve 56, the line pressure is supplied to an accumulator 72 used to lock the forward clutch 41 through the shift valve 56 as back pressure. The line pressure is reduced by the reducing valve 71 to a fixed pressure level and then, delivered to the first and second solenoid valve valves 61 and 62 through a pressure line 101. When the first and second solenoid valve valves 61 and 62 are OFF, the fixed level of line pressure is further delivered downstream as solenoid pressure. Specifically, when the first solenoid valve valve 61 is OFF, the solenoid pressure is directed as pilot pressure to the control port 56a of first shift valve 56 through a pressure line 103 via the third shift valve 58 from a pressure line 103 or to the control port 57a of second shift valve 57 through a pressure line 104 via the third shift valve 58 from the pressure line 103. As a result, these shift valves 56 and 57 place their spool in left end positions as viewed in FIG. 3. On the other hand, when the first solenoid valve 62 is OFF, the solenoid pressure is directed to the control port 59a of lock-up control valve 59 through a pressure line 105 and places its spool in the right end position as viewed in FIG. 3.

Further, the fixed level of operating pressure from the reducing valve 71 is also delivered to the regulation port 51a of regulator valve 51 through a pressure line 106. In this instance, the operating pressure is regulated according to, for instance, engine load by means of a linear solenoid valve 69 installed in the pressure line 106. In this way, the line pressure is regulated according to engine load by means of the regulator valve 51. The line pressure delivered to the manual shift valve 52 through the main pressure line 100 is directed to a forward pressure line 107 in the forward ranges, i.e. the drive (D) range, slow speed (S) range and low speed (L) range, or to a reverse pressure line 108 in the reverse (R) range. The forward pressure line 107 branches off into three pressure lines 111–113, the first pressure line 111 leading to the first duty valve 66 so as to supply the line pressure as control source pressure; the second pressure line 112 leading to the first shift valve 56 so as to supply the line pressure to it; and the third pressure line 113 being brought into communication with a pressure line 114 so as to supply the line pressure as control source pressure to the third duty valve 68 when the second shift valve 57 has placed its spool in the left end position.

A pressure line 121 downstream from the first duty valve 66 which is supplied with control source pressure at the upstream side thereof leads to the lock-up control valve 59 and is brought into communication with the pressure chamber of forward clutch 41 through a forward clutch pressure line 122 equipped with an orifice 73 when the lock-up control valve 59 has placed its spool in the right end position. In this connection, a pressure line 123 branching off from the forward clutch pressure line 122 is connected to the first shift valve 56. A pressure line 124 downstream from the second duty valve 67 is equipped with an orifice 74 and leads to the second shift valve 57 and to the first shift valve 56 through a pressure line 125 branching off from the pressure line 124. A pressure line 126 downstream from the third duty valve 68, which is called a servo-apply pressure line, leads to the servo-apply pressure chamber 44a.

The reverse pressure line 108, into which the line pressure is introduced through the manual shift valve 52 in the reverse (R) range, leads to the second shift valve 57 so as to deliver the line pressure to the second shift valve 57. In this instance, the reverse pressure line 108 also delivers the line pressure to the intensifying port 51 of regulator valve 51 so as to regulate the line pressure to a level generally higher in the reverse (R) range than in the forward ranges. A pressure line 128 branching off from the pressure line 127 leads to the control port 57b of second shift valve 57 so as to deliver the line pressure to the second shift valve 57 as pilot pressure for forcing it to place its spool in the right end position.

The lock-up control valve 59 is supplied with operating pressure through a torque converter pressure line 131 via a relief valve 75 from the regulator valve 51 and is connected to the pressure line 121 downstream from the first duty valve 66. Further, the lock-up control valve 59 is supplied at its control port 59a with pilot line pressure through the pressure line 105 via the solenoid valve 62. While the solenoid valve 62 has been OFF, the pilot pressure forces the lock-up control valve 59 to place its spool in the right end position, bringing the torque converter pressure line 131 into communication with a pressure line 132 leading to a front pressure chamber (T/CF) 26a of the lock-up clutch 26 so as to supply operating pressure to the front pressure chamber (T/CF) 26a, thereby unlocking the lock-up clutch 26. Simultaneously, the pressure line 121 downstream from the duty valve 66 is brought into communication with the forward clutch pressure line 122 through the lock-up control valve 59 with a result of supplying operating pressure regulated by the first duty valve 66 to the pressure chamber of forward clutch 41 through the forward clutch pressure line 122. As apparently shown in FIG. 3, outlets of both front pressure chamber (T/CF) 26a and rear pressure chamber (T/CR) 26b of lock-up clutch 26 are connected with each other by means of a pressure relief line 133 equipped with an oil cooler 76.

When the second ON-OFF valve 62 is ON, operating pressure is drained out from the control port 59a of lock-up control valve 59 through the pressure line 105. Resultingly, the lock-up control valve 59 shifts its spool to the left end position, so as to bring the torque converter pressure line 131 into communication with a pressure line 134 leading to the rear pressure chamber (T/CR) 26b of lock-up clutch 26, thereby forcing the operating pressure into the rear pressure chamber (T/CR) 26b of lock-up clutch 26 and locking the lock-up clutch 26. Simultaneously, the pressure line 132 leading to the rear pressure chamber 26b (T/CR) of lock-up clutch 26 is brought into communication with the pressure line 121 downstream from the first duty valve 66 through the lock-up control valve 59, enabling the first duty valve 66 to regulate the operating pressure in the rear pressure chamber 26b of lock-up clutch 26. As a result, the lock-up clutch 26 is controlled precisely in locked condition, which is always desirable to effectively increase power transmission performance of the torque converter 20.

A source pressure supply line 135, which is installed between the lock-up control valve 59 and first shift valve 56, is brought into communication with the forward clutch pressure line 122 through the lock-up control valve 59 while the lock-up control valve 59 has placed its spool in the left end position, i.e. the first duty valve 66 has been in communication with the pressure line 132. Further, the source pressure supply line 135 is brought into communication with the pressure line 112 branching off from the forward pressure line 107 through the first shift valve 56 while the first shift valve 56 has placed its spool in the left end position, and with the drain port 56b of first shift valve 56 while the first shift valve 56 has placed its spool in the right end position.

In the hydraulic pressure control circuit 50 of this embodiment, the first shift valve 56 is connected to the accumulator 72 through a pressure line 136 as well as being connected to the pressure line 123 branching off from the forward clutch pressure line 122. While the first shift valve 56 places its spool in its left end position, the pressure line 136 is in communication with the branch pressure line 123 so as to force the accumulator 72 to discharge the pressure into the pressure chamber of forward clutch 41. That is, accumulation of pressure in the accumulator 72 and the discharge of accumulated pressure to the forward clutch 41 are managed by shifting the spool of first shift valve 56. The first shift valve 56 is connected to the servo release pressure chamber 44b of 2-4 brake 44 through a servo release pressure line 141. The servo release pressure chamber 44b of 2-4 brake 44 and the pressure chamber of forward clutch 41 are brought into communication through the forward clutch pressure line 122, pressure lines 123 and 141 and simultaneously supplied with operating pressure when the first shift valve 56 shift its spool to the right end position. Further, the first shift valve 56 and second shift valve 57 are interconnected by means of the pressure lines 124 and 125. The servo release pressure chamber 44b of 2-4 brake 44, leading to the first shift valve 56, and the pressure chamber of 3-4 clutch 43 leading to the second shift valve 57 through a 3-4 clutch pressure line 142 are brought into communication with each other through the pressure lines 141, 142, 124 and 125 when both first shift valve 56 and second shift valve 57 shift their spool to their left end positions, respectively. Causing the first shift valve to shift the spool in position changes communication of the servo release pressure chamber 44b of 2-4 brake 44 between with the forward clutch 44 and with the 3-4 clutch 43.

The second shift valve 57 is connected with the reverse clutch 42 and the low reverse brake 45 through a reverse clutch pressure line 143 and a low reverse brake pressure line 144, respectively, as well as being connected to the servo apply pressure chamber 44a of 2-4 brake 44 through the pressure lines 114 and 126 via the third duty valve 68. Accordingly, the 2-4 brake 44 receives at the servo apply pressure chamber 44a servo apply pressure directly from the third duty valve 68. While the second shift valve 57 has placed its spool in the left end position, it keeps the 3-4 clutch 43 in communication with second duty valve 67 through the pressure lines 124 and 142 and provides communication between the pressure lines 113 and 114, supplying operating pressure to the third duty valve 68. During this, both reverse clutch 42 and low reverse brake 45 are connected to the drain ports 57c and 57d of second shift valve 57, respectively. On the other hand, while the second shift valve 57 has placed its spool in the right end position, it keeps the pressure chamber of reverse clutch 42 in communication with the reverse pressure line 108 as well as connecting the low reverse brake 45 to the second duty valve 67 through the pressure lines 124 and 144. In this instance, the 3-4 clutch 43 and the servo apply pressure chamber of 2-4 brake 44 are connected to the drain ports 57c and 57d of second shift valve 57, respectively.

As described above, the second shift valve 57 has the drain port 57a common to pressure chambers of 3-4 clutch 43 and reverse clutch 42 for pressure discharge and the drain port 57b common to the pressure chamber of low reverse brake 45 and the servo apply pressure chamber 44a of 2-4 brake 44 for pressure discharge. This structure of second shift valve 57 makes it possible to install a shortened axial length of second shift valve 57 as compared with cases where the shift valve 57 is provided with drain ports peculiar to the respective friction coupling elements 41-45.

As was previously described, while, in gears where simultaneously locking of two of the friction coupling elements 41-45, namely the 3-4 clutch 43 and low reverse brake 45, the low reverse brake 45 and 2-4 brake 44, and the 2-4 brake 44 and reverse clutch 42, will occur, interlocking causes in an automatic transmission, nevertheless, the hydraulic pressure control circuit 50 of this invention prevents the automatic transmission 10 from interlocking, which results from changing pressure lines with the use of a single shift valve, i.e. the second shift valve in this embodiment. Specifically stating, when the 3-4 clutch 43 or 2-4 brake 44 is locked, which occurs while the second shift valve 57 has placed its spool in the left end position, both low reverse brake 45 and reverse clutch 42 are simultaneously unlocked. When the low reverse brake 45 or reverse clutch 42 is locked, which occurs while the second shift valve 57 has placed its spool in the right end position, the 3-4 clutch 43 and 2-4 brake 44 are simultaneously unlocked. In such a way, the interlocking of the automatic transmission 10 is certainly prevented by changing pressure lines with the use of the second shift valve 57 which is realized by a relatively simple structure.

Supply of operating pressure to two friction coupling elements which are not simultaneously locked, namely the 3-4 clutch 43 and low reverse brake 45, is performed through the selective connection of second duty valve 67 to the two friction coupling elements caused by shifting the spool of second shift valve 57, enabling to provide a simple structure of the hydraulic pressure control circuit 50.

While the second shift valve 57 is supplied at the control port 57b with the control source pressure through the pressure lines 127 and 128 from via the manual shift valve 52, it is also supplied at another control port 57a with the solenoid pressure from the first solenoid valve 61 through the pressure lines 102 and 104 via the third shift valve 58. The second shift valve 57 is forced to shift its spool with pilot pressure at either one of the control ports 57a and 57b, selectively providing operative pressure lines.

The third shift valve 58 is connected at the upstream side with pressure lines 145 and 146 branching off from the pressure line 101 leading to the reducing valve 71 and a line pressure 147 branching off from the pressure line 124 downstream from the second duty valve 67, as well as the pressure line 102. Together, the third shift valve 58 is connected at the downstream side with the pressure line 148 leading to the pressure line 125 upstream from the first shift valve 56 and a line pressure 149 branching off from the 3-4 clutch pressure line 142 extending between the second shift valve 57 and 3-4 clutch 43, as well as the pressure lines 103 and 104.

While the third shift valve 58 has placed its spool in the right end position, it keeps the pressure line 146 in communication with the pressure line 103, directing the fixed level of pilot pressure to the first shift valve 56 from the reducing valve 71 so as to cause the first shift valve 56 to shift its spool to the left end position. At this time, the second shift valve 57 is brought into communication with the first solenoid valve 61 through the pressure lines 102 and 104, allowing the solenoid pressure from the first solenoid valve 61 to be directed to the second shift valve 57 as pilot pressure. When the second shift valve 57 receives the pilot pressure at the control port 57a, it shifts its spool to the left end position and, as a result, brings the 3-4 clutch 43 into communication with the second duty valve 67 through the pressure lines 124 a nd 142. Resultingly, while operating pressure is supplied to the pressure chamber of 3-4 clutch 43 from the second duty valve 67, the operating pressure is also supplied to the control port 58a of third shift valve 58 through the pressure line 149. When the operating pressure exceeds a fixed level, the third shift valve 58 shift its spool to the left end position and, as a result, brings the pressure line 145 into communication with the pressure line 104, directing the fixed level of pilot pressure to the control port 57a of second shift valve 57 from the reducing valve 71. At this time, the first solenoid valve 61 is brought into communication with the control port 56a of first shift valve 56 through the pressure lines 102 and 103 and, as a result, allows the solenoid pressure from the first solenoid valve 61 to be directed to the first shift valve 56 as pilot pressure.

As stated above, it can be summarized that the 3-4 clutch 43 is a friction coupling element which is locked in forward gears higher than the third gear and unlocked in gears slower than the second gear and that the first shift valve 56 is one which shifts between gears slower than the third gear where the forward clutch 41 is locked and the forth gear in which forward clutch 41 is unlocked, in other words, in a range of high speed gears. The second shift valve 57 shifts with a result of locking and unlocking the low reverse brake 45. That is, it is a shift valve which shifts between the second gear and the first gear in which engine brake is available, in other words, in a range of slow speed gears. Consequently, these first shift valve 56 and second shift valve 57 do not operate in any way simultaneously.

By means of the hydraulic pressure control circuit 50, the first solenoid valve 61 is selectively connected to the control ports 56a and 56b of first shift valve 56 according to operated conditions of 3-4 clutch 43 which is differently operated between the high speed gears higher than the third gear and the low speed range lower than the second gear. This enables to supply solenoid pressure the shift valves 56 and 57 so as to operate them at a most appropriate timing and to use a single element, i.e. the solenoid valve 61, for shift operations of the shift valves 56 and 57. In other words, the first solenoid valve 61 is used commonly to the first shift valve 56 and second shift valve 57 which are in no way simultaneously operative, enabling to provide a simple structure of the hydraulic pressure control circuit 50.

As was stated previously, the pressure line 125, which is brought into communication with the pressure line 141 through which the first shift valve 56 is connected to the servo release pressure chamber 44b of 2-4 brake 44 when the first shift valve 56 shifts its spool to the left end position, branches off from the pressure line 124 which extends from the second duty valve 67 to the second shift valve 57 and is equipped with the orifice 74. Further, the pressure line 125 is connected to the pressure line 148 leading to the third shift valve 58. When a first to second gear shift occurs, in other words, when operating pressure is supplied to the servo apply pressure chamber 44a of 2-4 brake 44 and is simultaneously discharged from the servo release pressure chamber 44b of 2-4 brake 44, the 3-4 clutch 43 is in no way supplied with operating pressure and the third shift valve 58 is not supplied at the control port 58a with pilot pressure, so that the third shift valve 58 holds the spool in the right end position, thereby keeping the pressure lines 147 and 148 in communication with each other. As a result, the operating pressure discharged from the servo release pressure chamber 44b through the pressure lines 141 and 125 runs not through the orifice 74 but through the pressure lines 148 and 147 via the third shift valve 58. It can accordingly be said that the pressure lines 148 and 147 form a bypass pressure line with regard to the orifice 74. Discharge of operating pressure from the servo release pressure chamber 44b is made quickly through the bypass pressure line 147 and 148, preventing a delay of operation of 2-4 brake in response to a gear shift which occurs due to residual operating pressure in the servo release pressure chamber 44b.

During a second to third gear shift, i.e. when operating pressure is supplied to the servo release pressure chamber 44b of 2-4 brake 44, the operating pressure is introduced through the orifice 74. In this case, operating pressure is supplied to both servo release pressure chamber 44b of 2-4 brake 44 and pressure chamber of 3-4 clutch 43 at approximately the same level with the effect of providing comfortable feelings of gear shift. Shifting the third shift valve 58 necessary to directing operating pressure to the bypass pressure line 147 and 148 is caused by the operating pressure in the pressure chamber of 3-4 clutch 43 which is free from the first to second gear shift. Specifically, the third shift valve 58 is configured so that it shifts the spool in position to shut off the bypass pressure line 147 and 148 at a time when the operating pressure reaches a level slightly higher than a piston thrust force level for the 3-4 clutch 43. With the configuration, during the second to third gear shift, after the 3-4 clutch 43 and 2-4 brake 44 start their locking and unlocking operations resulting from the completion of a piston stroke of the 3-4 clutch 43, the orifice 74 is involved in the supply of operating pressure to the servo release pressure chamber 44b of 2-4 brake 44, causing smooth shift operations of the 2-4 brake 44 and 3-4 clutch 43 with the effect of providing comfortable feelings of gear shift.

During the first to second gear shift, the operating pressure is discharged quickly from the servo release pressure chamber 44b of 2-4 brake 44. In this instance, while there is possibly a part of operating pressure impermanently left over in the servo release pressure chamber 44b of 2-4 brake 44 which in turn potentially reaches the control port 58a of third shift valve 58 through the pressure lines 125, 124 and 149 via the second shift valve 57, however, since the operating pressure necessary for the third shift valve 58 to make the bypass pressure line 147 and 148 function is set higher in level than the piston thrust force level, the residual pressure does not give any effect to the third shift valve 58. This is because that, during the shift operations of the3-4 clutch 43 and 2-4 brake 44, the operating pressure is developed so as to be held in both servo release pressure chamber 44b of 2-4 brake 44 and pressure chamber of 3-4 clutch 43 at approximately the same level and that, during the first to second gear shift, the third shift valve 58 is prevented from shutting off the bypass pressure line 147 and 148 which is caused by accidental shift operation due to the residual operating pressure in the servo release pressure chamber 44b of 2-4 brake 44.

Figure 4:
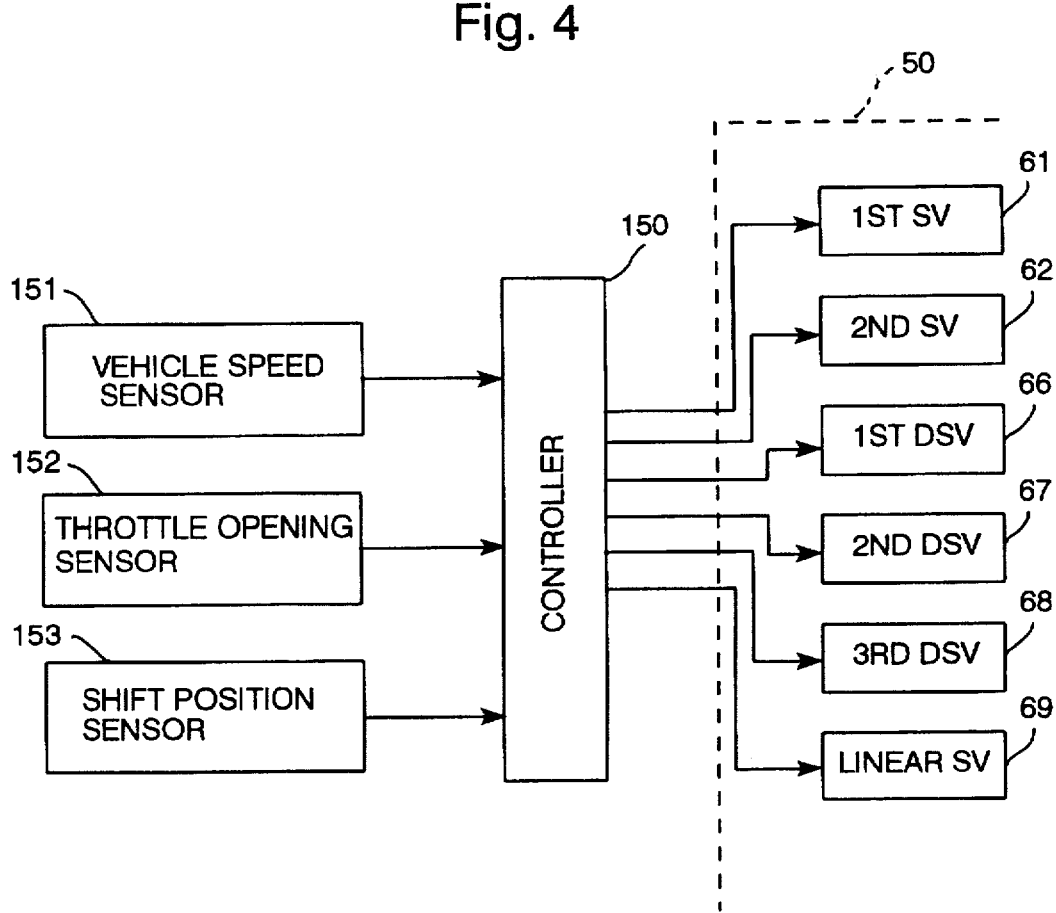
FIG. 4 is a block diagram illustrating a control system for various solenoid valves of the hydraulic control circuit of FIG. 3.

As shown in FIG. 4, the hydraulic control circuit 50 cooperates with a controller 150 for controlling operations of the valves 61, 62 and 66-69. The controller 150 receives various control signals, such as a signal representative of a vehicle speed from a speed sensor 151, a signal representative of engine throttle position or opening as an engine load from a throttle opening sensor 152, and a signal representative of a shift position or range selected by a shift lever from a position sensor 153, on the basis of which the controller 150 controls the various valves 61, 62 and 66-69 according to engine operating conditions.

The following description will be directed to operation of the valves 61, 62 and 66-68 in connection with operating pressure supply to the friction coupling elements 41-45 in each gear shift.

The valves 61, 62 and 66-68 operate in various patterns for the respective gears as shown in the following Tables II-VI. The Tables II, III and IV indicate patterns for up-shift, down-shifts and a down-shift to the first gear in the low speed (L) range, respectively. Further, the Tables V and VI indicates patterns for range selection through the manual shift valve 52 and lock-up control in the third gear and fourth gear, respectively. In each Table II-VI, a circle indicates the ON or activated state of each valve 61, 62, 66-68 in which a pressure line upstream is shut off to drain operating pressure out of a downstream pressure line of each related valve; a cross or X indicates the OFF or deactivated state of each valve 61, 62, 66-68 in which an upstream pressure line and downstream pressure line from each related valve are in communication with each other so as to allow operating pressure to be directed to the downstream pressure line; and a dark spot indicates that each duty valve 66-68 regulates source control pressure to a fixed level and directs it downstream. PL, Pacc, Ptc denote line pressure or control source pressure, accumulator pressure and converter pressure, respectively, and P1, P2 and P3 denote operating pressure regulated by the first, second and third duty valves 66, 67 and 68, respectively. Further, an arrow indicates a direction of gear shift or a direction of range shift. For instance, 3→4 indicates a gear shift from the third gear to the fourth gear; and N←D indicates a range shift from the drive (D) range to the neutral (N) range. In Table VI, a label L/U indicates a lock-up control condition.

TABLE II

| Gear | 1 | 1→2 | 2 | 2→3 | 3 | 3→4 | 4 |
|---|---|---|---|---|---|---|---|
| FWD | PL | PL | PL | PL | PL | — | — |
| S/A | — | P3 | PL | P3 | PL | P3 | PL |
| S/R | — | — | — | P2 | PL | — | — |
| 3-4 | — | — | — | P2 | PL | PL | PL |
| L/R | — | — | — | — | — | — | — |
| REV | — | — | — | — | — | — | — |
| T/CF | Ptc | Ptc | Ptc | Ptc | Ptc | Ptc | Ptc |
| T/CR | Ptc | Ptc | Ptc | Ptc | Ptc | Ptc | Ptc |
| 1st SV | X | X | X | X | X | O | O |
| 2nd SV | X | X | X | X | X | X | X |
| 1st DSV | X | X | X | X | X | O | O |
| 2nd DSV | O | O | O | ● | X | X | X |
| 3rd DSV | O | ● | X | ● | X | ● | X |

TABLE III

| Gear | 1 | 1←2 | 2 | 2←3 | 3 | *3←4 | **3←4 | 4 |
|---|---|---|---|---|---|---|---|---|
| FWD | PL | PL | PL | PL | PL | Pacc | PL | — |
| S/A | — | P3 | PL | P3 | PL | P3 | P3 | PL |
| S/R | — | — | — | P2 | PL | PL | PL | — |
| 3-4 | — | — | — | P2 | PL | PL | PL | PL |
| L/R | — | — | — | — | — | — | — | — |
| REV | — | — | — | — | — | — | — | — |
| T/CF | Ptc | Ptc | Ptc | Ptc | Ptc | Ptc | Ptc | Ptc |
| T/CR | Ptc | Ptc | Ptc | Ptc | Ptc | Ptc | Ptc | Ptc |
| 1st SV | X | X | X | X | X | X | O | O |
| 2nd SV | X | X | X | X | X | X | X | X |
| 1st DSV | X | X | X | X | X | X | O | O |
| 2nd DSV | O | O | O | ● | X | X | X | X |
| 3rd DSV | O | ● | X | ● | X | ● | ● | X |

*Power Off 4-3 shift;
**Power On 4-3 shift

TABLE IV

| Gear | L1 | L1←2 | 2 |
|---|---|---|---|
| FWD | PL | PL | PL |
| S/A | — | — | PL |
| S/R | PL | P2 | — |
| 3-4 | — | — | — |
| L/R | PL | P2 | — |
| REV | — | — | — |
| T/CF | Ptc | Ptc | Ptc |
| T/CR | Ptc | Ptc | Ptc |
| 1st SV | O | O | X |
| 2nd SV | X | X | X |

TABLE IV-continued

| Gear | L1 | L1←2 | 2 |
|---|---|---|---|
| 1st DSV | X | X | X |
| 2nd DSV | X | ● | ○ |
| 3rd DSV | ○ | ○ | X |

TABLE V

| Gear | N | N→D(3) | D(1) | ND | NR | R |
|---|---|---|---|---|---|---|
| FWD | — | Pacc | Pacc | PL | Pacc | — | — |
| S/A | — | — | — | — | — | — | — |
| S/R | — | P2 | — | — | — | — | — |
| 3-4 | — | P2 | — | — | — | — | — |
| L/R | — | — | — | — | — | P2 | PL |
| REV | — | — | — | — | — | PL | PL |
| T/CF | Ptc | Ptc | Ptc | Ptc | Ptc | Ptc | Ptc |
| T/CR | Ptc | Ptc | Ptc | Ptc | Ptc | Ptc | Ptc |
| 1st SV | X | X | X | X | X | X | X |
| 2nd SV | X | X | X | X | X | X | X |
| 1st DSV | X | ● | ● | X | X | X | X |
| 2nd DSV | ○ | ● | ○ | ○ | ○ | ● | X |
| 3rd DSV | ○ | ○ | ○ | ○ | ○ | ○ | ○ |

TABLE VI

| Gear | 3 | 3-3L/U | 3L/U | 4 | 4-4L/U | 4L/U |
|---|---|---|---|---|---|---|
| FWD | PL | PL | PL | — | — | — |
| S/A | PL | PL | PL | PL | PL | PL |
| S/R | PL | PL | PL | — | — | — |
| 3-4 | PL | PL | PL | PL | PL | PL |
| L/R | — | — | — | — | — | — |
| REV | — | — | — | — | — | — |
| T/CF | Ptc | P1 | — | Ptc | P1 | — |
| T/CR | Ptc | Ptc | Ptc | Ptc | Ptc | Ptc |
| 1st SV | X | X | X | ○ | ○ | ○ |
| 2nd SV | X | ○ | ○ | X | ○ | ○ |
| 1st DSV | X | ● | ○ | ○ | ● | ○ |
| 2nd DSV | X | X | X | X | X | X |
| 3rd DSV | X | X | X | X | X | X |

Figure 5:
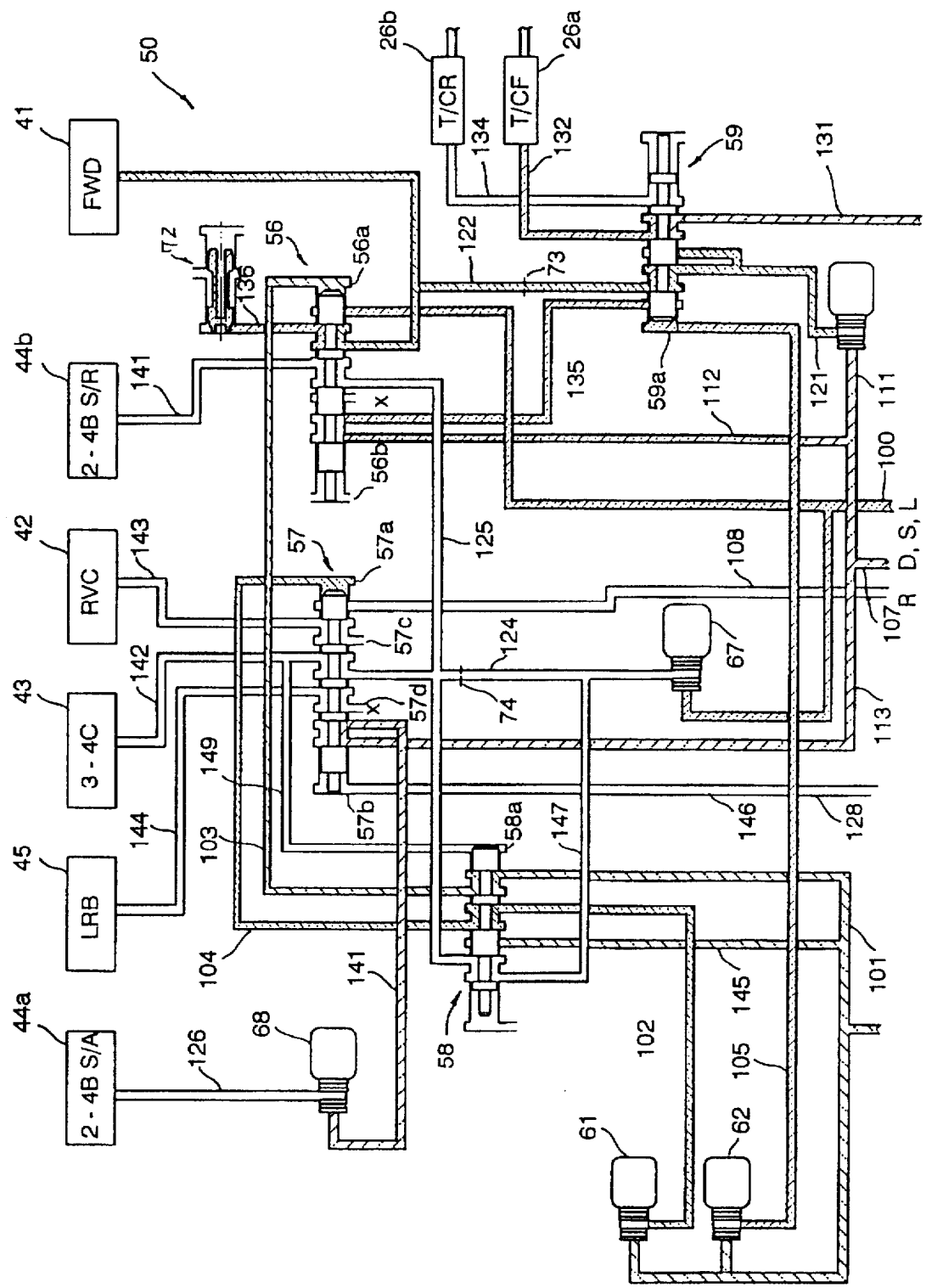
FIG. 5 is an enlarged view of an essential part of the hydraulic control circuit of FIG. 3 which provides a first gear.

As shown in Tables II and III and in FIG. 5, in the first (1) gear in forward ranges excepting the low-speed (L) range, the second solenoid valve 62 is OFF, directing the pilot pressure to the control port 59a of lock-up control valve 96 through the pressure line 105. This causes the lock-up control valve 59 to shift its spool to the right end position as viewed in the FIG. 5, bringing the pressure line downstream from the first duty solenoid valve 66 into communication with the forward clutch pressure line 122. On the other hand, the second duty solenoid valve 66 is OFF, directing the line pressure directly to the pressure chamber of forward clutch (FWD) 41, so as to lock the forward clutch (FWD) 41 into coupling. At the beginning, the line pressure is supplied gently to the forward clutch (FWD) 41 through the orifice 73. Together, the converter pressure is supplied to the front chamber (T/CF) 26a of lock-up clutch 26 through the pressure line 131, unlocking the lock-up clutch 26.

Further, in the first (1) gear, the second duty solenoid valve 67 is turned ON, draining the control port 58a of third shift valve 58 through the pressure lines 124, 142 and 149. As a result, the third shift valve 58 shifts its spool to the right end position, bringing the pressure line 146 into communication with the pressure line 103 so as to supply a fixed level of pressure to the control port 56a of first shift valve 56 through the pressure lines 101, 146 and 103 from the reducing valve 71 (see FIG. 3). Resultingly, the first shift valve 56 shifts its spool to the right end position, bringing the pressure line 123 branching off from the forward clutch pressure line 122 into communication with the pressure line 136 leading to the accumulator 72. The locking of the forward clutch 41 during, for instance, arrange shift from the neutral (L) to the drive (D) progresses gently due to the operation of the accumulator 72. The combined effects of the accumulator 72 and orifice 73 reduces shift shock occurring in the automatic transmission.

In the first (1) gear where the first solenoid valve 61 is OFF, the pilot pressure is supplied to the control port 57a of second shift valve 57 through the pressure lines 102 and 104 via the third shift valve 58, forcing the second shift valve 57 to shift the spool to the left end position. As a result, the pressure line 114 leading to the third duty solenoid valve 68 is brought into communication with the forward pressure line 107 leading to the, so that, although the line pressure is supplied to the third duty solenoid valve 68 having been ON and drained at the downstream side, it prevents the line pressure from being delivered to the servo apply pressure chamber (S/A) 44a of 2-4 brake 44.

Figure 6:
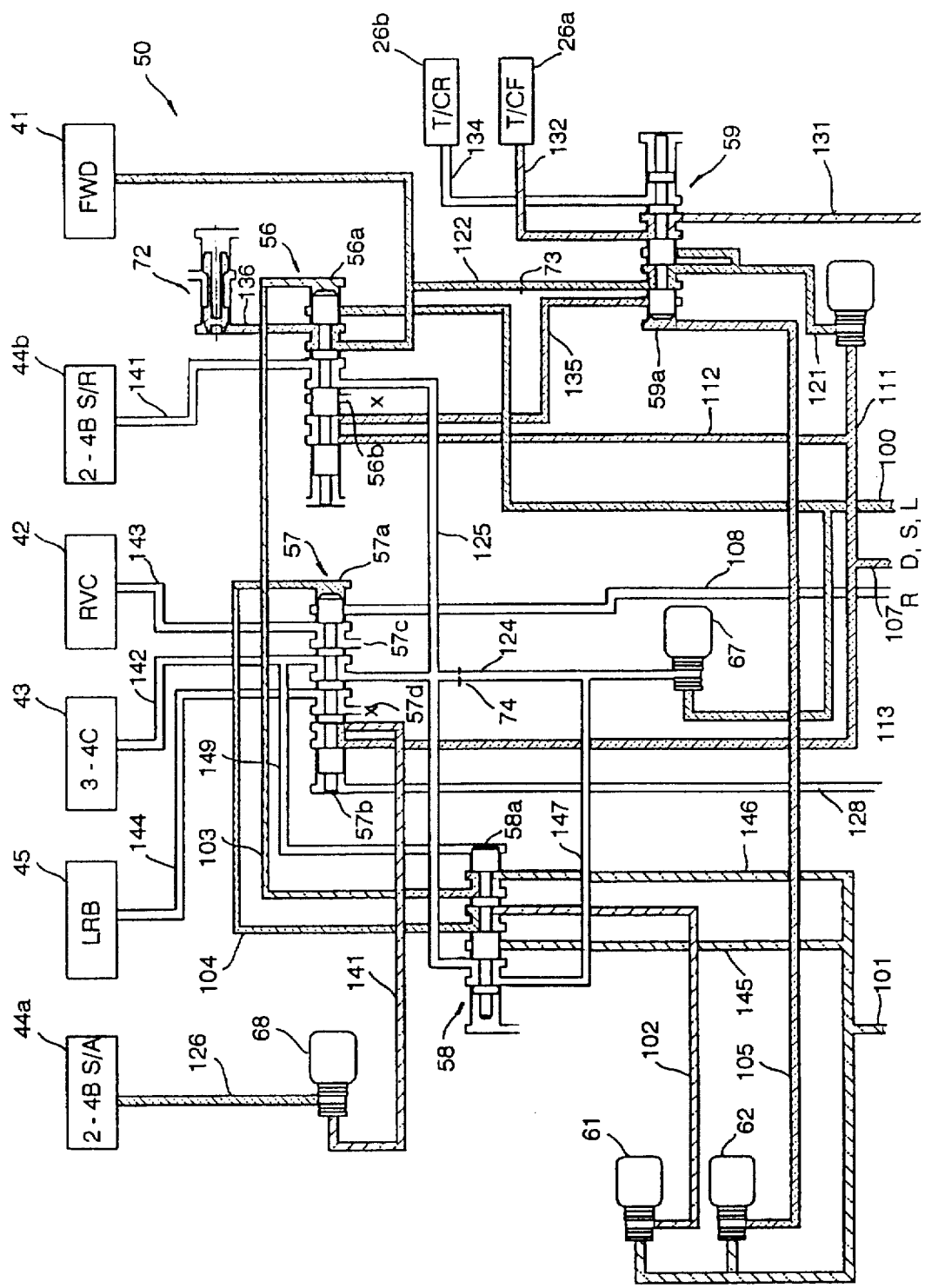
FIG. 6 is an enlarged view of an essential part of the hydraulic control circuit of FIG. 3 which provides a second gear.

As shown in Tables II and III and in FIG. 6, in the second (2) gear, the third duty solenoid valve 68 turns OFF, directing the line pressure directly to the servo apply pressure chamber (S/A) 44a of 2-4 brake 44 through the pressure lines 107, 114 and 126 via the second shift valve 57. The remaining valves 61, 62 66 and 67 hold the same states as in the first (1) gear. Resultingly, the 2-4 brake (2-4B) 44, in addition to the forward clutch (FWD) 41, is locked. As shown in Table II, in a transitional pattern (1→2) between the first (1) gear and second (2) gear, since the third duty solenoid valve 68 duty-controls the servo apply pressure and supplies it to the 2-4 brake (2-4B) 44, the locking of 2-4 brake (2-4B) 44 is smooth. After the achievement of shift to the second (2) gear, the third duty solenoid valve 68 terminates the control of line pressure and supplies the line pressure directly to the servo apply pressure chamber (S/A) 44a of 2-4 brake 44. In this instance, the third shift valve 58 has been placed its spool in the right end position and, consequently, holds the bypass pressure lines 147 and 148 in communication so as to form the pressure bypass line, the operating pressure is released not through the orifice 74 but through the bypass pressure line 147 and 148 during the first (1) to second (2) gear shift. This prevents a shift delay which is possibly caused by residual pressure left in the servo release pressure chamber (S/R) 44b of 2-4 brake 44.

As shown in Table III, during a down-shift from the second (2) gear to first (1) gear, the same transitional pattern as during the up-shift from the first (1) gear to second (2) gear takes place.

Figure 7:
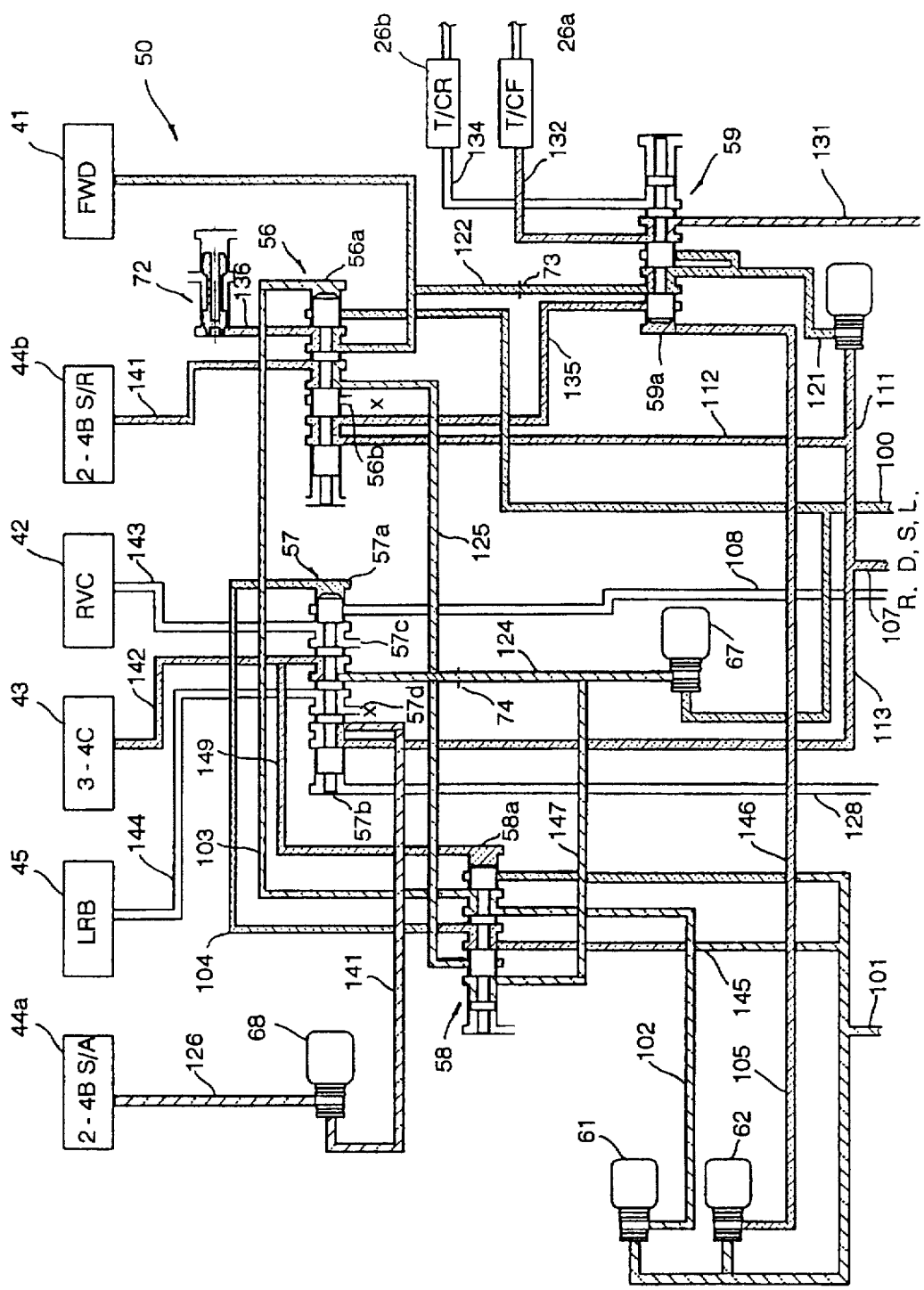
FIG. 7 is an enlarged view of an essential part of the hydraulic control circuit of FIG. 3 which provides a third gear.

As shown in Tables II and III and in FIG. 7, in the third (3) gear, the second duty solenoid valve 67 takes the OFF state, delivering the line pressure directly to the first shift valve 56 and second shift valve 57 through the pressure line 125 and 124, respectively, from the main pressure line 100, and forces these shift valve to shift their spool to the left end positions, respectively. As a result, the line pressure is supplied to both pressure chamber of 3-4 clutch 43 and the servo release pressure chamber (S/R) 44b of 2-4 brake 44 through the pressure line 142 and 141, respectively, locking, on one hand, the 3-4 clutch 43 and unlocking, on the other hand, the 2-4 brake 44. The remaining valves 61, 62 66 and 68 hold the same states as in the second (2) gear.

In a transitional pattern (2→3) between the second (2) gear and third (3) gear, since the second duty solenoid valve 67 duty-controls operating pressure on the basis of the line pressure from the main pressure line 100 and directs it to the first shift valve 56 and second shift valve 57 through the pressure lines 125 and 124, respectively. Because these pressure lines 124 and 125 leads to the 3-4 clutch pressure line 142 and servo release pressure line 141, respectively, the operating pressure regulated by the second duty solenoid valve 67 is supplied to both pressure chamber of3-4 clutch 43 and the servo release pressure chamber (S/R) 44b of 2-4 brake 44 as 3-4 clutch pressure and servo release pressure, respectively. The locking of 3-4 clutch 43 and the unlocking of 2-4 brake 44 are caused favorably.

During the second (2) to third (3) gear shift, while the second duty solenoid valve 67 duty-controls the 3-4 clutch pressure and servo release pressure, the third duty solenoid valve 68, through which the line pressure was supplied to the servo apply pressure chamber (S/A) 44a of 2-4 brake 44 in the second (2) gear, duty-controls the servo apply pressure. Consequently, the locking of 3-4 clutch 43 and the unlocking of 2-4 brake 44 are timely caused with well reduced shift shock. At this time, since communication has been provided between the pressure chamber of3-4 clutch 43 and servo release pressure chamber (S/R) 44b of 2-4 brake 44, the operating pressure regulated by the second duty solenoid valve 67, after adjustment in supply timing by the orifice 74, is delivered to both pressure chamber of 3-4 clutch 43 and servo release pressure chamber (S/R) 44b of 2-4 brake 44 and held at approximately the same level in these pressure chambers.

Although the third shift valve 58 holds its spool in the right end position so as to provide the bypass pressure line 147 and 148 in the second (2) gear immediately before the second (2) to third (3) gear shift, the third shift valve 58, as was previously described, forces the spool to the left end position when the 3-4 clutch pressure raises and reaches slightly above the piston thrust force level, so as to disconnect the pressure lines 147 and 148 and shut off them as the bypass pressure line. Accompanying this, the pressure line 102 is changed in communication from with the pressure line 104 to with the pressure line 103. Resultingly, while the pilot pressure is directed to the control port 56a of first shift valve 56 from the first solenoid valve 61, the fixed level of pressure is directed to the control port 57a of second shift valve 57 through the pressure lines 145 and 104 from the reducing valve 71.

As shown in Table III, during a down-shift from the third (3) gear to second (2) gear, the same transitional pattern as during the up-shift from the second (2) gear to third (3) gear.

Figure 8:
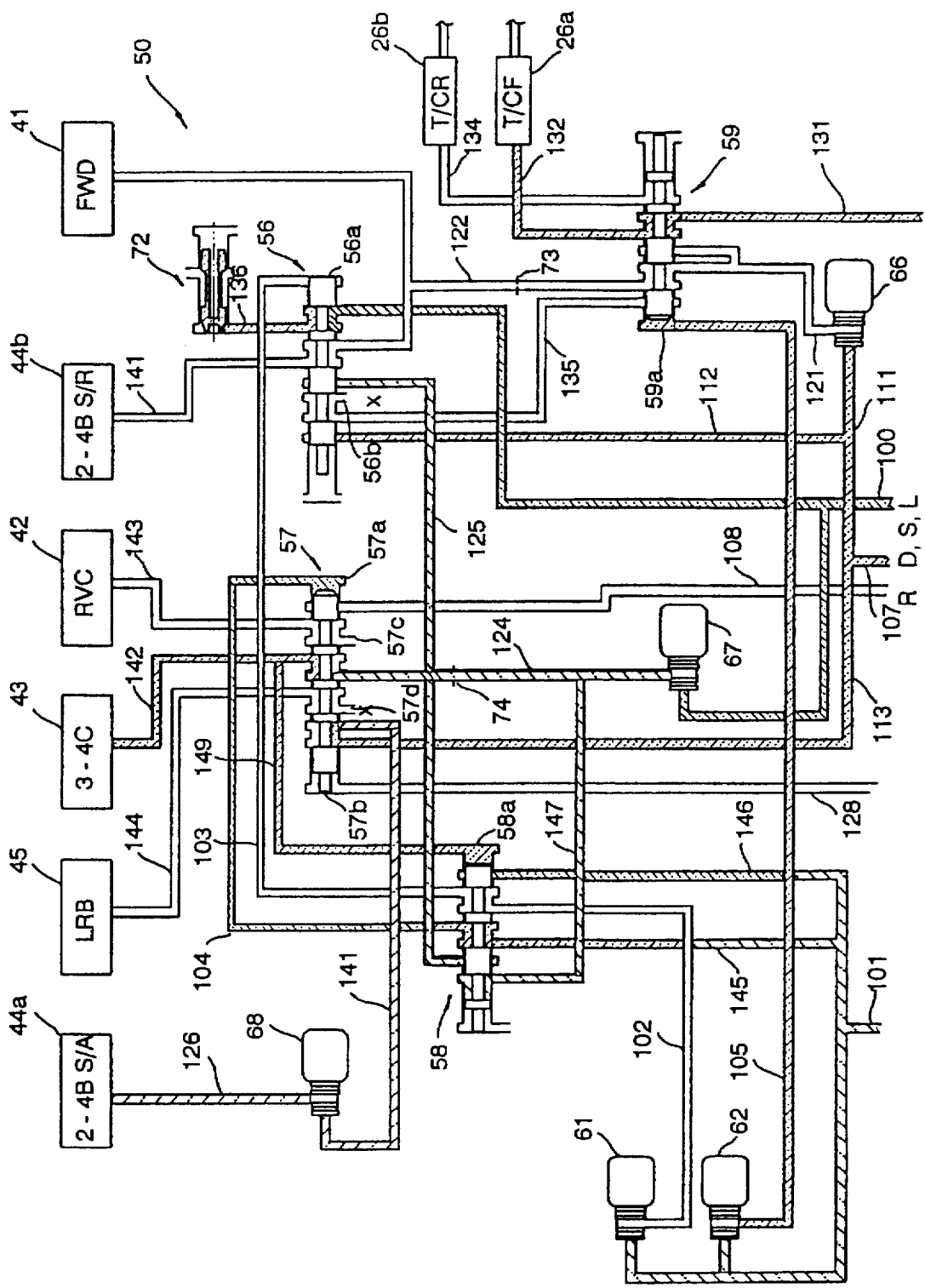
FIG. 8 is an enlarged view of an essential part of the hydraulic control circuit of FIG. 3 which provides a fourth gear.

As shown in Tables II and III and in FIG. 8, while the first duty solenoid valve 66 is ON, through which the downstream forward clutch pressure line 122 is drained, the first solenoid valve 61 is ON, through which the control port 56a of first shift valve 51 is drained. Resultingly, the first shift valve 51 shift the spool to the right end position, so as to bring the forward clutch pressure line 122 into communication with the servo release pressure line 141 through the pressure line 123, thereby discharging simultaneously the forward clutch pressure and servo release pressure through the first duty solenoid valve 66 and pressure line 121 or through the first shift valve 56 and source pressure supply line 135 according to the operated condition of lock-up control valve 59. That is, the forward clutch 41 is unlocked, and the 2-4 brake 44 is locked again.

As shown in Table II, in a transitional pattern (3→4) between the third (3) gear and forth (4) gear, since the third duty solenoid valve 68 duty-controls the operating pressure so as to provide appropriately regulated servo supply pressure, the third (3) to fourth (4) gear shift is caused smoothly without accompanying significant shift shock.

Further, as shown in Table III, during a down-shift from the forth (4) gear to third (3) gear in a power-on mode, the first duty solenoid valve 66 turns OFF, directing the operating pressure from the pressure line 121 to the pressure chamber of forward clutch 41 through the forward clutch pressure line 122 via the lock-up control valve 59 and the servo release pressure chamber (S/R) 44b of 2-4 brake 44 through the pressure lines 123 and 141 via the first shift valve 56. Resultingly, the locking of forward clutch 41 and the unlocking of 2-4 brake 44 are simultaneously caused. During this, the third duty solenoid valve 68 duty-controls the servo apply pressure with the effect of performing unlocking smoothly the 2-4 brake.

As shown in FIG. III, during the down-shift from the forth (4) gear to third (3) gear in a power-off mode in which the forward clutch 41 locks, the first solenoid valve 61 turns OFF, forcing the first shift valve to shift the spool to the left end position. The operating pressure having been accumulated in the accumulator in the fourth (4) gear is delivered to the pressure chamber of forward clutch 41. This results in shortening a time necessary to fill the pressure chamber of forward clutch 41 and the forward clutch pressure line 122 with the operating pressure and, as a result, enabling the forward clutch to lock quickly.

Figure 9:
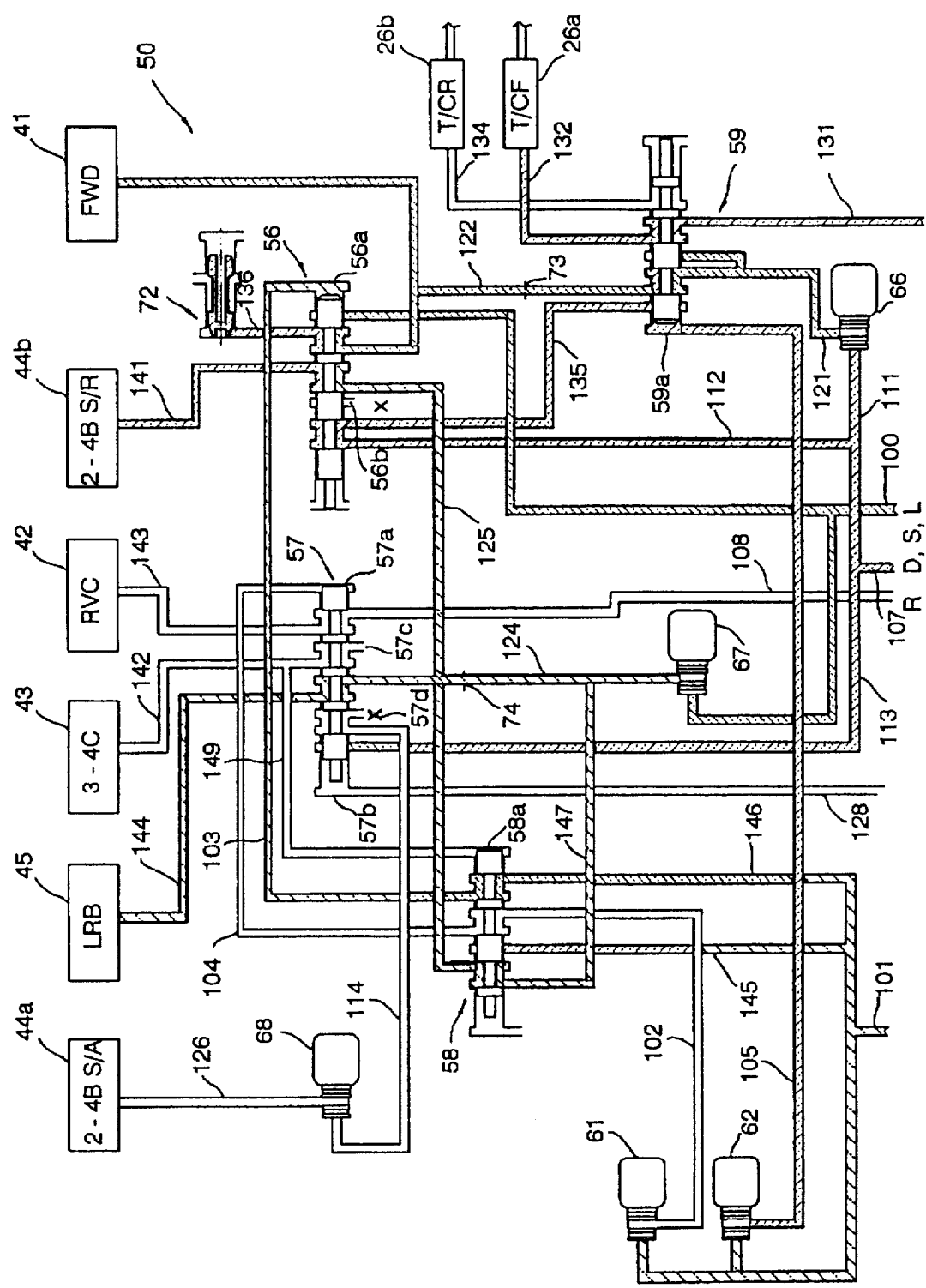
FIG. 9 is an enlarged view of an essential part of the hydraulic control circuit of FIG. 3 which provides a first gear in a low speed (L) range.

As shown in Table IV and in FIG. 9, in the same manner as in the first gear in the drive (D) range, the first solenoid valve 62 delivers the solenoid pressure to the control port 59a of lockup control valve 59, forcing the lock-up shift valve to shift the spool to the right end position. The duty solenoid valve 66 delivers the line pressure supplied through the pressure lines 107 and 111 to the forward clutch (FWD) 41 through the forward clutch pressure line 122 as the forward clutch pressure, locking the forward clutch 41. Simultaneously, the first solenoid valve 61 turns ON with a result of draining the pressure in the downstream pressure line, forcing the second shift valve 57 to shift the spool to the right end position. The second duty solenoid valve 67 delivers the line pressure to the low reverse brake pressure line 144 and servo release pressure line 141. Resultingly, in the first (1) gear in the low speed (L) range, both forward clutch 41 and low reverse brake 45 are simultaneously locked, creating the first (1) gear having the effect of engine brake.

Figure 10:
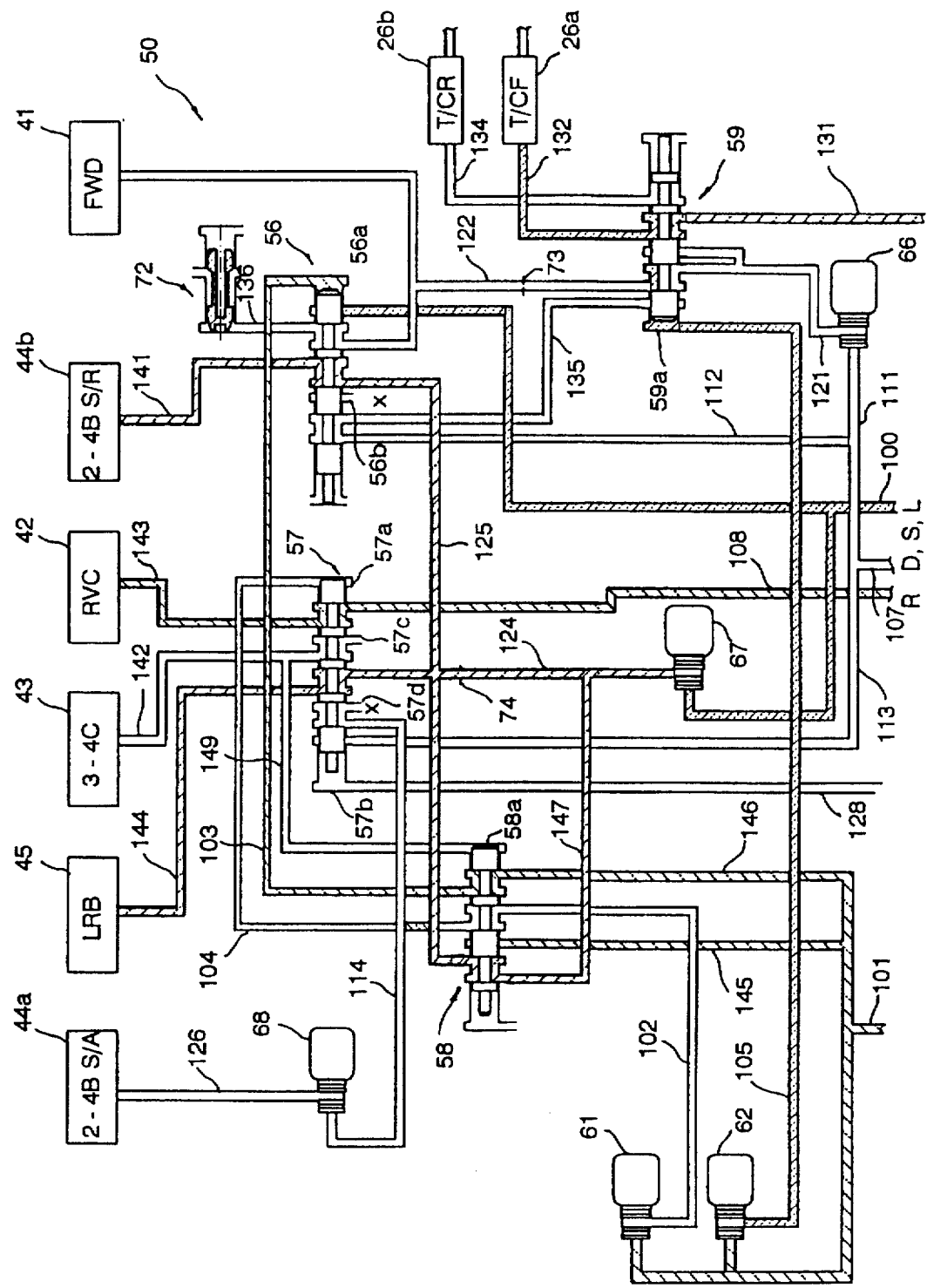
FIG. 10 is an enlarged view of an essential part of the hydraulic control circuit of FIG. 3 which provides a reverse gear.

As shown in Table V and in FIG. 10, in the same manner as in the first (1) gear in the low speed (L) range, the second duty solenoid valve 67 delivers the line pressure to the low reverse brake pressure line 144 and servo release pressure line 141, by means of which the low reverse brake 45 is locked. Simultaneously, the line pressure is introduced into the reverse pressure line 108 leading from the manual shift valve 52 and then delivered to the reverse clutch pressure line 143 passing through the second shift valve 57. Resultingly, the reverse clutch 42 is supplied with the operating pressure. In this manner, locking is caused on both low reverse brake 45 and reverse clutch 42. In this instance, since the line pressure is not introduced into the forward pressure line 107 in the reverse (R) range, the forward clutch 41 is in no way supplied with operating pressure in spite of the operated condition of the first duty solenoid valve 66.

Figure 11:
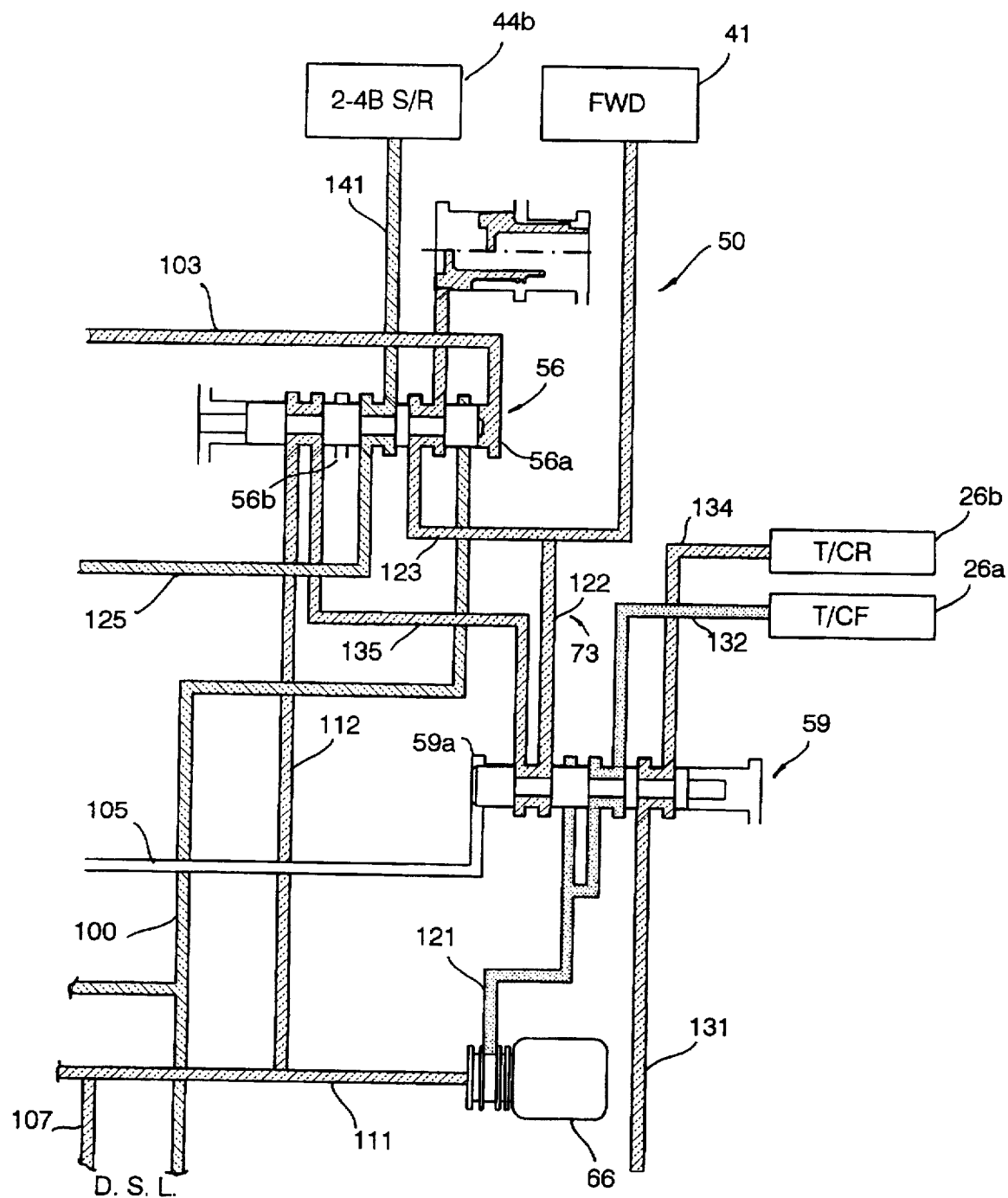
FIG. 11 is an enlarged view of an essential part of the hydraulic control circuit of FIG. 3 which provides lock-up control in the third gear.
Figure 12:
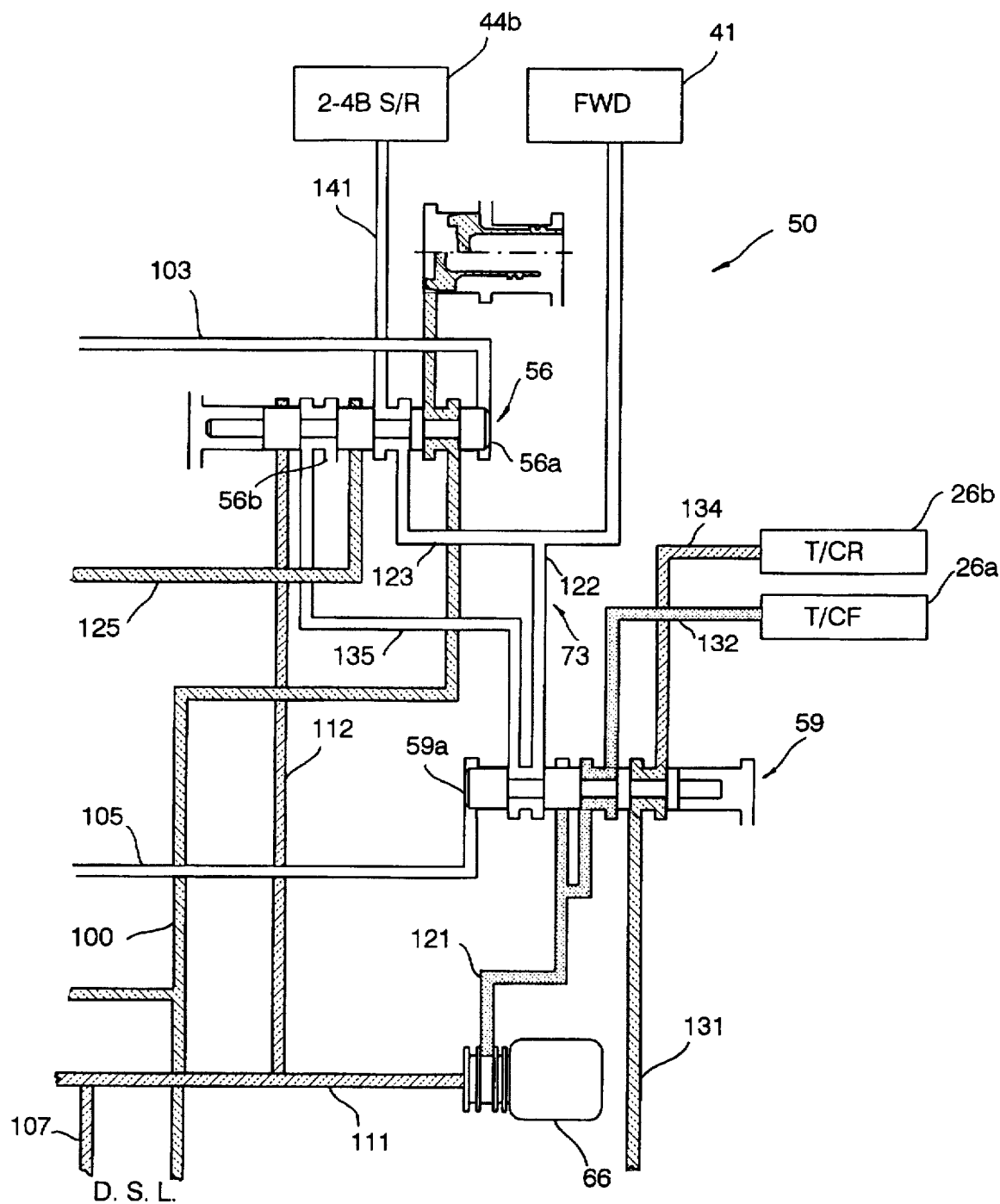
FIG. 12 is an enlarged view of an essential part of the hydraulic control circuit of FIG. 3 which provides lock-up control in the fourth gear.

As shown in Table VI and in FIGS. 11 and 12, when the lock-up control takes place in the third (3) gear, the second solenoid valve 62 turns ON with a result of draining the lock-up control valve 59 at the control port 59a, forcing the lock-up control valve 59 to shift the spool to the left end position. Communication is provided between the pressure line 121 downstream from the first duty solenoid valve 66 and pressure line 132 leading to the front pressure chamber (T/CF) 26a of lock-up clutch 26, and between the converter pressure line 131 pressure line 134 leading to the rear pressure chamber (T/CR) 26b of lock-up clutch 26. Simultaneously, the first duty solenoid valve 66 is drained at the downstream side. Resultingly, while the lock-up clutch 26 is supplied with the converter pressure to the rear pressure chamber (T/CR) 26b, it is drained from the front pressure chamber (T/CF) 26a, becoming locked. During the lock-up control, the line pressure is introduced into the forward clutch pressure line 122 from the forward pressure line 107 through pressure lines 122 and 135 via the first shift valve 56, holding the forward clutch 41 locked.

With the hydraulic control circuit 50 equipped with the source pressure supply line 135, even while the first duty solenoid valve 66 executes the lock-up control, the forward clutch 41 is supplied with locking pressure through the forward clutch pressure line 122 from the source pressure supply line 135.

During the control of transitional operation of the lock-up clutch 26 between locked and unlocked conditions (3–3L/U) and during the control of slippage of the lock-up clutch 26, the first duty solenoid valve 66 duty-controls of the locking pressure to the front pressure chamber 26a of lock-up clutch 26, performing the lock-up control and slippage control.

When the lock-up control is made in the fourth (4) gear, in the same manner as in the third (3) gear, the second solenoid valve 62 turns ON, draining the lock-up control valve 59 at the control port 59a. Resultingly, as shown in FIG. 12, the lock-up shift valve 59 shifts the spool to the left end position, providing communication between the forward clutch pressure line 122 and source pressure supply line 135, between the pressure line 121 downstream from the first duty solenoid valve 66 and pressure line 132 leading to the front pressure chamber 26a of lock-up clutch 26, and between the converter pressure line 131 and pressure line 134 leading to the rear pressure chamber 26b of lock-up clutch 26. Simultaneously, the first duty solenoid valve 66 drains the downstream side.

Since the first shift valve 56 holds the spool in the right end position, the source pressure line 135 also holds the communication with the drain port 56b of first shift valve 56. Accordingly, the converter pressure is supplied to the rear pressure chamber 26b of lock-up clutch 26 and locks the lock-up clutch 26. In this instance, the forward clutch pressure 122 is brought into communication with the drain port 56b of first shift valve 56 through the source pressure supply line 135, unlocking the forward clutch 41.

With the hydraulic control circuit 50 thus structured, even while the first duty solenoid valve 66 performs the lock-up control, the forward clutch 41 is unlocked without any difficulty by means of shifting the spool of first shift valve 56. In this instance, during the control of transitional operation of the lock-up clutch 26 between locked and unlocked conditions (4–4L/U) and during the control of slippage of the lock-up clutch 26, the first duty solenoid valve 66 duty-controls of the locking pressure to the front pressure chamber 26a of lock-up clutch 26, performing the lock-up control and slippage control.

In the hydraulic control circuit 50, if the lock-up clutch 26 is in the locked condition before the third (3) gear to fourth (4) gear shift, in order for the first duty solenoid valve 66 to hold the communication with the front pressure chamber 26a of lock-up clutch 26, the drain port 56a of first shift valve 56 is brought into communication with the source pressure supply line 135 so as to drain the pressure chamber of forward clutch (FWD) 41. On the other hand, if the lock-up clutch 26 is in the unlocked condition before the third (3) gear to fourth (4) gear shift, in order to reduce shift shock, the first duty solenoid valve 66 adjusts a timing of draining the pressure chamber of forward clutch (FWD) 41.

For the purpose of certainly reducing shift shock during the fourth (4) to third (3) gear shift, while the lock-up control is prohibited during the fourth (4) to third (3) gear shift, the first duty solenoid valve 66 controls the operating pressure with a high accuracy.

As described above, the hydraulic control circuit 50 is able to provide selectively the communication of first solenoid valve 61 with the first shift valve 56 and the second shift valve 57 according to the operating pressure of 3-4 clutch 43, in other words, according to whether a gear shift is made to high gears or low gears. The first solenoid valve 61 supplies operating pressure to the first shift valve 56 or the second shift valve 57 at a timing that it is brought into communication with. The first solenoid valve 61 is available commonly to the first shift valve 56 and second shift valve 57 which does not simultaneously function, enabling the hydraulic control circuit 50 to be simple in structure, to be spaceless and to be manufacturable at low costs.

Figure 13:
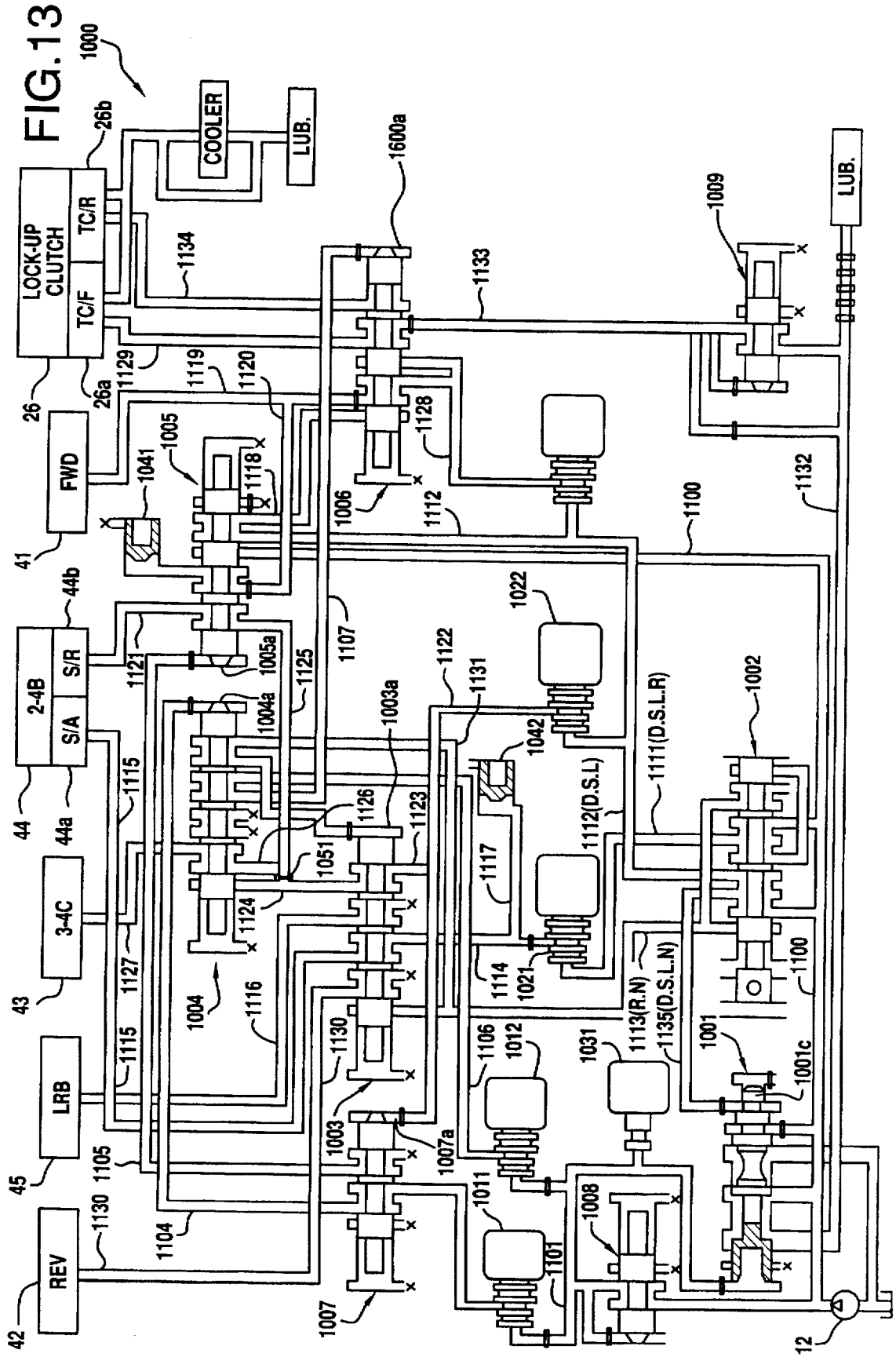
FIG. 13 is a diagrammatic view of a hydraulic control circuit according to another embodiment of the present invention.

FIG. 13 shows a basic structure of a hydraulic pressure control circuit 1000 in accordance with another embodiment of the present invention, in which friction coupling elements and various valves per se are the same in structure and operation. The hydraulic pressure control circuit 1000 includes various valves as essential elements, namely a regulator valve 1001 for generating a line pressure (control source pressure), a manual shift valve 1002 for shifting ranges of the automatic transmission 10 according to manual range selections through a shift lever, first to third shift valves 1026–1028 (which are hereafter referred to as first to third duty solenoid valves (DSVs)) for changing pressure lines according to gears, first and second solenoid valves 1011 and 1012 (which are hereafter referred to as first and second solenoid valves (SVs), respectively, for simplicity) utilized to supply actuating or operating pressure to various shift valves, including a low reverse shift valve 1003, a bypass control valve 1004, a 3-4 shift valve 1005 and a lock-up control valve 1006. The first to third duty solenoid valves 1021–1023 are utilized to generate, regulate and discharge operating pressure to pressure chambers of the friction coupling elements 41–45. The hydraulic pressure control circuit 1000 further includes a solenoid relay valve (which is hereafter referred to simply as a relay valve) 1007 for selectively supplying operating pressure introduced from the first solenoid valve 1011. Those solenoid valves 1011, 1012 and 1021–1023 are of a three-way type having operating modes, namely a communication mode where hydraulic pressure is allowed to flow in a pressure line from the upstream side to the downstream side and vice versa and a drain mode where hydraulic pressure is drawn from the downstream pressure line. In the drain mode, since the valve shuts off its related upstream pressure line during draining hydraulic pressure from the downstream pressure lines, there is no aimless drainage of hydraulic pressure from the upstream pressure line, decreasing driving loss of the oil pump 12. Each of the solenoid valves 1011 and 1012 opens the upstream and downstream pressure lines when it turns ON. Each of the duty solenoid valves 1021–1023 provides its full opening so as to allow the whole part of pressure to run therethrough when it turns OFF or operates at a duty rate of 0%.. On the other hand, when each duty solenoid valve 1021–1023 turns ON, it shuts off its elated upstream pressure line so as to drain the downstream pressure line during operating at a duty rate of 100% and regulates operating pressure from the upstream pressure line according to duty rates at which it operates and delivers it to the downstream pressure line.

The regulator valve 1001 regulates operating pressure discharged by the oil pump 12 to a fixed level of line pressure which in turn is delivered to the manual shift valve 1002 through a main pressure line 1100 and also to a solenoid reducing valve (which is hereafter referred to simply as a reducing valve) 1008 and the 3-4 shift valve 1005. The line pressure is reduced by the reducing valve 1008 to a fixed pressure level and then, delivered to the first and second solenoid valves 1011 and 1012 through pressure lines 1101 and 1102, respectively. When the first solenoid valve 1011 is ON, the fixed level of line pressure is delivered to the relay valve 1007 through a pressure line 1103 and, when the relay valve holds its spool in the right end position as viewed in FIG. 13, further directed to the control port 1004a of bypass control valve 1004 as pilot pressure through a pressure line 1104. As a result, the bypass control valve 1004 shifts its spool to the left end position as viewed in FIG. 13. On the other hand, when the relay valve 1007 holds the spool in the left end position, the fixed level of line pressure is delivered to the control port 1005a of 3-4 shift valve 1005 as a pilot pressure through a pressure line 1105 and forces the 3-4 shift valve 1005 to shift the spool to the right end position.

When the second solenoid valve 1012 is ON, the fixed level of line pressure from the reducing valve 1008 is delivered to the bypass control valve 1004 through a pressure line 1006 and, when the bypass control valve 1004 holds its spool in the right end position, further directed to the control port 1006a of lock-up control valve 1006 as pilot pressure through a pressure line 1107. This causes the lock-up control valve 1006 to shift the spool to the left end position. On the other hand, when the bypass control valve 1004 holds the spool in the left end position, the fixed level of line pressure is delivered to the control port 1003a of low-reverse shift valve 1003 as a pilot pressure through a pressure line 1105 and forces the valve 1003 to shift the spool to the left end position.

Further, the fixed level of line pressure from the reducing valve 1008 is also delivered to a regulation port 1001a of regulator valve 1001 through a pressure line 1109. In this instance, the line pressure is regulated according to, for instance, engine load by means of a linear solenoid valve 1031 installed in the pressure line 1109. In this way, the line pressure is regulated according to engine load by means of the regulator valve 1001. A main pressure line 1100 leading to the 3-4 shift valve 1005 is held in communication with a first accumulator 1041 through pressure line 1110 when the 3-4 shift valve holds its spool in the right end position, so as to introduce line pressure into the first accumulator 1041.

The line pressure delivered to the manual shift valve 1002 through the main pressure line 1100 is introduced into a first output pressure line 1111 and a second output pressure line 1112 in each of forward ranges, i.e. the drive (D) range, slow speed (S) range and low speed (L) range, into the first output pressure line 1111 and a third output pressure line 1113 in the reverse (R) range, and into the third output pressure line 1113 in the neutral (R) range. The first output pressure line 1111 leads to the first duty solenoid valve 1021 and delivers the line pressure to the same as control source pressure. The second output pressure line 1112 leads to both second duty solenoid valve 1022 and third duty solenoid valve 1023 so as to supply the line pressure to them as control source pressure. The first duty solenoid valve 1021 leads at its downstream to the low-reverse shift valve 1003 through a pressure line 1114 and, when the low-reverse shift valve 1003 holds the spool in the right end position, further holds itself in communication with the servo apply pressure chamber 44a of 2-4 brake 44 through a servo apply pressure line 1115 and on the other hand, when the low-reverse shift valve 1003 holds the spool in the left end position, further holds itself in communication with the pressure chamber 44a of low-reverse brake 45 through a low-reverse pressure line 1116. A pressure line 1117 branches off from the pressure line 1114 and leads to a second accumulator 1042.

The first output pressure line 1112 further leads to the 3-4 shift valve 1005 and, when the 3-4 shift valve 1005 holds the spool in the left end position, keeps communication with the lock-up control valve 1006 through a pressure line 1118. When the lock-up control valve 1006 shifts its spool to the left end position, it brings the first output pressure line 1112 into communication with the pressure chamber of forward clutch (FWD) 41 through a pressure line 1119.

A pressure line 1120, which branches off from the forward clutch pressure line 1119, leads to the 3-4 shift valve 1005. The 3-4 shift valve 1005 provides communication of the pressure line 1120 with the first accumulator 1041 through the pressure line 1110, when holding its spool in the left end position and, when holding its spool in the right end position, communication of the pressure line 1120 with the servo release pressure chamber 44b of 2-4 brake 44.

The duty solenoid valve 1022 leads at its downstream side to the control port 1007a of relay valve 1007 through a pressure line 1122 and supplies pilot pressure with which the relay valve 1007 is forced to shift its spool to the left end position. A pressure line 1123 branching off from the pressure line 1122 leads to the low-reverse shift valve 1003. The low-reverse shift valve 1003 provides, when holding the spool in the right end position, communication of the pressure line 1123 with a pressure line 1124. Branching off from the pressure line 1124 through an orifice 1051 is a pressure line 1125 which in turn leads to the 3-4 shift valve 1005. The 3-4 shift valve 1005 provides, when holding the spool in the left end position, communication of the pressure line 1125 with the servo release pressure chamber 44b of 2-4 brake 44 through the pressure line 1121. Further, a pressure line 1126 branches off from the pressure line 1125 and leads to the bypass control valve 1004. The bypass control valve 1004 provides, when holding the spool in the right end position, communication of the pressure line 1126 with the 3-4 clutch 43 through a pressure line 1127.

The pressure line 1124 leads directly to the bypass control valve 1004 which in turn provides communication of the pressure line 1124 with the pressure line 1125 through the pressure line 1126 when holding the spool in the left end position. That is, the pressure lines 1124 and 1125 form a bypass pressure line in connection with the orifice 1051.

The third duty solenoid valve 1023 leads at the downstream side to the lock-up control valve 1006 through the pressure line 1128. The lock-up control valve 1006 provides communication of the third duty solenoid valve 1023 with the forward clutch pressure line 1119 when holding the spool in the right end position and with the front pressure chamber 26a of lock-up clutch 26 through a pressure line 1129 when holding the spool in the left end position. Similarly, the pressure line 1131 branching off from the third output pressure line 1113 leads to the bypass control valve 1004. The bypass control valve 1004 delivers the line pressure to the control port of low-reverse shift valve 1003 as pilot pressure through the pressure line 1108 during holding the spool in the right end position, forcing the low-reverse shift valve 1003 to shift the spool to the left end position.

The hydraulic pressure control circuit 1000 is further provided with a converter relief valve 1009 which regulates the operating pressure introduced from the regulator valve 1001 through a pressure line 1132 to a fixed level and supplies it to the lock-up control valve 1006 through a pressure line 1133. The fixed level of operating pressure is delivered to the front pressure chamber 26a of lock-up clutch 26 through the pressure line 1129 when the lock-up control valve 1006 shifts the spool to the right end position and, on the other hand, to the rear pressure chamber 26b of lock-up clutch 26 through the pressure line 1134 when the lock-up control valve 1006 shifts the spool to the left end position. In this instance, the lock-up clutch 26 is released or unlocked resulting from filling the front pressure chamber 26a with the fixed level of operating pressure and locked resulting from filling the rear pressure chamber 26b with the fixed level of operating pressure. When the lock-up control valve 1006 holds the spool in the left end position during locking the lock-up clutch 26, the lock-up clutch 26 can locks with locking force according to the level of the operating pressure generated by the third duty solenoid valve 1023 which the lock-up clutch 26 receives in the front pressure chamber 26a.

Figure 14:
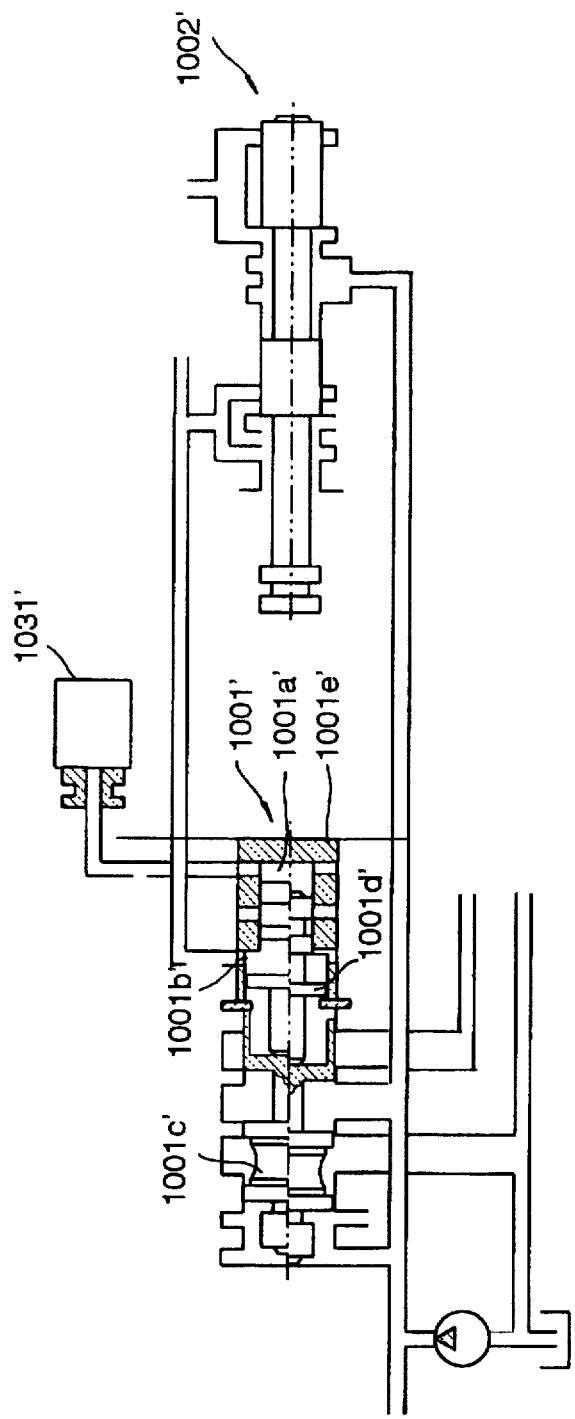
FIG. 14 is a circuit diagram of a regulator valve of the hydraulic control circuit of FIG. 13.

As was previously described, in the hydraulic pressure control circuit 1000, the regulator valve 1001 regulates the line pressure with the control pressure supplied by the linear solenoid valve 1031 to a level according, for instance, to a throttle opening or position. This regulation of line pressure is made differently amongst different ranges. Specifically, the line pressure is regulated to a level higher in the reverse (R) range than in the forward respective (D, S and L) ranges and neutral (N) range. For this purpose, as shown by way of example in FIG. 14, a regulator valve 1001' is typically provided with an extra intensifying port 1001b' to which line pressure is introduced from a manual shift valve 1002' in the reverse range only as well as a regulation port 1001a' to which pilot pressure is introduced from a linear solenoid valve 1031'. Such an extra port 1001b' needs installation of an auxiliary spool and its guide sleeve to the regulator valve 1001' in addition to a primary spool 1001c', which always undesirable in the light of the number of parts and overall size of the valve.

In contradistinction to that, as shown in FIG. 13, the regulator valve 1001 utilized in the hydraulic pressure control circuit 1000 has, on one end of its spool, a regulation port 1001a to which pilot pressure is introduced from the linear solenoid valve 1031 and, on another end of the spool, a reduction port 1001b to which line pressure is introduced from the manual shift valve 1002 through the pressure line 1135 in each of the drive (D), slow speed (S), low speed (L) and neutral (N) ranges. This structure is intended to regulate line pressure not to a level higher in the reverse (R) range but to a level lower in the drive (D), slow speed (S), low speed (L) and neutral (N) ranges, with a result of divided arrangement of the control ports 1001a and 1001b on opposite sides of the spool 1001c which eliminates the necessity of an auxiliary spool and its associated parts.

Figure 15:
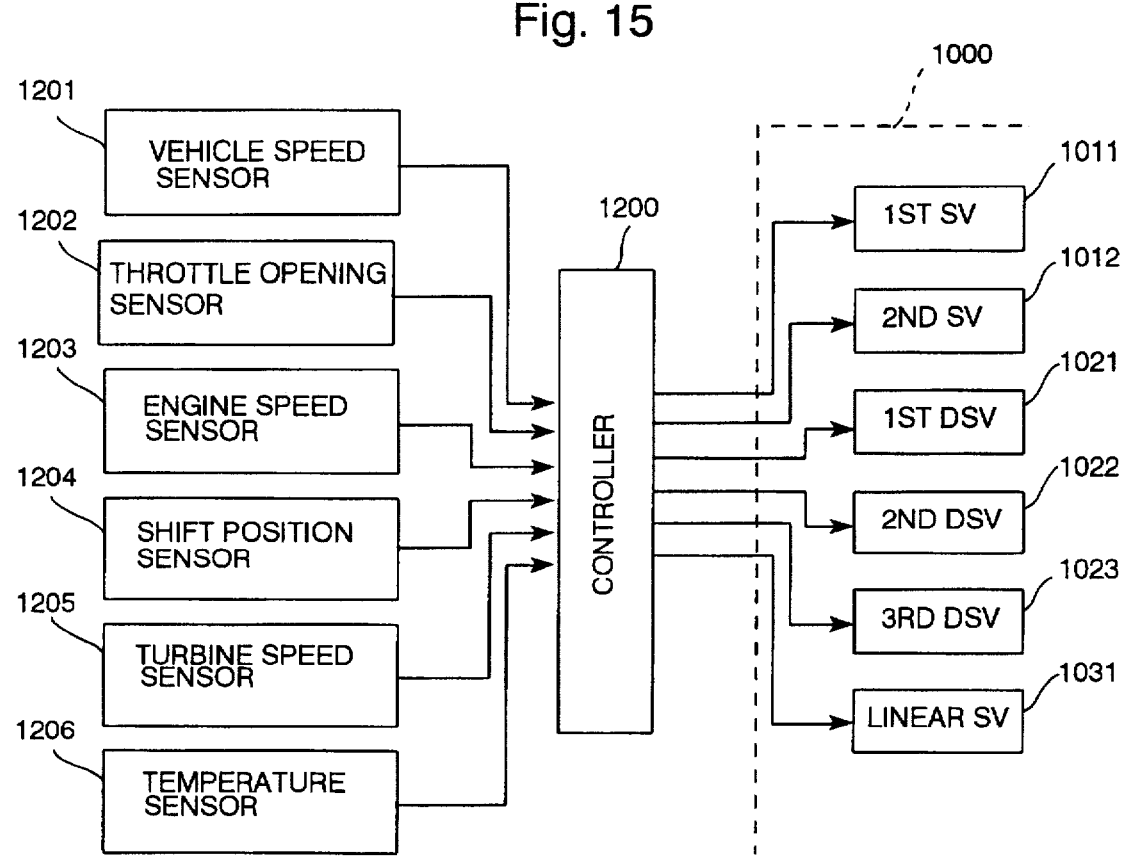
FIG. 15 is a block diagram illustrating a control system for various solenoid valves of the hydraulic control circuit of FIG. 13.

FIG. 15 shows a controller 1200 for controlling operations of the valves 1011, 1012, 1021–1023 and 1031. The controller 1200 receives various control signals, such as a signal representative of a vehicle speed from a speed sensor 1201, a signal representative of engine throttle position or opening as an engine load from a throttle opening sensor 1202, a signal representative of an engine speed in revolution from a speed sensor 1203, a signal representative of a shift position or range selected by a shift lever from a position sensor 1204, a signal representative of a turbine speed (Nt) in revolution of the torque converter 20 from a speed sensor 1205, and a signal representative of temperature of hydraulic oil in the control circuit 1000 from a temperature sensor 1206, on the basis of which the controller 1200 controls the valves 1011, 1012, 1021–1023 and 1031 according to engine operating conditions and/or vehicle traveling conditions.

The following description will be directed to operation of the solenoid valves 1011, 1012 and duty solenoid valves 1021–1023 in connection with gears and ranges.

The valves 1011, 1012 and 1021–1023 operate in various patterns for the respective gears as shown in the following Table VII. In Table VII, a circle indicates the ON or activated state of each solenoid valve 1011, 1012, and the OFF state or deactivated state of each duty solenoid valve 1021–1023, where pressure lines upstream and downstream from the related valve are held in communication with each other so as to allow operating pressure to pass therethrough; a cross or X label indicates the OFF or deactivated state of each of the solenoid valve 1011, 1012 and the ON or activated state of each of the duty solenoid valve, where an upstream pressure line from the related valve is shut off and a downstream pressure line is drained.

TABLE VII

| Range | D (S) | | | | L | R |
|---|---|---|---|---|---|---|
| Gear | 1 | 2 | 3 | 4 | 1 | Reverse |
| 1st SV (1011) | X | X | X | O | O | O |
| 2nd SV (1012) | X | X | X | X | O | O |
| 1st DSV (1021) | X | O | O | O | O | O |
| 2nd DSV (1022) | X | X | O | O | X | O |
| 3rd DSV (1023) | O | O | O | X | O | O |

Figure 16:
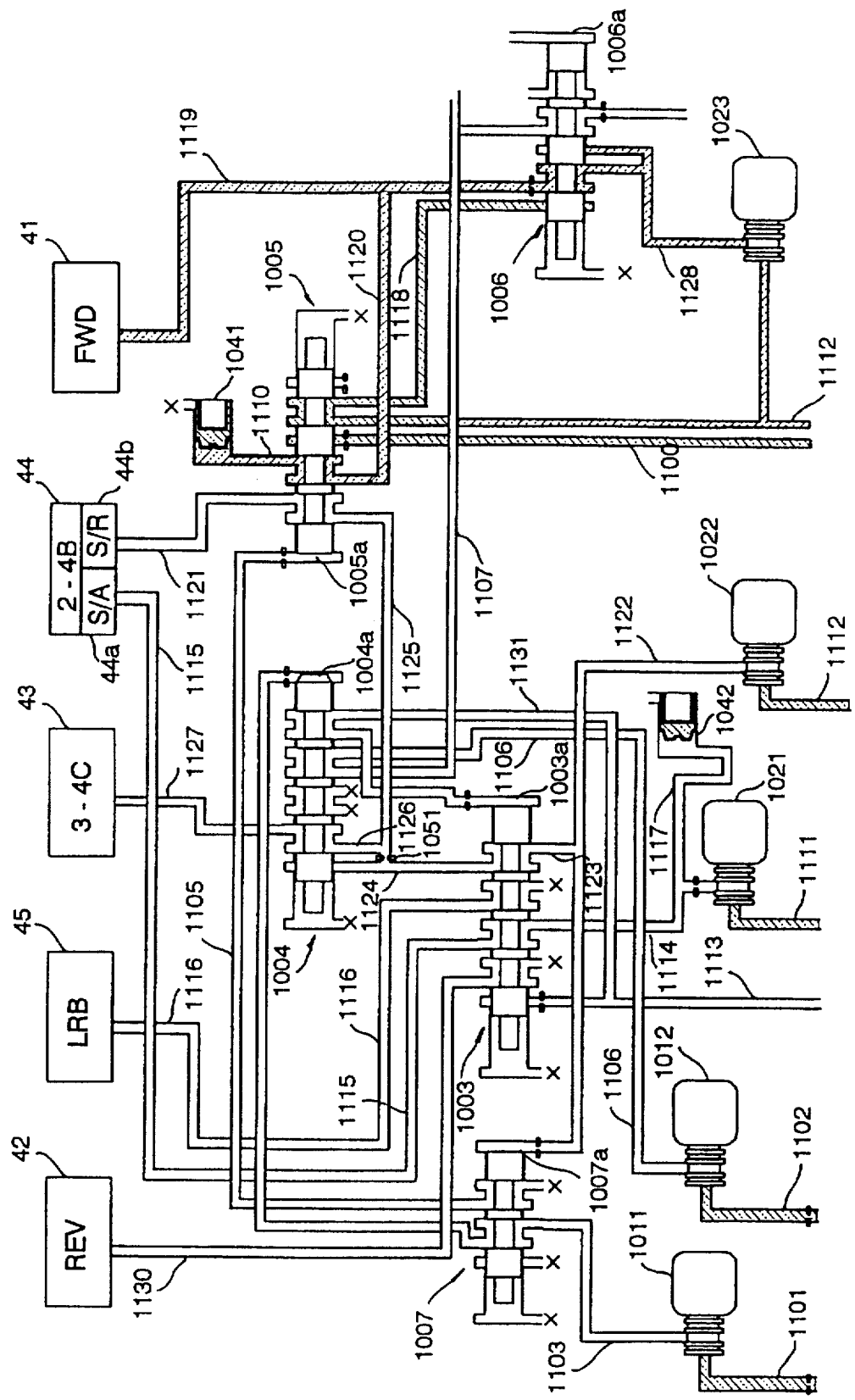
FIG. 16 is an enlarged view of an essential part of the hydraulic control circuit of FIG. 13 which provides a first gear.

As shown in Table VII and in FIG. 16, in the first (1) gear in the forward ranges excepting the low-speed (L) range, only the third duty solenoid valve 1023 is activated or takes its ON state, making the line pressure in the second output pressure line 1112 available and delivering it to the lock-up control valve 1006 through the pressure line 1128 as operating pressure. In this state, the lock-up control valve 1006 holds its spool in the right end position as viewed in FIG. 16, directing the operating pressure to the forward clutch (FWD) 41 through the forward clutch pressure line 1119. Consequently, the forward clutch (FWD) 41 locks. At this time, the first accumulator 1041, in communication with the 3-4 shift valve 1005 to which the pressure line 1120 branching off from the pressure line 1119 and the pressure line 1110 lead, causes the locking pressure to be delivered gradually to the forward clutch (FWD) 41.

Figure 17:
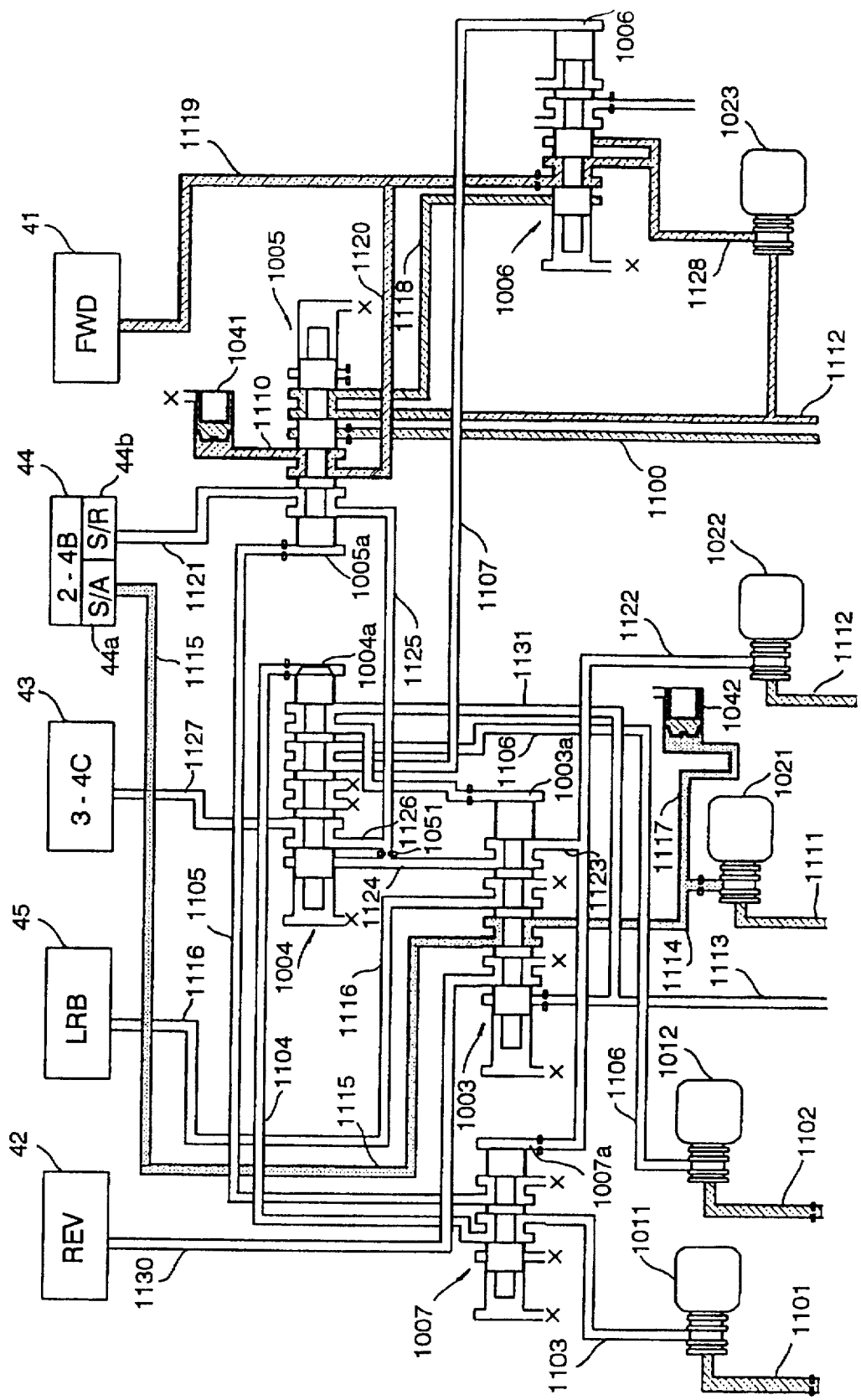
FIG. 17 is an enlarged view of an essential part of the hydraulic control circuit of FIG. 13 which provides a second gear.

As shown in Table VII and in FIG. 17, in the second (2) gear in the forward ranges excepting the low-speed range, the first duty solenoid valve 1021 is activated or takes its ON state as well as the third duty solenoid valve 1023, making the line pressure in the first output pressure line 1111 available and delivering it to the low-reverse shift valve 1003 through the pressure line 1114. At this time, since the row-reverse shift valve 1003 has placed the spool in the right end position as viewed in FIG. 17, it directs the operating pressure as servo applying pressure to the servo apply pressure chamber (S/A) 44a of 2-4 brake (2-4B) 44 through the servo apply pressure line 1115. As a result, the 2-4 brake (2-4B) 44, in addition to the forward clutch (FWD) 41, locks. The second accumulator 1042, which is in communication with the pressure line 1114 through the pressure line 1117, causes locking of 2-4 brake (2-4B) 54 gently. The operating pressure accumulated temporarily in the second accumulator 1042 is delivered to and pre-charged in the low-reverse brake (L/R) 45 when the low-reverse valve 1002 shifts its spool to the left end position upon a gear shift to the first (1) gear in the low-speed (L) range as will be described later.

Figure 18:
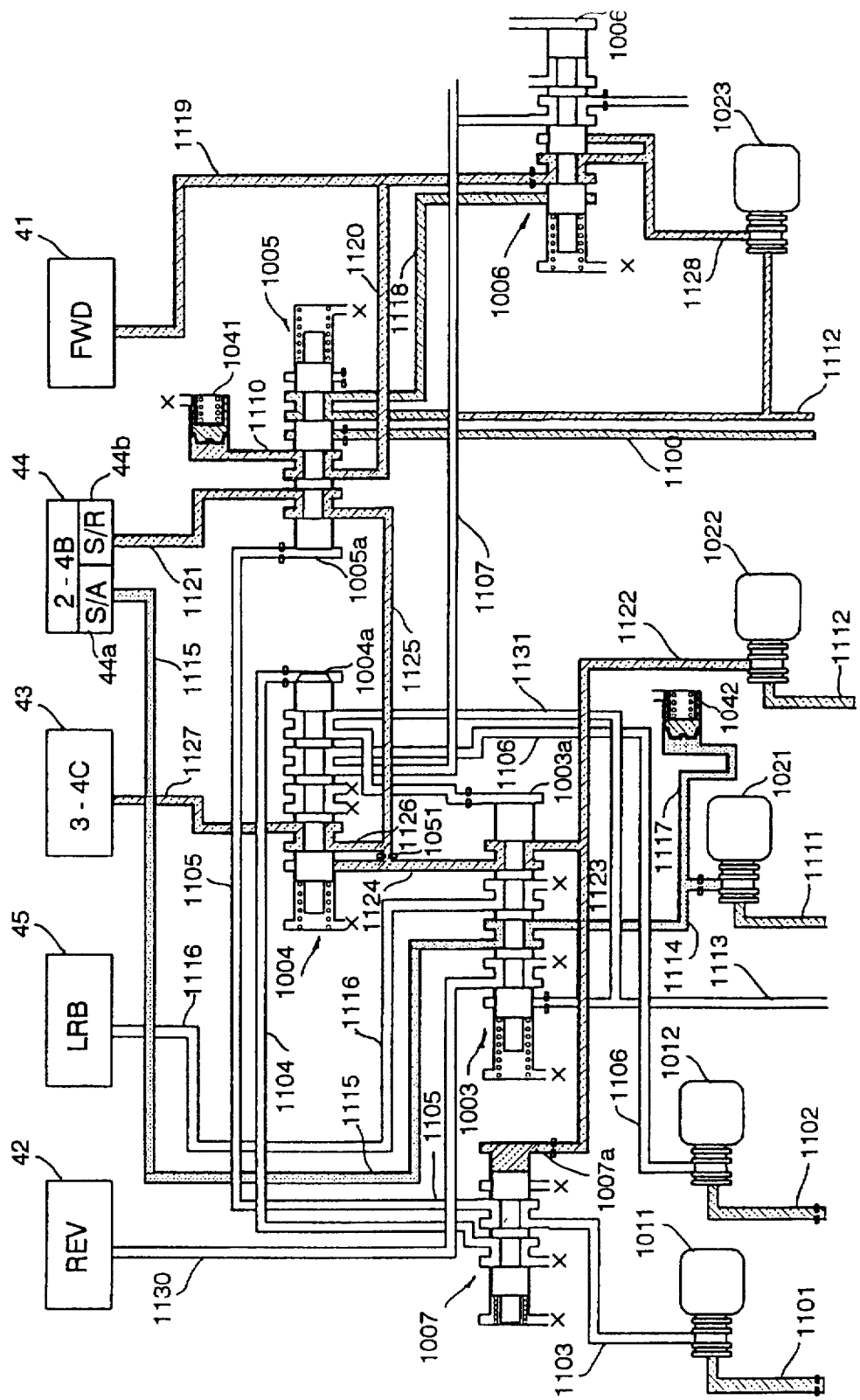
FIG. 18 is an enlarged view of an essential part of the hydraulic control circuit of FIG. 13 which provides a third gear.

As shown in Table VII and in FIG. 18, in the third (3) gear, the second duty solenoid valve 1022 is activated or takes its ON state as well as the first and third duty solenoid valves 1021 and 1023, making the line pressure in the second output pressure line 1112 available and delivering it to the low-reverse shift valve 1003 through the pressure line 1122 via the pressure line 1123. AT this time, the low-reverse shift valve 1003 has placed the spool in the right end position as viewed in FIG. 18, it introduces the line pressure to the pressure line 1124 as operating pressure. On the other hand, the operating pressure from the second duty solenoid valve 1022 is directed to the pressure line 1125 through the pressure lines 1122 and 1124 via the orifice 1051. Since, at this time, the 3-4 shift valve 1005 has placed the spool in the left end position, the operating pressure is supplied as servo release pressure to the servo release pressure chamber 44b of 2-4 brake (2-4B) 44 through the servo release pressure line 1121, releasing or unlocking the 2-4 brake (2-4B) 44. The pressure line 1126, branching off from the pressure line 1125 after the orifice 1051, directs the operating pressure to the bypass control valve 1004 which allows the operating pressure to pass through and reach the 3-4 clutch (3-4C) 43 through the 3-4 clutch pressure line 1127. In such a way, the selection of the 3rd gear causes, on one hand, the forward clutch (FWD) 41 and 3-4 clutch (3-4C) 43 to lock and, on the other hand, the 2-4 brake (2-4B) 44 to lock. In the third (3) gear, the second duty solenoid valve 1022 delivers the operating pressure to the relay valve 1007 at the control port 1007a, forcing the relay valve 1007 to shift the spool to the left end position.

Figure 19:
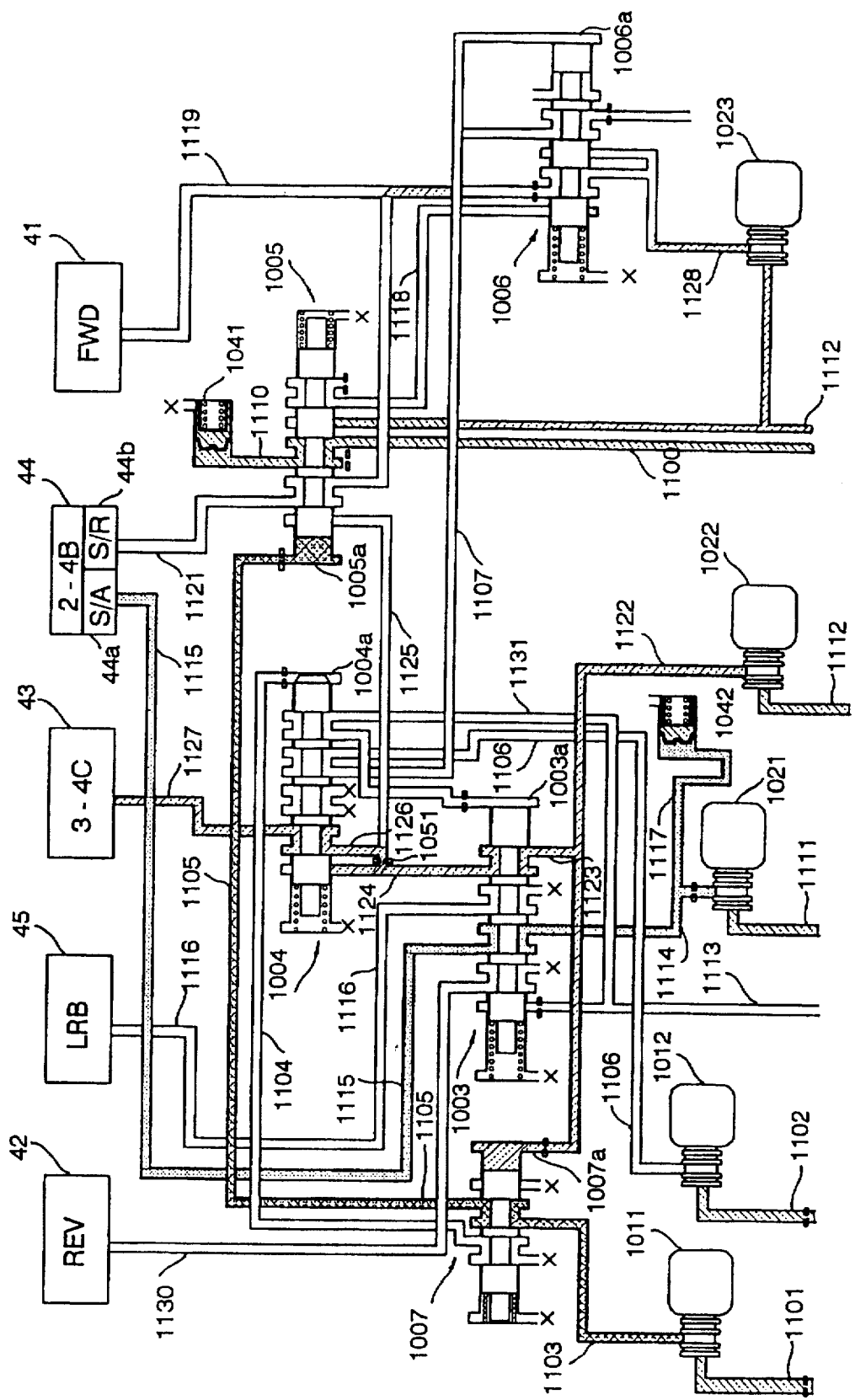
FIG. 19 is an enlarged view of an essential part of the hydraulic control circuit of FIG. 13 which provides a fourth gear.

As shown in Table VII and in FIG. 19, while the first and second duty solenoid valves 1021 and 1022 remain the ON states, the third duty solenoid valve 1023 is deactivated or takes the OFF state, and the first solenoid valve 1011 is activated or takes the ON state. When the first solenoid valve 1011 is activated, the fixed level of operating pressure in the pressure line 1101 is directed to the relay valve 1007 through the pressure line 1103. Since the relay valve 1007 has placed the spool in the left end position upon a gear shift to the third (3) gear, the fixed level of operating pressure passes therethrough and is directed to the control port 1005a of 3-4 shift valve 1005 through the pressure line 1105, forcing it to shift the spool to the right end position. Then, the 3-4 shift valve 1005 brings the pressure line 1120 branching off from the forward clutch pressure line 1119 into communication with the servo release pressure line 1121, providing communication between the pressure chamber of forward clutch (FWD) 41 and the servo release pressure chamber (S/R) 44b of 2-4 brake (2-4B) 44. By means of the deactivation of third duty solenoid valve 1023 which results in shutting down the operating pressure and draining the downstream side pressure line, the forward clutch (FWD) 41 and servo release pressure chamber (S/R) 44b of 2-4 brake (2-4B) 44 are drained through the lock-up control valve 1006 and pressure line 1128. In this way, while the forward clutch (FWD) 41 unlocks, the 2-4 brake (2-4B) 44 is coupled again.

Figure 20:
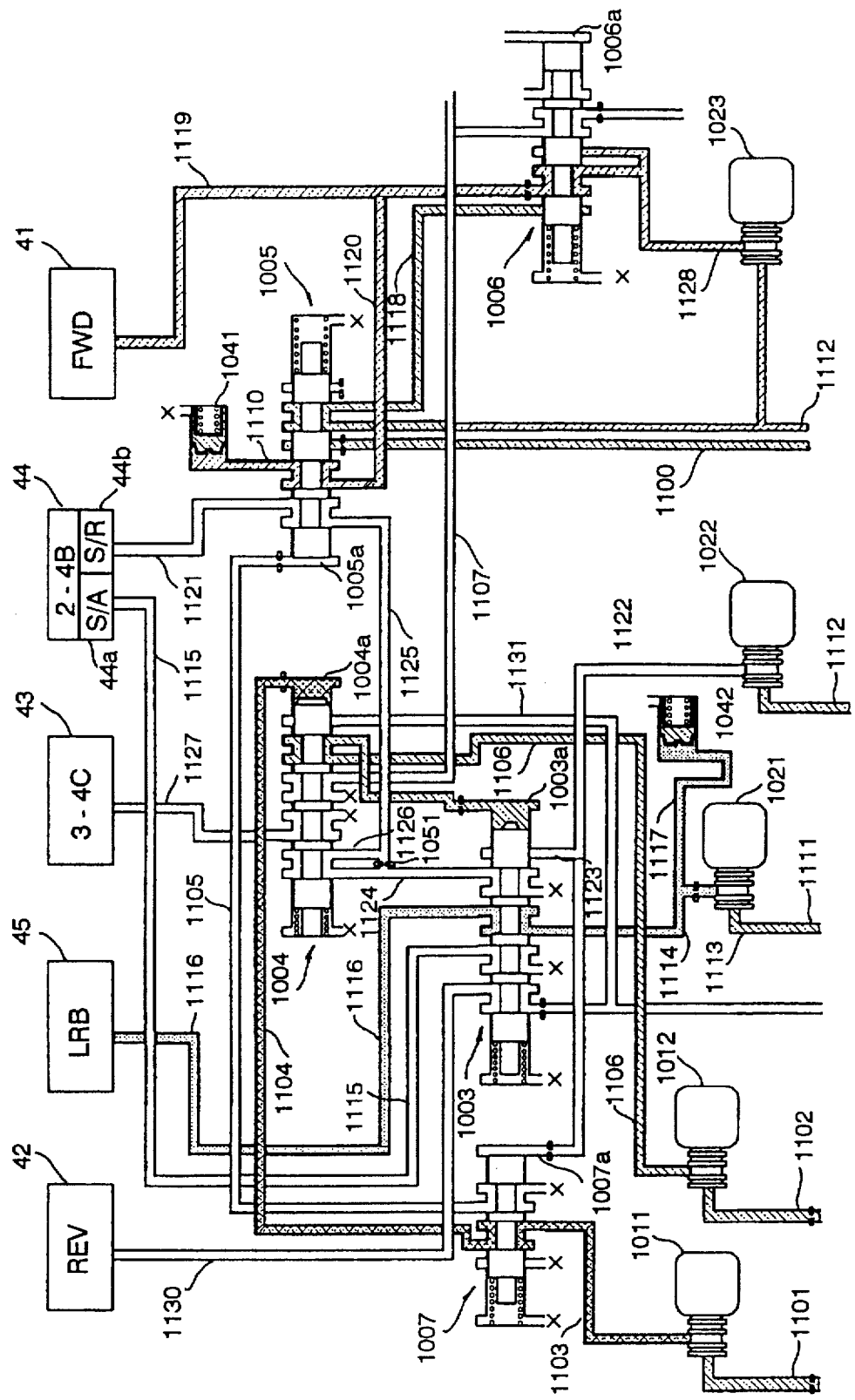
FIG. 20 is an enlarged view of an essential part of the hydraulic control circuit of FIG. 13 which provides a first gear in a low speed (L) range.

As shown in Table VII and FIG. 20, when the first (1) gear is selected in the low speed (L) range, the first and second solenoid valves 1011 and 1012 and first and third duty solenoid valves 1021 and 1023 are activated or take the ON states. The operating pressure regulated by the third duty solenoid valve 1023 is delivered as forward clutch pressure to the forward clutch (FWD) 41 through the pressure lines 1128 and 1119 via the lock-up control valve 1006 in the same way as when selecting the first (1) gear in the drive (D) range, locking the forward clutch (FWD) 41. At this time, the operating pressure is introduced into the first accumulator 1041 through the pressure lines 1110 and 1120 via the 3-4 shift valve 1005, causing the forward clutch (FWD) 41 to lock gently likely in the drive (D) range.

When the first solenoid valve 1011 is activated, the pilot pressure is delivered to the control port 1004a of bypass control valve 1004 through the pressure lines 1103 and 1104 and forces the bypass control valve 1004 to shift the spool to the left end position. The bypass control valve 1004 allows the operating pressure from the second solenoid valve 1012 to pass therethrough and is delivered to the low-reverse valve 1003 through the pressure line 1108, so as to cause the low-reverse valve 1003 to shift the spool to the left end position. Eventually, the operating pressure from the first duty solenoid valve 1021 is delivered as braking pressure to the low-reverse brake (LRB) 45 through the pressure line 1116 via the low-reverse shift valve 1003, locking the low-reverse brake (L/R) 45 as well as the forward clutch (FWD) 41. This provides the first (1) gear with an effect of engine brake.

Figure 21:
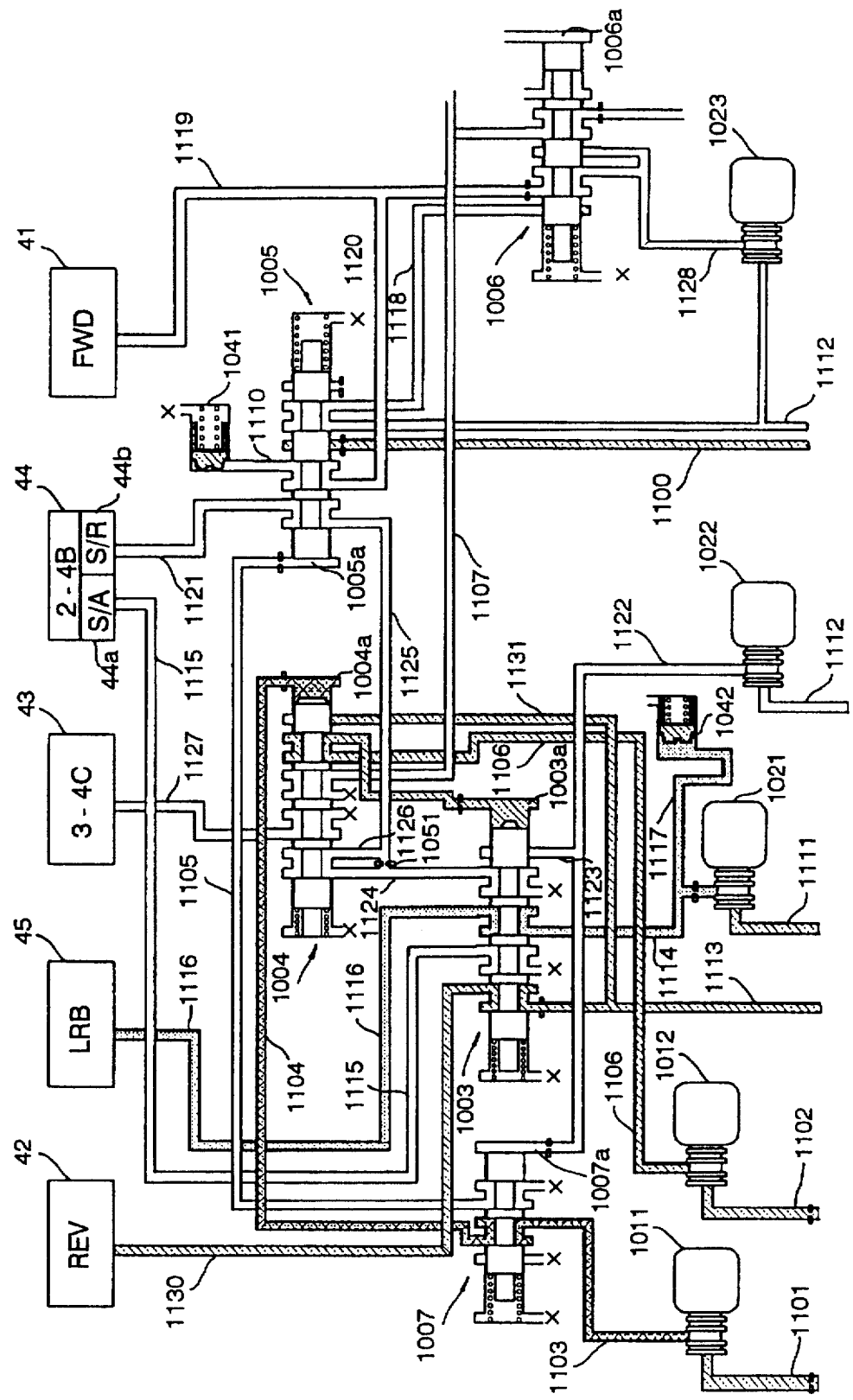
FIG. 21 is an enlarged view of an essential part of the hydraulic control circuit of FIG. 13 which provides a reverse gear.

As shown in Table VII and FIG. 21, when the reverse gear is selected, all of the solenoid valves 1011 and 1012 and 1021–1023 take the ON states. However, since there is no line pressure from the second output pressure line 1112 in the reverse (R) range, the second and third duty solenoid valves 1022 and 1023 do not develop any operating pressure. In the reverse (R) range, the first to third duty solenoid valves 1021–1023 are activated, causing the bypass control valve 1004 and low-reverse shift valve 1003 to shift the spools to their left end positions similarly in the first gear in the low-speed (L) range. In such a state, the first duty solenoid valve 1021 develops operating pressure and delivers it as braking pressure to the low-reverse brake (L/R) 45. However, in the reverse (R) range, the manual shift valve 1002 introduces the line pressure into the third output pressure line 1113 and delivers it to the reverse clutch (REV) 42 through the pressure line 1130 via the low-reverse shift valve 1003 with the spool placed in the left end position. In this way, the reverse clutch (RV) 42 and low-reverse brake (L/R) 45 are simultaneously locked. In this instance, since the line pressure is introduced into the third output pressure line 1113 via the manual shift valve 1002 even in the neutral (N) range, the reverse clutch (REV) 42 is locked in the neutral (N) range if the low-reverse shift valve 1003 has placed the spool in the left end position.

Figure 22:
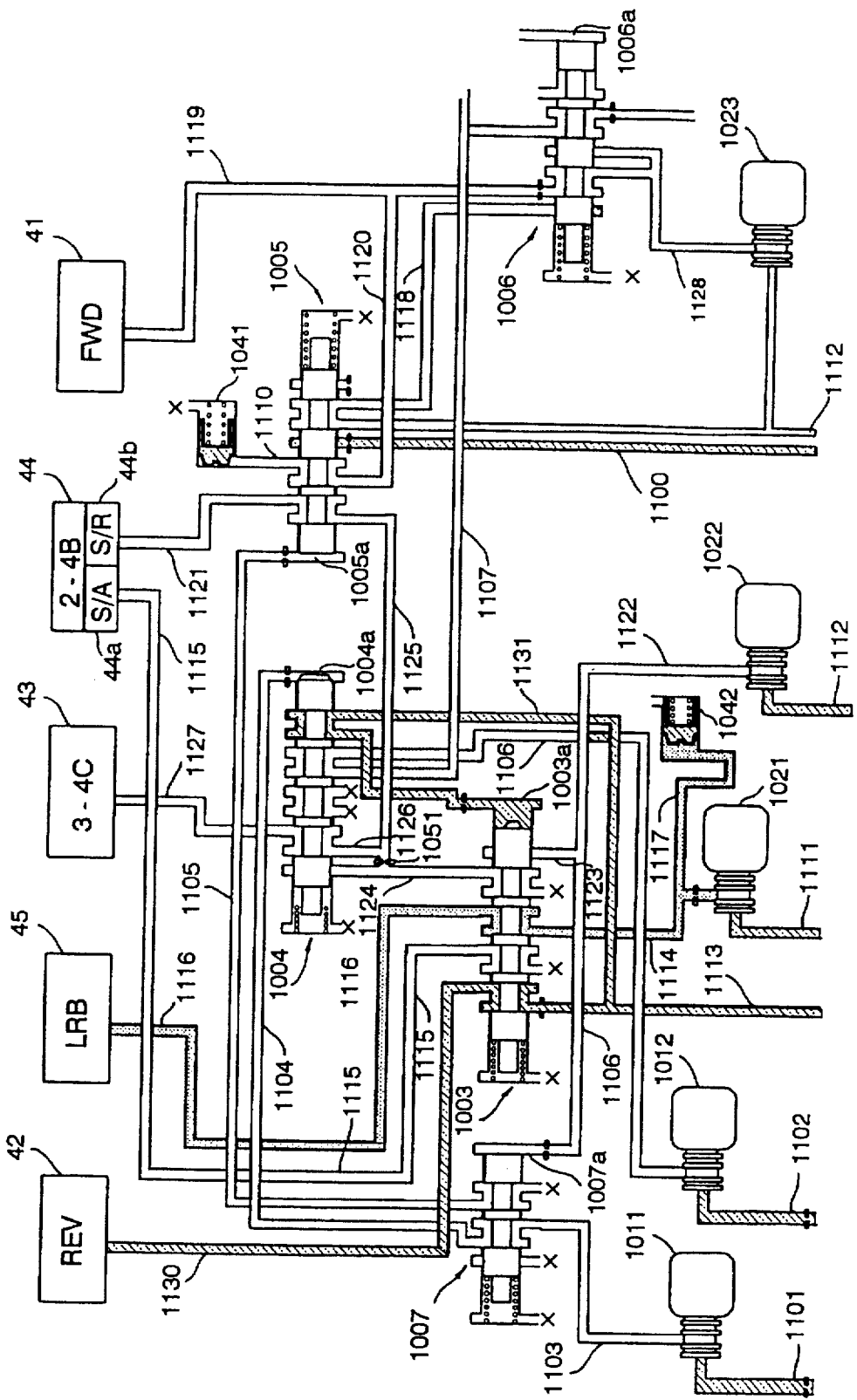
FIG. 22 is an enlarged view of an essential part of the hydraulic control circuit of FIG. 13 which provides fail-safe control for the reverse gear.

The hydraulic control circuit 1000 is equipped with a fail-safe feature that, in an event that either one of the solenoid valves 1011 and 1012 falls into inoperative conditions due, for instance, to electrical breakdowns, it detects the breakdown and deactivates another solenoid valve so as to allow the reverse gear to be available. For example, if the second solenoid valve 1012 has become inoperative, the pilot pressure is not delivered to the low-reverse shift valve 1003 through the pressure lines 1106 and 1108 via the bypass control valve 1004, so as to allow the low-reverse shift valve 1103 to shift the spool to the right end position, thereby disconnecting communication not only between the third output pressure line 1113 and reverse clutch pressure line 1130 but between the first duty solenoid valve 1021 and low reverse pressure line 1116. This makes the reverse gear unavailable. In such an event, the controller 1200 detects the breakage based, for instance, on a fact that a predetermined reduction rate is not provided in the reverse range, and provides a signal to the first solenoid valve 1011 for deactivation of the first solenoid valve Resultingly, as shown in FIG. 22, when such a signal is provided and deactivates the first solenoid valve 1011, the bypass control valve 1004 shifts the spool to the right end position so as to restore communication between the pressure line 1131 branching off from the third output pressure line 1113 and pressure line 1108 and to direct the line pressure to the low-reverse valve 1003 at the control port 1003a as pilot pressure. Consequently, the low-reverse shift valve 1003 forces the spool to the left end position, so as to bring the third output pressure line 1113 and first duty solenoid valve 1021 into communication with the reverse clutch pressure line 1130 and low-reverse pressure line 1116, respectively, thereby causing both reverse clutch (REV) 42 and low-reverse brake (LRB) 45 to lock and create the reverse gear.

Similarly, if the first solenoid valve 1011 falls into inoperative conditions due, for instance, to electrical breakdowns, the hydraulic control circuit 1000 detects the breakdown and deactivates the second solenoid valve 1012 so as to maintain the reverse gear available.

Figure 23:
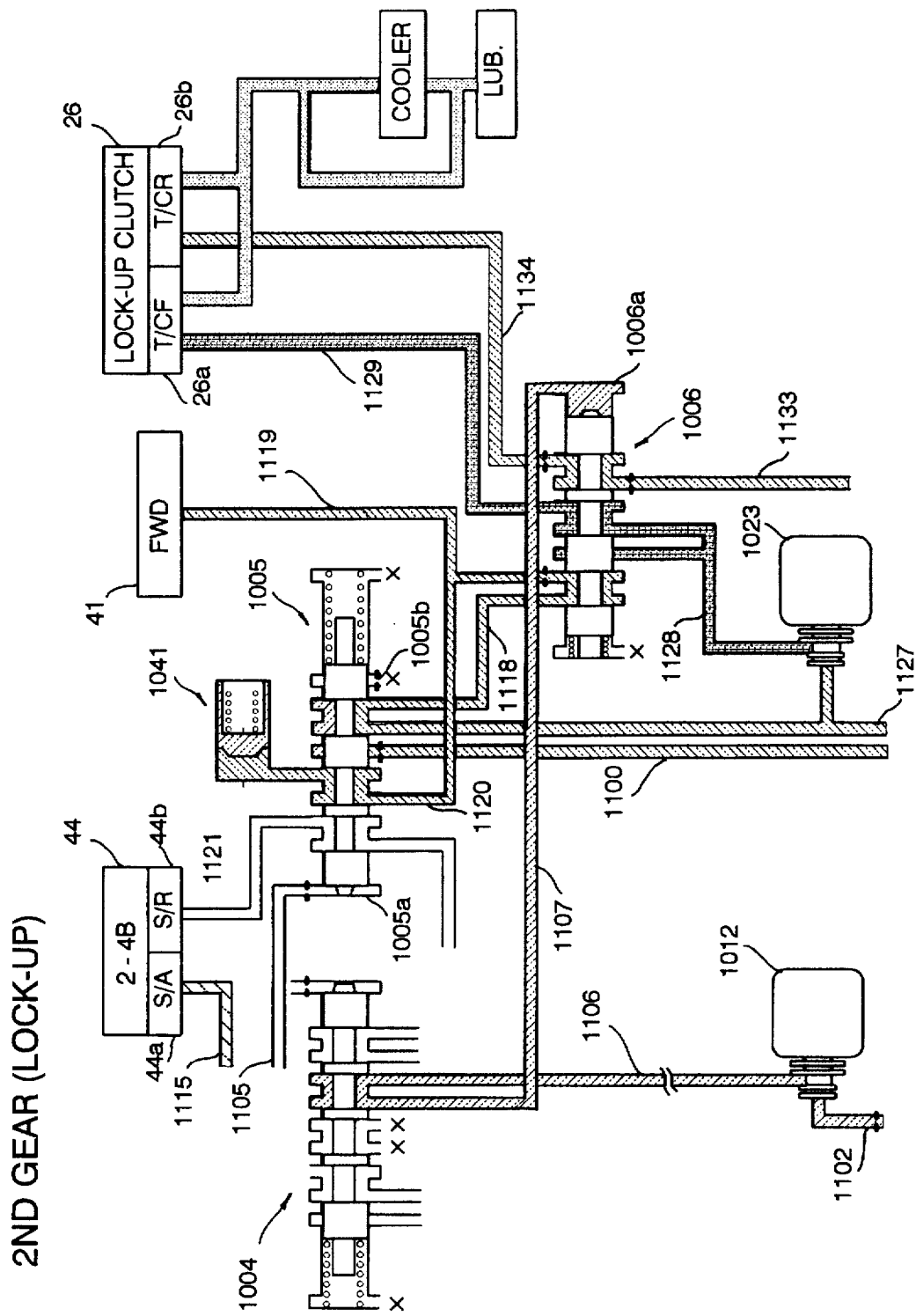
FIG. 23 is an enlarged view of an essential part of the hydraulic control circuit of FIG. 13 which provides lock-up control in the second gear.

As shown in FIG. 23, when the lock-up control takes place in the second (2) gear, the second solenoid valve 1012 turns ON with a result of supplying the operating pressure to the bypass control valve 1004 through the pressure line 1106. Together, in the second (2) gear, the bypass control valve 1004, which holds the spool in the right end position, delivers the operating pressure to the control port 1006a of lock-up control valve 1006 and forces it to shift the spool to the left end position. Resultingly, while communication is provided between the forward clutch pressure line 1119 and second output pressure line 1112 through the pressure line 1118 via the 3-4 shift valve 1005, the pressure line 1128 downstream from the third duty solenoid valve 1023 is brought into communication with the pressure line 1129 leading to the front pressure chamber 26a (T/CF) of lock-up clutch 26. Together, the converter pressure line 1133 is brought into communication with the rear pressure chamber (T/CR) 26b of lock-up clutch 26 through the pressure line 134.

Resultingly, while the forward clutch (FWD) 41 is held locked with the operating pressure supplied from the pressure lines 1112 and 1118, the lock-up clutch 26 is locked or controlled to allow to slip according to the operating pressure in the front pressure chamber (T/CF) 26a regulated by the third duty solenoid valve 1023. During the lock-up control, the lock-up clutch 26 is filled with the converter pressure in the rear pressure chamber ((T/CR) 26b.

Figure 24:
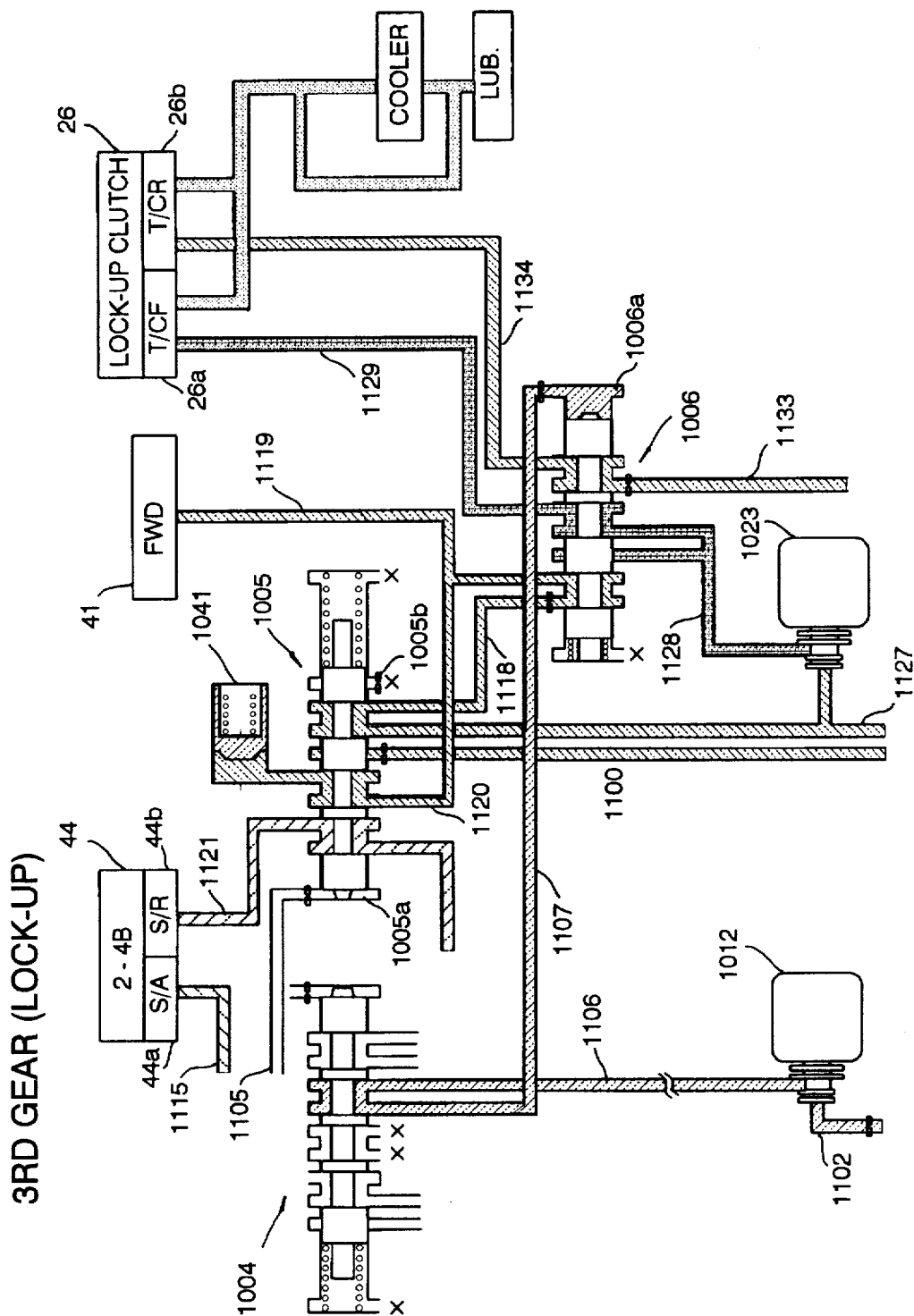
FIG. 24 is an enlarged view of an essential part of the hydraulic control circuit of FIG. 13 which provides lock-up control in the third gear.

The lock-up control is made in the same manner in the third (3) gear as in the second (2) gear. As shown in FIG. 24, the second solenoid valve 1012 turns ON, causing the lock-up control valve 59 to shift the spool to the left end position. Resultingly, while the forward clutch 41 is held locked with the operating pressure from the pressure lines 1112 and 1118, the lock-up clutch 26 is locked or controlled to slip according to the operating pressure in the front pressure chamber (T/CF) 26a regulated by the third duty solenoid valve 1023. During the lock-up control, the lock-up clutch 26 is filled with the converter pressure in the rear pressure chamber ((T/CR) 26b through the pressure lines 1113 and 1114.

Figure 25:
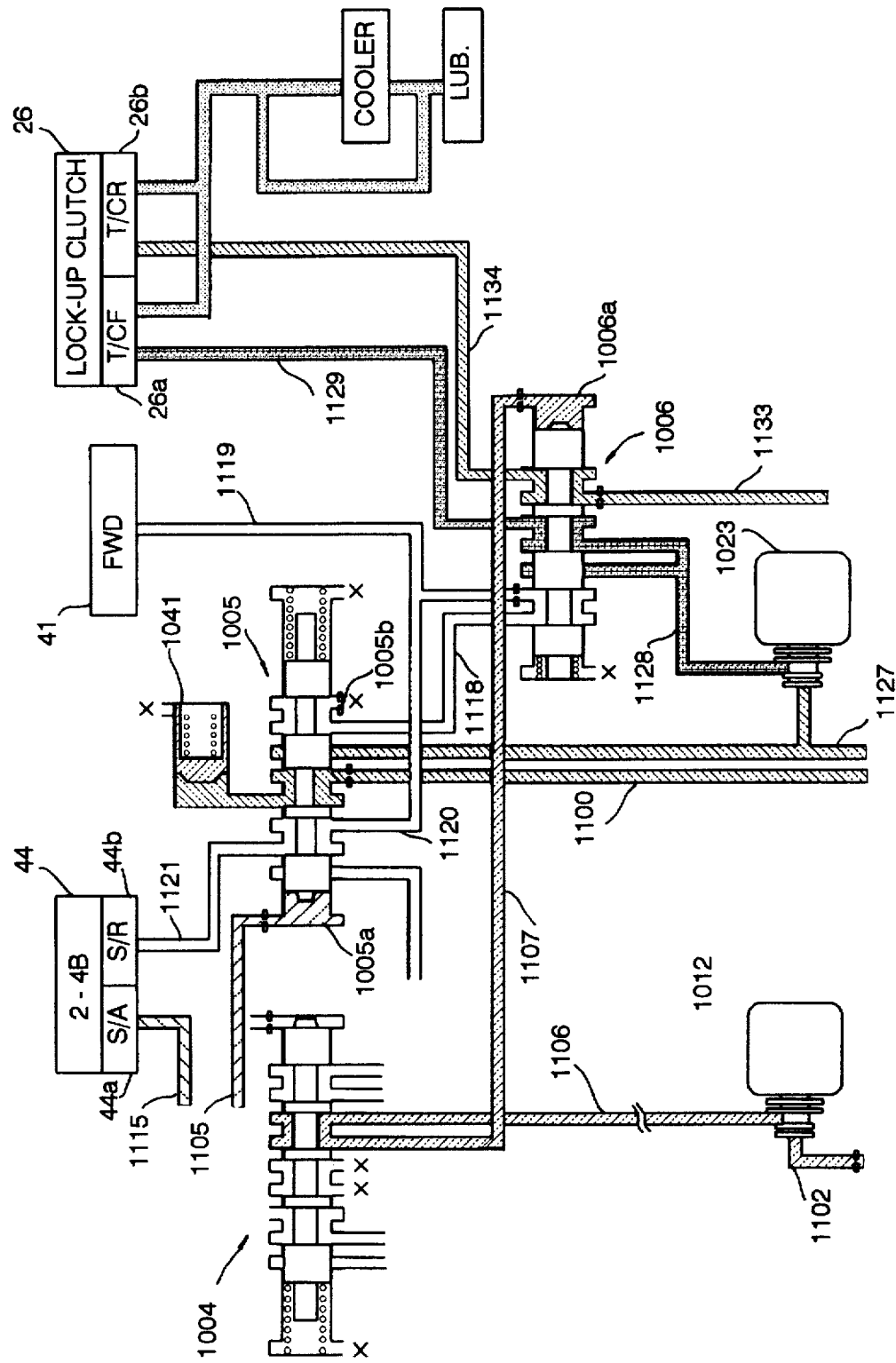
FIG. 25 is an enlarged view of an essential part of the hydraulic control circuit of FIG. 13 which provides lock-up control in the fourth gear.

As shown in FIG. 25, when the lock-up control takes place in the fourth (4) gear, the second solenoid valve 1012 turns ON, causing the lock-up control valve 1006 to shift the spool to the left end position. As a result, the lock-up clutch 26 is locked or controlled to slip according to the operating pressure in the front pressure chamber (T/CF) 26a regulated by the third duty solenoid valve 1023. During the lock-up control, the lock-up clutch 26 is filled with the converter pressure in the rear pressure chamber ((T/CR) 26b through the pressure lines 1113 and 1114. In this instance, while the 3-4 shift valve 1005 thus operated brings the forward clutch pressure line 1119 into communication with the servo release pressure line 1121 through the pressure line 1120, the lock-up control valve 1006 with the spool placed in the right end position provides communication between the forward clutch pressure line 1119 and the drain port 1005b of 3-4 shift valve 1005 through the pressure line 1118 so as to drain the forward clutch pressure line 1119. As a result, when the lock-up control starts in the fourth(4) gear, there occurs a change from discharging the forward clutch pressure and servo release pressure through the third duty solenoid valve 1023 to draining them through the 3-4 shift valve 1005, through which the forward clutch 41 and 2-4 brake 44 are held unlocked and locked, respectively.

Because the bypass control valve 1004 selectively directs the control pressure from the second solenoid valve 1012 to the control ports 1006 of lock-up control valve 1006 and the control port 1003a of low-reverse shift valve 1003 according to its spool positions, and the relay valve 1007, whose spool position is changed by the 3-4 clutch pressure, directs the control pressure from the first solenoid valve 1011 to the control port 1004a of bypass control valve 1044, the hydraulic control circuit 1000 provides the communication of the second solenoid valve 1012 selectively with the lock-up control valve 1006 and the low reverse shift valve 1003 according to the operating pressure supplied to the 3-4 clutch 43, i.e. whether a gear shift is made to high speed gears or low speed gears. The relay valve 1007, which operates according to the pressure supplied to the 3-4 clutch 43, functions as a control pressure selection means that directs the control pressure from the first solenoid valve 1011 selectively to the lock-up control valve 1006 and the low-reverse shift valve 1003 which in turn function first and second switching means, respectively. In this instance, the 3-4 shift valve 1005 functioning as the first switching means in the range of high speed gears in such a way to switch operating pressure supply and discharge in connection with the servo release pressure chamber 44b of 2-4 brake 44. The second solenoid valve 1-12, bypass control valve 1004 and low-reverse shift valve 1003 are organized as the second switching means and operate in combination in the range of low speed gears so as to switch operating pressure supply and discharge in connection with the low-reverse brake 45.

The operation of hydraulic control circuit 1000 controlled by means of the controller 1200 will be hereafter described by way of example in connection with up-shifts to the fourth (4) gear, down-shifts from the fourth (4) gear, and manual shifts to the first (1) gear in the low speed (L) range.

A description will be provided first relating to an up-shift to the fourth (4) gear from the third (3) gear. Basically, the 3-4 up-shift is achieved by means of turbine speed feedback control exercised over the supply of operating pressure principally in connection with the friction coupling element to be locked, the turbine speed feedback control being executed such that a change (dNt) at a time of a reduction in turbine speed (Nt) is controlled to conform with a target turbine speed change ($dNt_o$). This is based on the fact that a large change (dNt) in turbine speed (Nt) causes significant shift shocks and a small change (dNt) in turbine speed (Nt) leads to a long shift time. This turbine speed feedback control is exercised in the same way in every up-shift.

The third (3) gear to fourth (4) gear up-shift is achieved by means of unlocking the forward clutch 41 and simultaneously locking the 2-4 brake 44. Upon output of a 3-4 up-shift command, the hydraulic control circuit 1000 changes its operating condition by switching the first solenoid valve 1011 from the OFF state to the ON state as shown in FIGS. 18 and 19, causing the 3-4 shift valve 1005 to shift the spool in position so as to provide communication between the forward clutch pressure line 1119 and servo release pressure line 1121. The third duty solenoid valve 1023 discharges the forward clutch pressure and servo release pressure through the pressure lines 1119 and 1121, so as to unlock the forward clutch 41 and lock the 2-4 brake 44. At this time, although the servo apply pressure chamber 44a of 2-4 brake 44 has been filled with the servo apply pressure, the first duty solenoid valve 1021 controls the servo apply pressure at a levelled transitional pressure during locking the 2-4 brake 44. The term "levelled transitional pressure" refers in this specification to a part of increasing pressure that is held unchanged in level.

Figure 26:
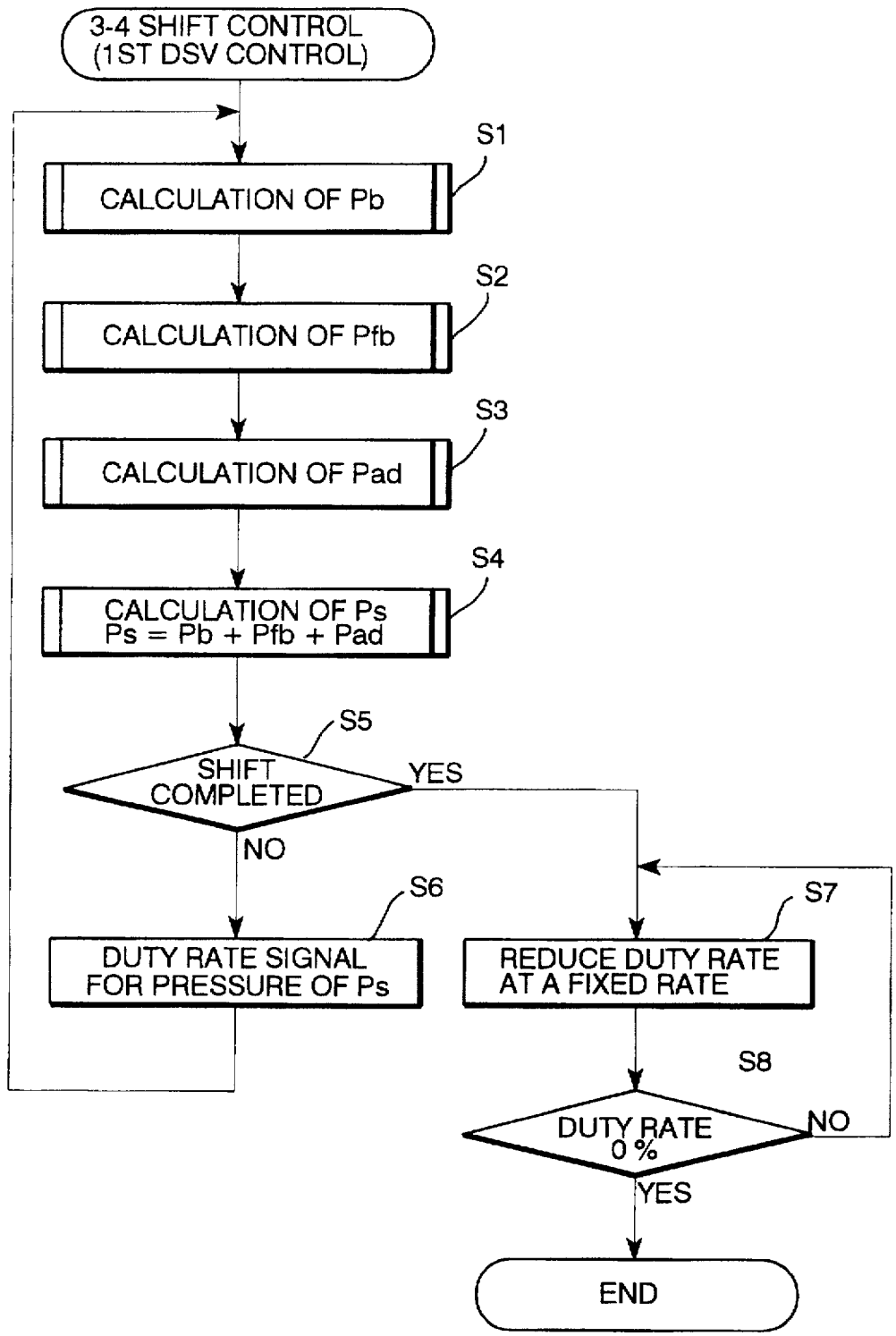
FIG. 26 is a flowchart illustrating a control sequence for a first duty solenoid valve (DSV) during a 3-4 shift.
Figure 28:
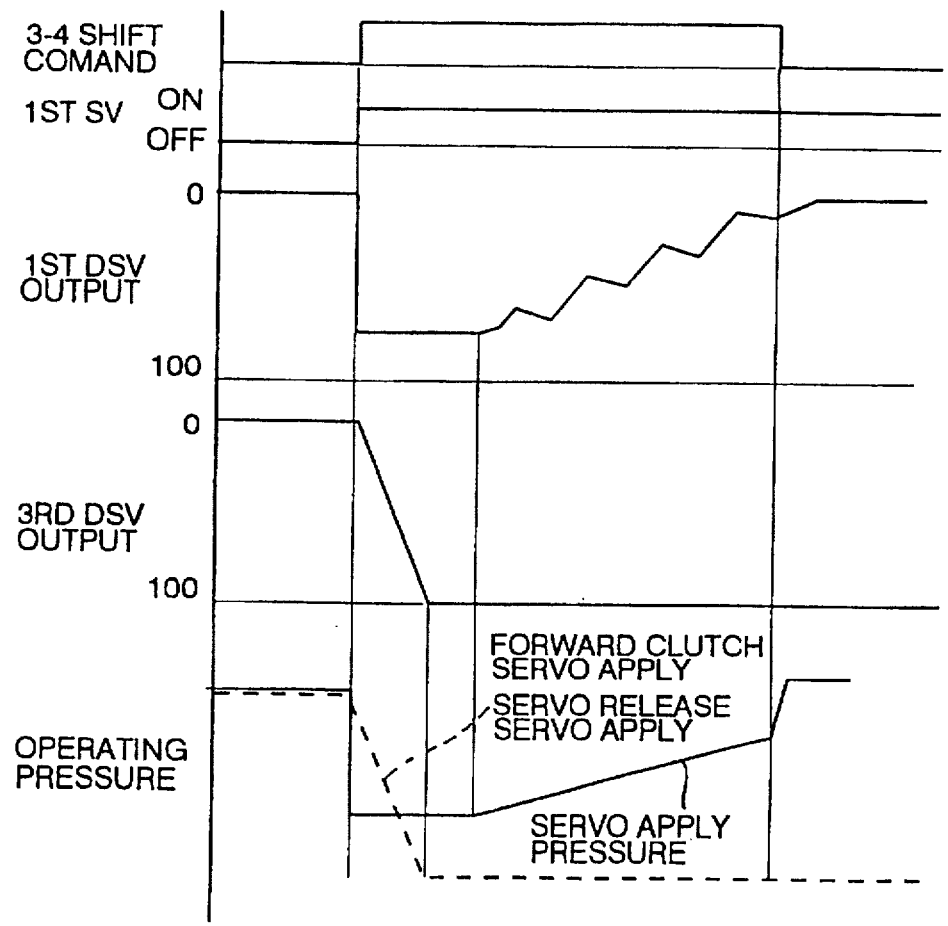
FIG. 28 is a time chart showing changes in various factors during the 3-4 shift.

This control of servo apply pressure through the first duty solenoid valve 1021 is executed in accordance with the program shown in FIG. 26. After having obtained the base pressure Pb, feedback pressure Pfb and learning control pressure Pad through steps S1–S3, respectively, a computed pressure Ps is obtained at step S4. Thereafter, through steps S5 and S6, a signal representative of a duty rate corresponding to the computed pressure Ps is output to the first duty solenoid valve 1021 continuously from an occurrence of a shift command to the completion of the 3-4 gear shift and, with the duty rate signal, the servo apply pressure is controlled. After the completion of the 3-4 gear shift, the duty rate is reduced by a fixed rate to 0% through steps S7 and S8. As is well known, the duty solenoid valves 1021–1023 allows pressure to flow from the upstream side to the downstream side without being regulated during operating at a duty rate of 0%, and drains at the downstream side during operating at a duty rate of 100%. In this way, as shown in FIG. 28, the servo apply pressure develops such that it drops once at the beginning of the 3-4 gear shift and rises again via a specified level and duration time of levelled transitional pressure.

Calculations of the base operating pressure Pb, feedback pressure Pfb and learning control pressure Pad are carried out as follows.

For the base pressure calculation, pressure, such as the pressure corresponding to a target turbine speed change during the 3-4 gear shift, the pressure corresponding to a target turbine torque during the 3-4 gear shift and the pressure corresponding to a square of the target turbine torque, are found from maps, respectively. An initial pressure for the base pressure Pb is obtained by adding these pressures together. The initial base pressure is added by a value of a duration time from a time when a practical change in turbine speed (Nt) falls below a specified value, that is, from commencement of a drop in turbine speed (Nt) which is caused due to an occurrence of an inertia phase in the torque converter, multiplied by a specified value. In such a manner, This calculation gives the base pressure Pb rising at a fixed rate after the practical turbine speed (Nt) change reaches the specified value.

The feedback pressure Pfb is set to 0 (zero) before a specified duration time, which is established as a time period necessary for the turbine to becomes stable in speed, from a time when the practical turbine speed (Nt) change falls below the specified value. After the specified duration time, the deviation of the practical turbine speed change relative to the target turbine speed change is obtained and, after executing a phase correction of the deviation, the feedback pressure Pfb corresponding to the corrected deviation is found from a feedback pressure map.

The learning control pressure Pad is used to make a correction of a computed pressure Ps for another gear shift according to applicability of the initial base pressure for the base pressure which in turn has a significant effect to the turbine speed change at the beginning of gear shift. The learning control pressure Pad is found from a map of learning control pressure with respect to the deviation of practical turbine speed change from target turbine speed change at the termination of the specified duration time from a fall of the practical turbine speed change below the specified value, or from an occurrence of the inertia phase in the torque converter.

Figure 27:
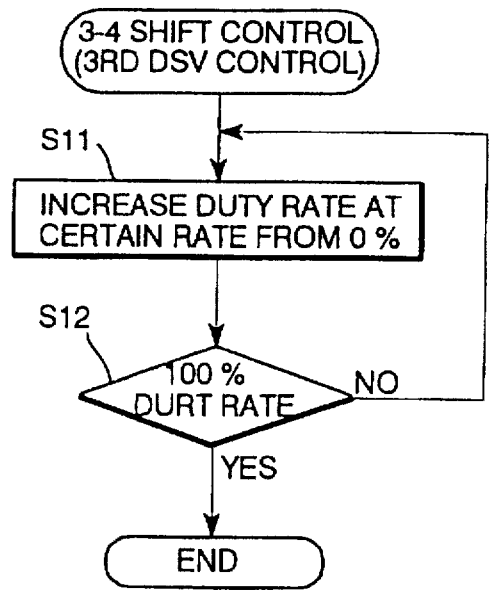
FIG. 27 is a flowchart illustrating a control sequence for a third duty solenoid valve (DSV) during the 3-4 shift.

Discharging the forward clutch pressure and servo release pressure during the 3-4 gear shift is exercised by means of the third duty solenoid valve 1023 which is controlled according to the program shown in FIG. 27. This discharge control is performed by increasing the duty rate from 0 to 100% at a fixed rate from an occurrence of a shift command through steps S11 and S12. By means of the control, the forward clutch pressure and servo release pressure are discharged at a constant rate from a specified level.

As described above, while the forward clutch 41 is unlocked relatively quickly, the 2-4 brake 44 is locked, following appropriate slippage resulting from the feedback control of servo apply pressure so that the turbine speed change varies in conformity with the target turbine speed change.

A first gear to fourth gear (1-4) shift is achieved by locking the 3-4 clutch 43 and 2-4 brake 44 and unlocking the forward clutch 41. During the 1-3 gear shift, the supply of servo apply pressure and 3-4 clutch pressure are controlled by the first duty solenoid valve 1021 and second duty solenoid valve 1022, respectively; and the discharge or release of forward clutch pressure is controlled by the third duty solenoid valve 1022. During the control of these pressure, as apparent by a comparison between FIGS. 16 and 19, the first solenoid valve 1011 switches from the OFF state to the ON state, so as to deliver pilot pressure to the 3-4 shift valve 1005 through the relay valve 1007, thereby causing the 3-4 shift valve 1005 to bring the servo release pressure line 1121 into communication with the forward clutch pressure line 1119 from communication with the 3-4 clutch pressure line 1127.

Figure 29:
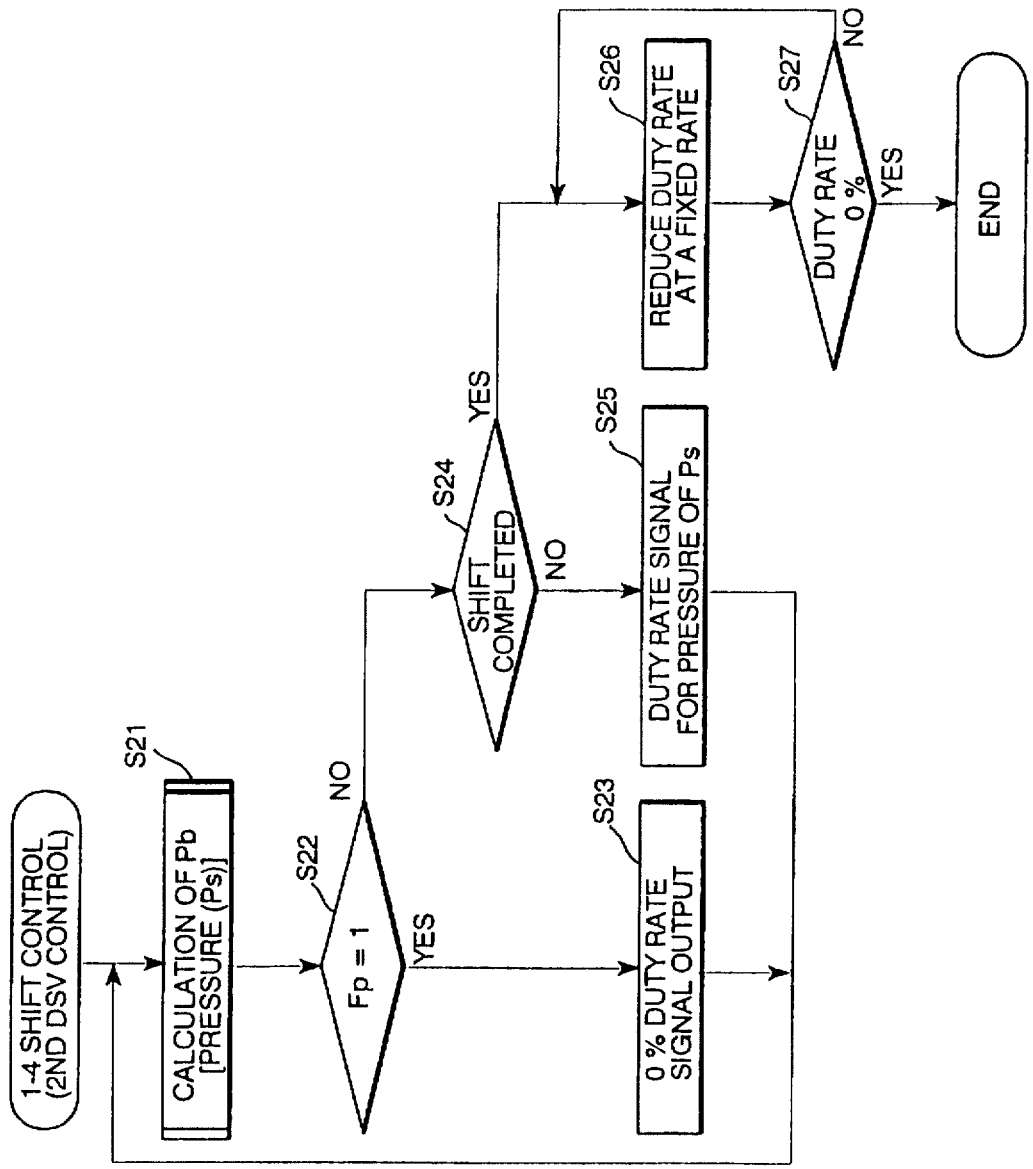
FIG. 29 is a flowchart illustrating a control sequence for the second duty solenoid valve (DSV) during a 1-4 shift.

Control of the 3-4 clutch pressure by means of the second duty solenoid valve 1022 during the 1-4 gear shift is exercised in accordance with the program shown in FIG. 29. After calculations of the base pressure Pb at steps S21, the second duty solenoid valve 1022 is operated at a duty rate of 0% during a specified pre-charge period (Fp=1) so as to fill quickly the pressure line leading to the pressure chamber of 3-4 clutch 43 with the operating pressure through steps S22 and S23. When the pre-charge control is concluded (Fp=0), then, through steps S24 and S26, the second duty solenoid valve 1022 is operated at a duty rate corresponding to the computed operating pressure Ps until the completion of the 1-4 gear shift. After the completion of the 1-4 gear shift, the duty rate is reduced to 0 % at a fixed rate through steps S26 and S27.

For the 1-4 gear shift, the base pressure Pm itself is substituted for the computed pressure Ps not based on the feedback control pressure Pfb and learning control pressure Pad. Specifically, an initial base pressure, which is obtained according to turbine speed (Nt) in revolution before the 1-4 shift, is substituted for the base pressure Pb before the torque converter enters into the inertia phase where the turbine speed change falls below the specified value, and the base pressure is increased at a fixed rate after the torque converter has entered into the inertia phase. In such a way, the control of second duty solenoid valve 1022 is simplified. This is because the 1-4 gear shift takes place in response to an abrupt increase in opening of the engine throttle valve which does not require any precise control such as feedback control and learning control.

Figure 30:
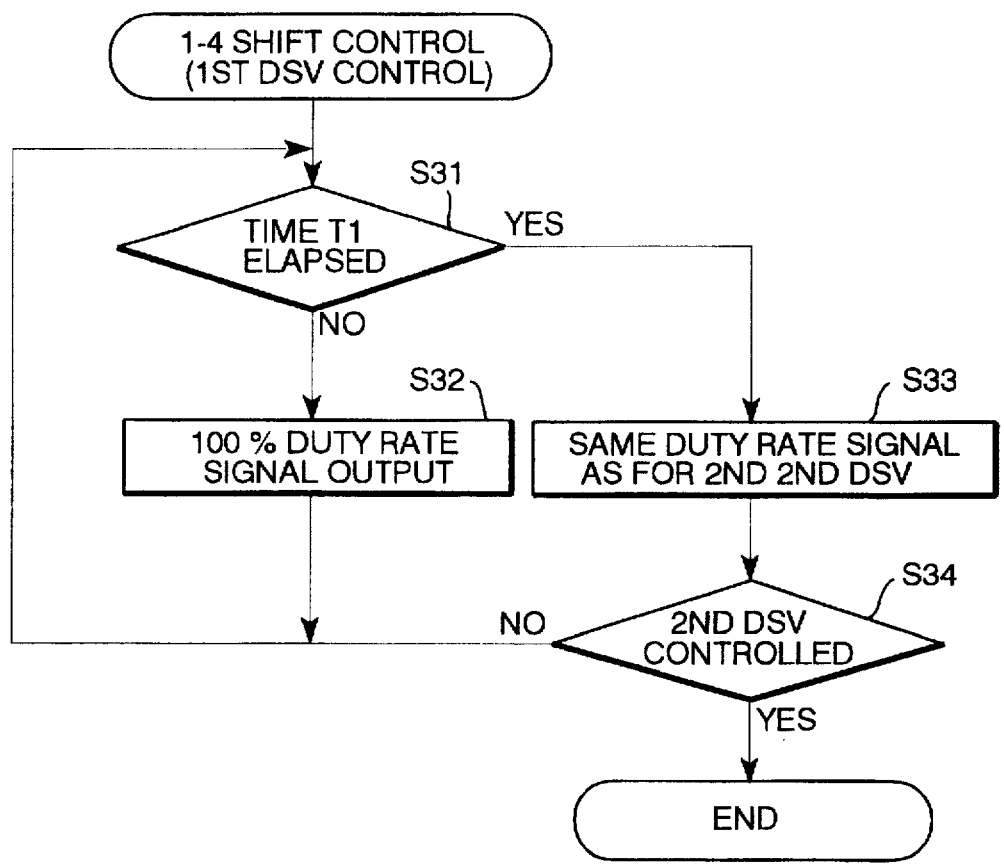
FIG. 30 is a flowchart illustrating a control sequence for the first duty solenoid valve (DSV) during the 1-3 shift.

Control of the servo apply pressure by means of the first duty solenoid valve 1021 during the 1-4 gear shift is exercised in accordance with the program shown in FIG. 30. Through steps S31 and 32, after a determination as to whether a specified time period T1 is over and, until the specified backup time T1 is over, the first duty solenoid valve 1021 is operated at a duty rate of 100%. During this time period, the servo apply pressure is not supplied, and only the 3-4 clutch pressure and servo release pressure are supplied. After the specified time period T1, the second duty solenoid valve 1022 is operated at the same duty rate as at which the first duty solenoid valve 1021 is operated at step S33. Subsequently, when it is determined that the control of second duty solenoid valve 1022 has been completed, then, the control of first duty solenoid valve 1021 is also terminated at the moment at step S34.

Figure 32:
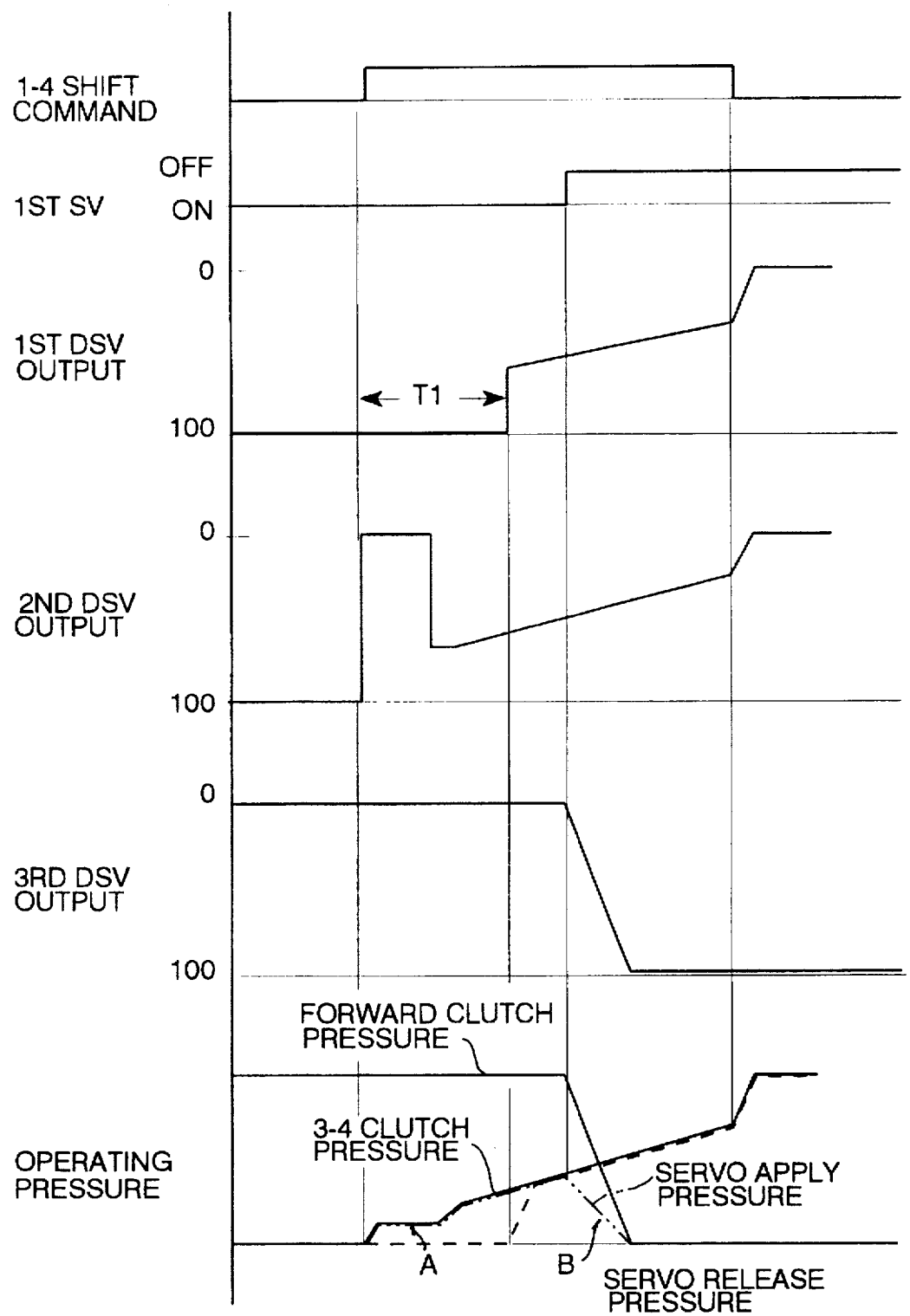
FIG. 32 is a time chart showing changes in various factors during the 1-3 shift.

With this control, as shown in FIG. 32, the operating pressure which is at the same level as the 3-4 clutch pressure to the 3-4 clutch 43 is supplied to the 2-4 brake 44 as the servo apply pressure from a lapse of the specified backup time T1 following an occurrence of a shift command.

In such a case, as described previously, since the areas for receiving pressure of the piston 544 is substantially equal on the sides of the servo apply pressure chamber 54a and servo release pressure chamber 54b of the 2-4 brake 54, only the return spring 546 acts on the piston 544, preventing the piston 54 from operating in the direction in which it brings the 2-4 brake 54 into locking.

Figure 31:
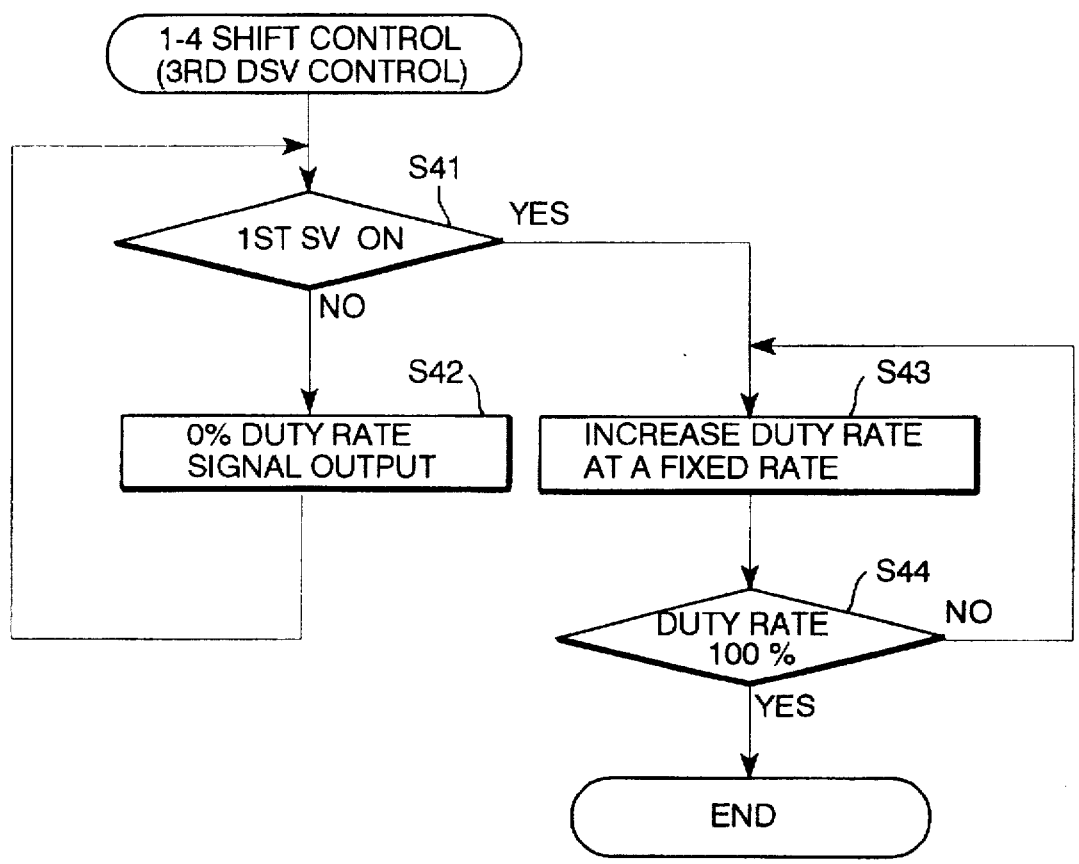
FIG. 31 is a flowchart illustrating a control sequence for the third duty solenoid valve (DSV) during the 1-3 shift.

During the 1-4 gear shift, discharge control of the forward clutch pressure by means of the third duty solenoid valve 1023 is exercised in accordance with the program shown in FIG. 31. At step S41, a decision is made as to whether the first solenoid valve 1011 has turned ON and, as a result, caused to the 3-4 shift valve 1005 to shift the spool. Since, before the spool position shift of 3-4 valve shift 1005, the servo release pressure line 1121 is in communication with the 3-4 clutch pressure line 1127, the operating pressure at the same level as the 3-4 clutch pressure is supplied to the 2-4 brake 44 as servo release pressure. Until the first solenoid valve 1011 turns ON, the third duty solenoid valve 1023 is operated at a duty rate of 0% so as to hold the forward clutch pressure supplied to the forward clutch 43 at step S42. When the 3-4 valve shift 1005 shifts the spool to the left end position following the turn ON of first solenoid valve 1011, the third duty solenoid valve 1023 is operated at a duty rate varying to 100% at a fixed rate through steps S43 and S44. This causes the forward clutch pressure to be discharged at a fixed rate. At this time, the servo release pressure line 1121 is in communication with the forward clutch pressure line 1119 through the 3-4 valve shift 1005, the servo release pressure is discharged from the 2-4 brake 44 at the later stage of 1-4 gear shift as marked by "A" in FIG. 32. The supply of 3-4 clutch pressure and the discharge of servo apply pressure are caused in a timed sequence as shown in FIG. 32.

Figure 33:
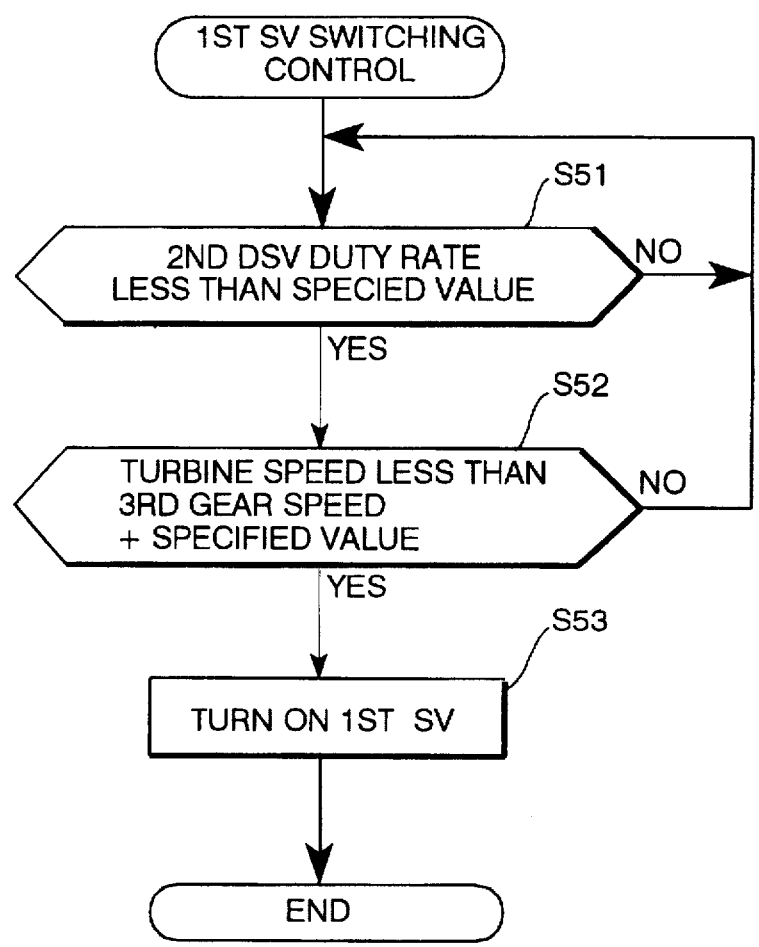
FIG. 33 is a flowchart illustrating a switching control sequence for a first solenoid valve (SV) during the 1-4 shift.

The relay valve 1007, which is disposed between the first solenoid valve 1011 and 3-4 valve shift 1005 as clearly shown in FIG. 13, shifts the spool by means of the 3-4 clutch pressure controlled by the second duty solenoid valve 1022. For this reason, the first solenoid valve 1011 is controlled to switch or turn ON following the completion of communication between the first solenoid valve 1011 and 3-4 valve shift 1005 through the relay valve 1007. This switching control is exercised in accordance with the program shown in FIG. 33. At step S51, a decision is made as to whether or not the duty rate for the second duty solenoid valve 1022 has dropped below a specified rate. Further, at step 552, another decision is made as to whether or not the turbine has changed its speed by a drop more than a specified value from a turbine speed (Nt) during the third (3) gear immediately before the 1-4 gear shift. When both judgement results are YES, in other words, when the 3-4 clutch pressure has increased up sufficiently for the relay valve 1007 to shift its spool against the return spring and it is monitored that at least the gear ratio of the third gear has been reached, the first solenoid valve 1011 is switched ON. Thus, the 3-4 shift valve 1005 is reliably switched with the pilot pressure from the first solenoid valve 1011 and, consequently, the forward clutch pressure and servo release pressure are discharged appropriately.

A 2-4 gear shift is achieved by creating a state in which the forward clutch 41 is unlocked and the 3-4 clutch 43 is locked from a state in which both forward clutch 41 and 2-4 brake 44 are locked. Consequently, during the 2-4 gear shift, control is made of supplying the 3-4 clutch pressure through the second duty solenoid valve 1022 and discharging the forward clutch pressure through the third duty solenoid valve 1023. Similarly to the 1-4 gear shift, the 3-4 shift valve 1005 is switched following switching the first solenoid valve 1011 from OFF to ON on the way of shifting so as to switch communication from between the servo release pressure line 1121 and 3-4 clutch pressure line 1127 to between the servo release pressure line 1121 and forward clutch pressure line 1119.

Figure 34:
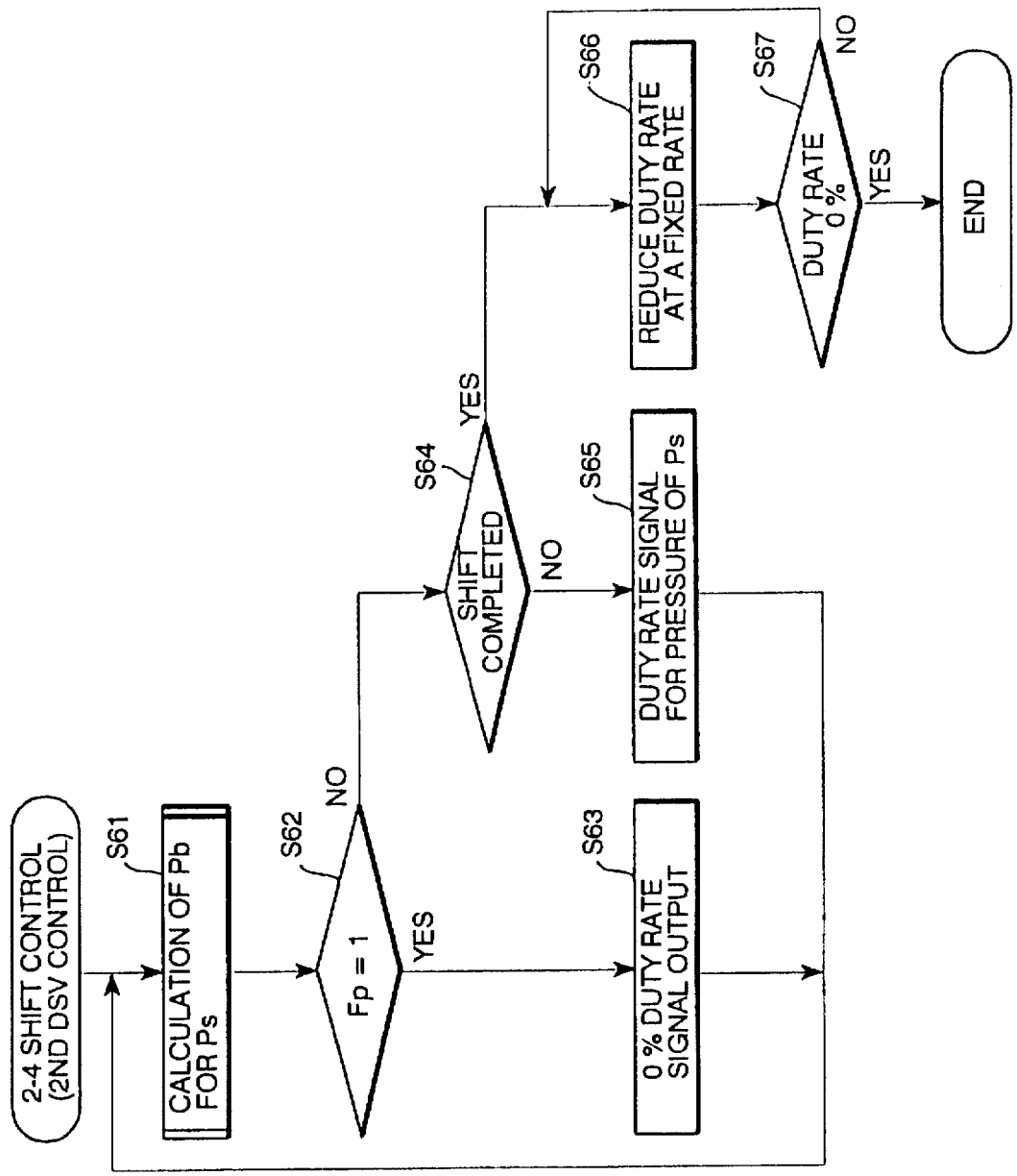
FIG. 34 is a flowchart illustrating a control sequence for the second duty solenoid valve (DSV) during a 2-4 shift.

Control of supplying the operating pressure through the second duty solenoid valve 1022 during the 2-4 gear shift is executed in accordance with the program shown in FIG. 34, which has the same sequence routine as the control of the second duty solenoid valve 1022 during the 1-4 gear shift previously described. Specifically, at step S61, the base operating pressure Pb is found as a computed operating pressure Ps. During the pre-charge period (Fp=1) that is determined at step S62, the duty rate takes 0% at step S63 so as to promptly fill the pressure line leading to the operating pressure chamber of 3-4 clutch 53 with the operating pressure. In addition, through steps S64 and S65, when the pre-charge period is concluded (Fp=0), the duty rate corresponding to the operating pressure Ps, i.e the base pressure Pb, is computed, at which the second duty solenoid valve 1022 is operated until the completion of the 2-4 gear shift. After the completion of the 2-4 gear shift, the duty rate is reduced to 0% at a specified rate through steps S66 and S67.

During the 2-4 gear shift, both feedback control and learning control are not executed and, in addition, the base pressure Pb is determined on the basis of only a turbine speed (Nt) prior to the 2-4 gear shift in the same manner for the 1-4 gear shift.

Figure 35:
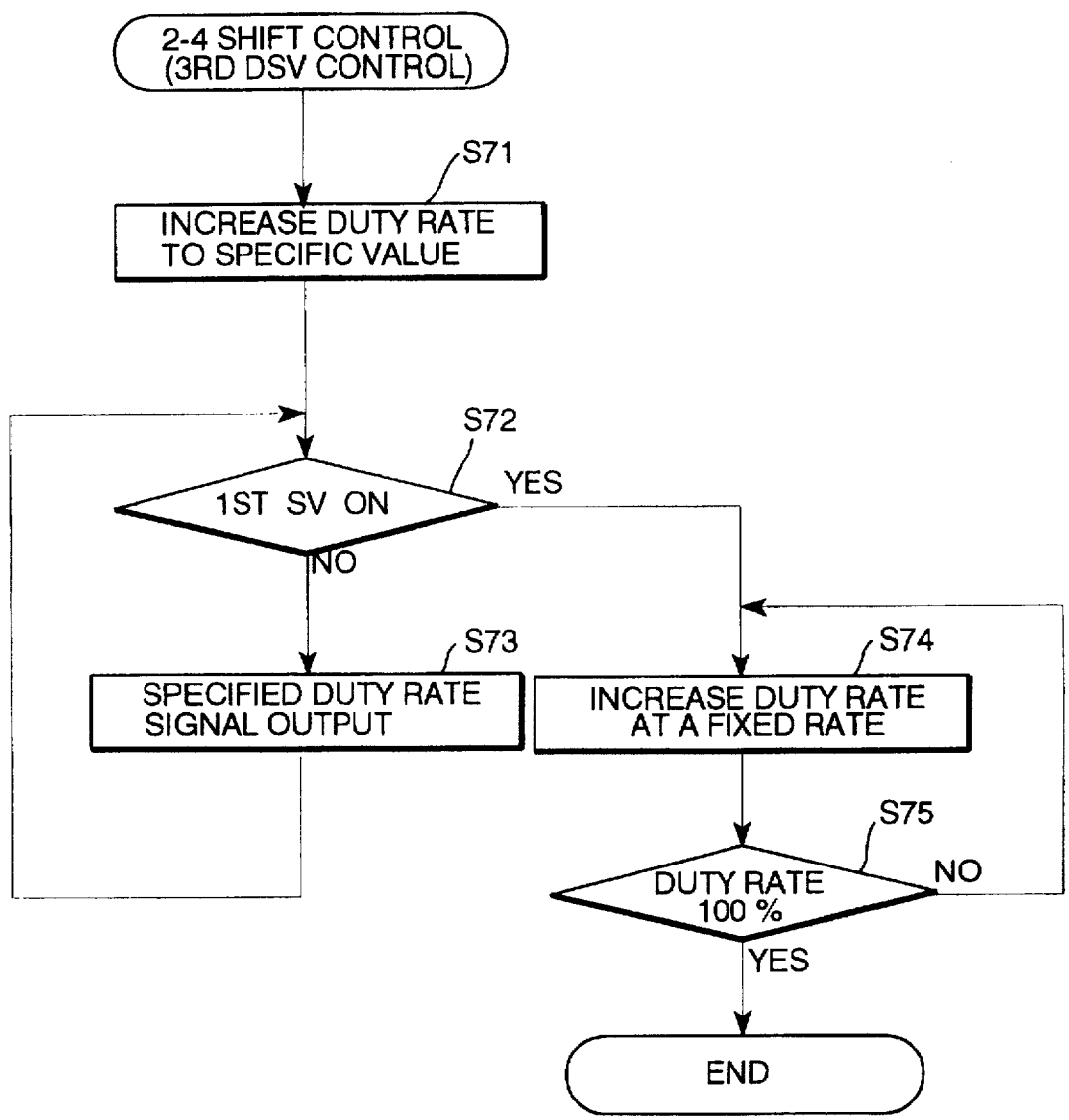
FIG. 35 is a flowchart illustrating a control sequence for the third duty solenoid valve (DSV) during the 2-4 shift.

Discharge control of forward clutch pressure through the third duty solenoid valve 1023 during the 2-4 gear shift is executed in accordance with the program shown in FIG. 35. In this discharge control, at the commencement of shifting, the forward clutch pressure is reduced to a predetermined level by increasingly alter the duty rate from 0% to a specified rate at step S71 as shown by a label "C" in FIG. 36. Other than the reduction in duty rate, the program takes the same steps as those exercised during the 1-4 gear shift.

Figure 36:
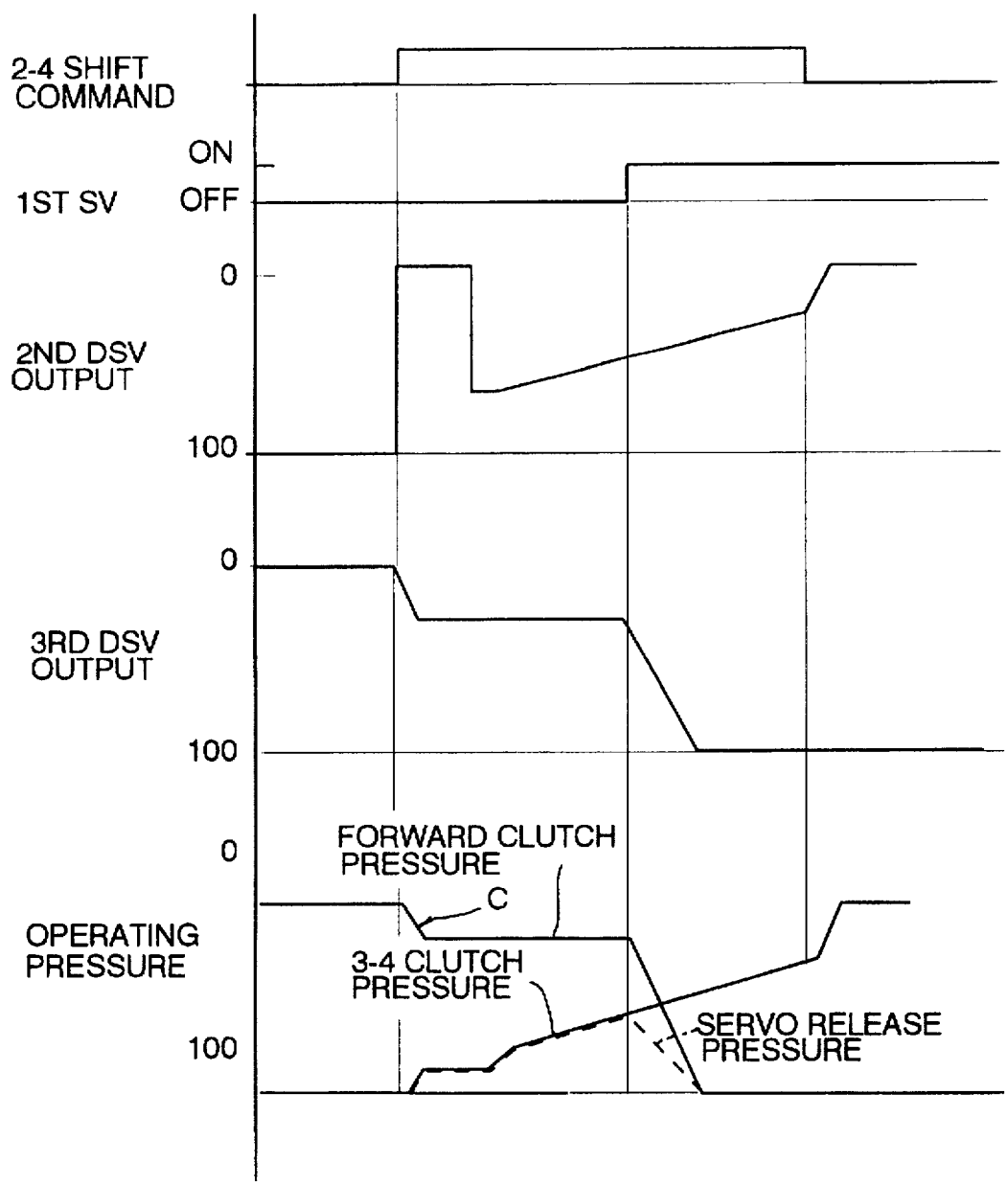
FIG. 36 is a time chart showing changes in various factors during the 2-4 shift.

That is, even during the 2-4 gear shift, the relay valve 1007 shifts the spool due to a rise in 3-4 clutch pressure, and the first solenoid valve 1011 turns ON at a time the 3-4 shift valve 1005 is enabled to switch. From the time, the duty rate of the third duty solenoid valve 1023 is increasingly altered at a specified rate so as to discharge the forward clutch pressure at a fixed gradient or specified rate due to the linear increase in the duty rate of the third duty solenoid valve 1023. At this time, the servo release pressure which has been supplied together with the 3-4 clutch pressure is discharged together with the forward clutch pressure. In such a manner, the supply of 3-4 clutch pressure, the supply of servo apply pressure and the discharge of forward clutch pressure are caused in the timed sequence as shown in FIG. 36.

In this instance, it is determined that the relay valve 1007 has shifted its spool based on that the duty rate for the second duty solenoid valve 1022 has reached a rate for the 3-4 clutch pressure appropriately high to cause the relay valve 1007 to shift the spool against the return spring. Until the relay valve 1007 shifts its spool, the 2-4 gear shift is always achieved via the third (3) gear.

In general, during down-shifts of the transmission gear, in particular a torque demand down-shift in which specific two friction coupling elements are coupled and uncoupled and which accompanies a particular increase in engine throttle opening, uncoupling one of the two friction coupling elements is caused in advance of locking another friction coupling element so as to allow slippage between the two, thereby creating an inertia phase in which the turbine speed (Nt) is allowed to rise and, at a moment the turbine speed (Nt) reaches a final turbine speed predicted for the termination of a torque demand down-shift, locking the other friction coupling element is caused to create a torque phase.

In this down-shift, the feedback control is executed of the operating or unlocking pressure for the one friction coupling element so as to make the turbine speed (Nt) in the inertia phase to conform with a target turbine speed ($Nt_o$) for every control cycle. This is because, with regard to the torque demand down-shift, importance is attached to responsiveness of the transmission gear rather than shift shocks caused in the automatic transmission and, consequently, it is necessary to raise the turbine speed (Nt) rapidly to the turbine speed (Nt) to be attained after the torque demand down-shift.

A fourth (4) to third (3) gear shift (4-3 gear shift) is caused by supplying servo release pressure and forward clutch pressure through the third duty solenoid valve 1023, while the first solenoid valve 1011 takes the ON state so as to bring the servo release line 1121 into communication with the forward clutch pressure line 1119 through the 3-4 shift valve 1005 as shown in FIG. 13. At this time, the feedback control is exercised of the servo apply pressure by means of the first duty solenoid valve 1021 so as to control a rise in turbine speed (Nt) accompanying the unlocking of 2-4 brake 44 caused by the supply of servo release pressure.

Figure 37:
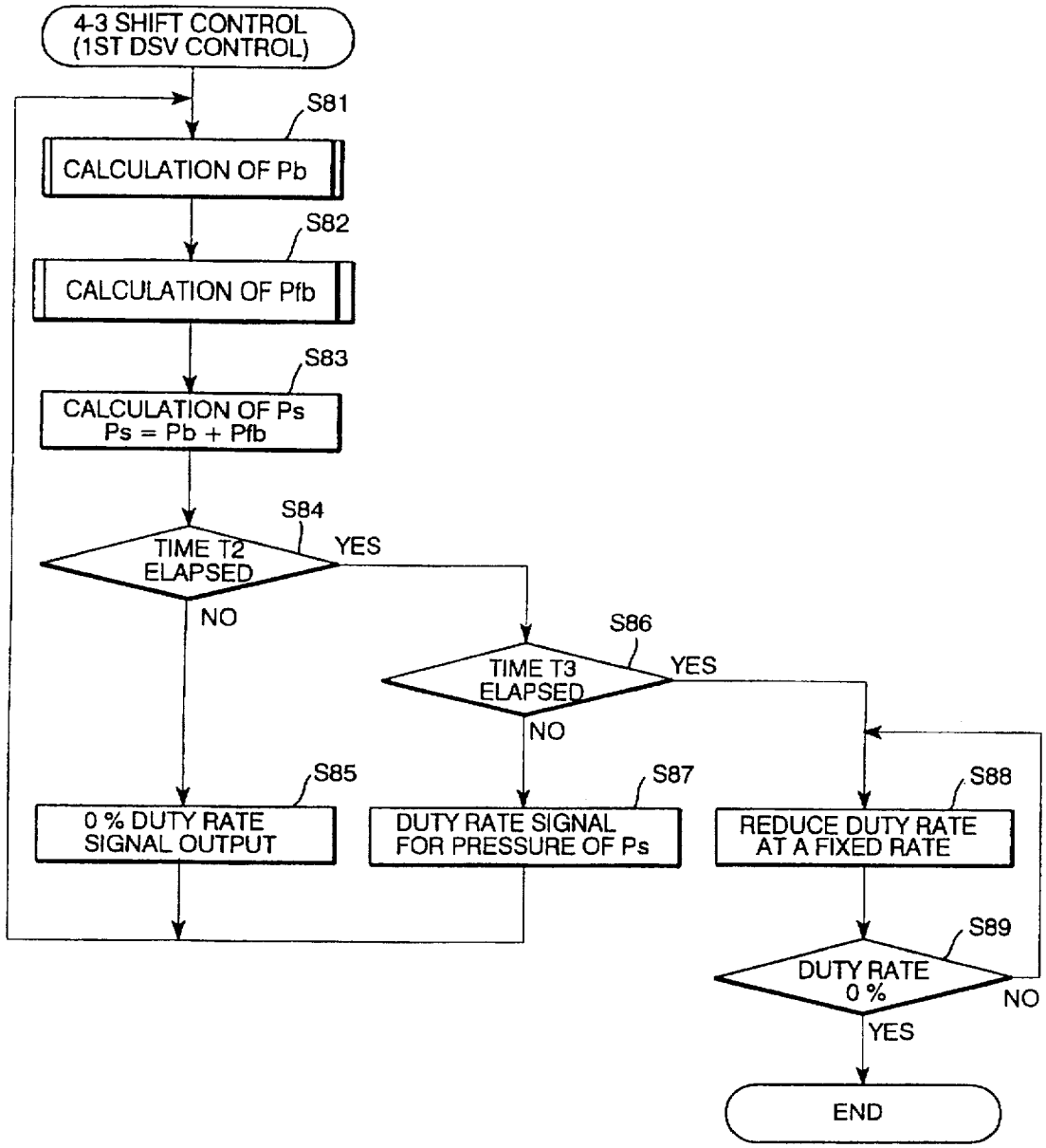
FIG. 37 is a flowchart illustrating a control sequence for the first duty solenoid valve (DSV) during a 4-3 shift.

Control of the supply of servo apply pressure through the first duty solenoid valve 1021 during the 4-3 gear shift is executed in accordance with the program shown in FIG. 37. After computing the base pressure Pb and feedback pressure Pfb at steps S81 and S82, respectively, these pressure are added together at step S83 to find the computed pressure Ps. At step S84, a decision is made as to whether or not a specified delay time T2 (see FIG. 39) has elapsed following an occurrence of a 4-3 gear shift command. Until the delay time T2 has passed, the duty rate of first duty solenoid valve 1021 is held at 0% at step S85. This is in order for torque demand gear shifts to conduct the subsequent sequence steps following stabilization of the line pressure which tends to rise rapidly accompanying an increase in engine throttle opening during the torque demand gear shift.

When the delay time T2 has elapsed, another decision is made at step S86 as to whether or not a specified backup time T3 has elapsed from a moment the turbine speed (Nt) has risen to a speed slightly smaller than the target turbine speed ($Nt_o$) at a termination of the gear shift (which is hereafter referred to as an immediate shift-end turbine speed ($Nt_o-\Delta Nt$)). In this instance, Until a lapse of the specified backup time T3, the first duty solenoid valve 1021 is operated at a duty rate determined according to the computed operating pressure at step S87 so as to control the servo apply pressure. Following a lapse of the specified backup time T3, the duty rate is decreasingly altered at a fixed rate to 0% through steps S88 and S89.

The reason that the feedback control is performed of the servo apply pressure until the lapse of the specified backup time T3 after the attainment of the immediate shift-end turbine speed ($Nt_o-\Delta Nt$) is that execution of the control of the supply of servo apply pressure is forced to continue until completion of the gear shift, so as thereby to prevent the forward clutch 41 from locking before the completion of the gear shift, which is one of causes of interlock, resulting from increasing the servo apply pressure.

In the calculation of the base pressure Pb at step S81 in the program shown in FIG. 37, following finding the pressure corresponding to a target turbine speed change during the 4-3 gear shift and the pressure corresponding to a target turbine torque for the 4-3 gear shift in the maps, the base pressure is calculated by adding these pressures together.

The calculation of feedback pressure at step S82 in the program shown in FIG. 37 is made from the map based on a deviation of a practical turbine speed (Nt) from a current target turbine speed ($Nt_o$) calculated at a moment of satisfaction of specified conditions, including at least that the turbine speed change has exceeded a specified value, for conducting the feedback control.

Following a lapse of the specified backup time T3 from a time the turbine speed (Nt) has reached the immediate shift-end turbine speed ($Nt_o-\Delta Nt$) after the commencement of an inertial phase, The duty rate is controlled to become 0%. With the change in duty rate, the servo apply pressure, after having once dropped, is feedback controlled so as to make the turbine speed (Nt) conform with the target turbine speed ($Nt_o$) at a present point of control and to raise again to a specified level when the 4-3 gear shift is concluded, as shown in FIG. 39.

Figure 38:
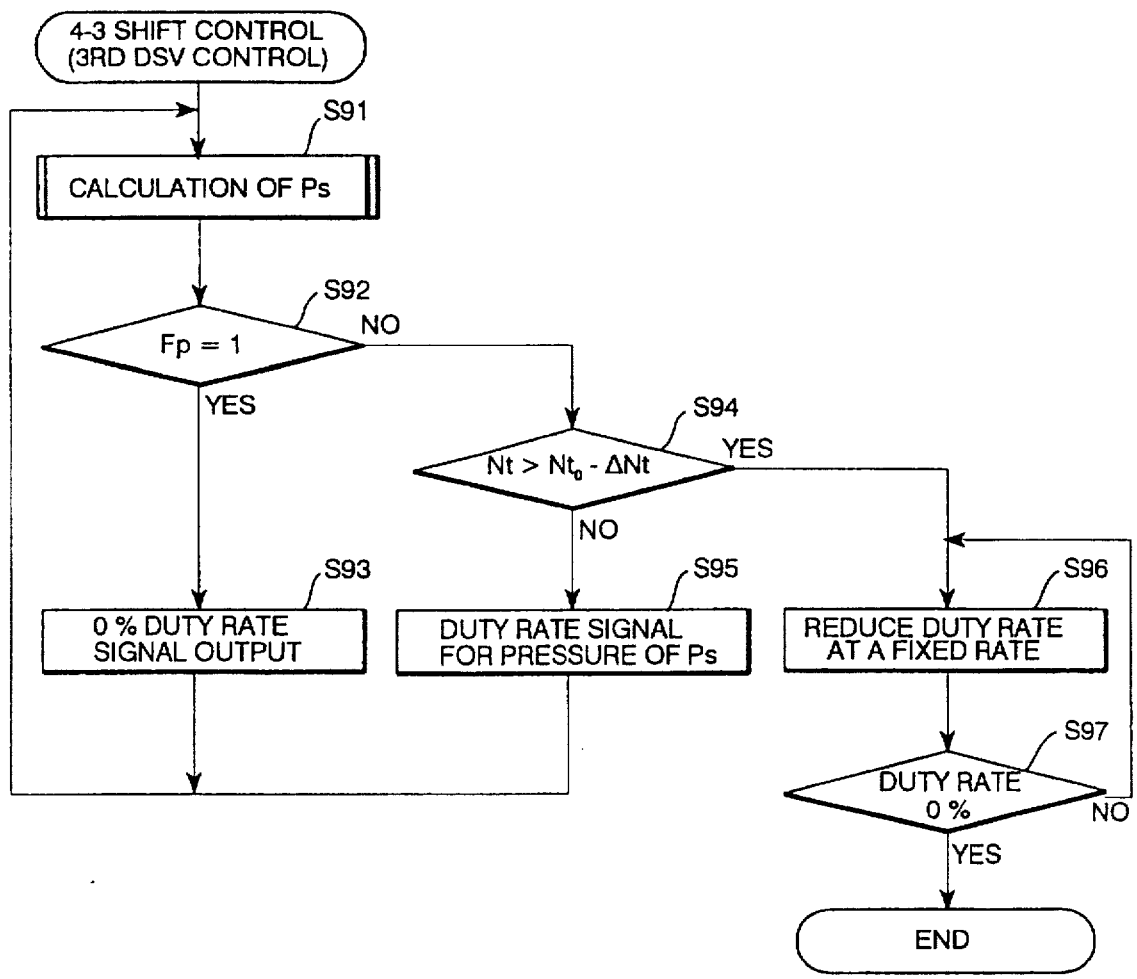
FIG. 38 is a flowchart illustrating a control sequence for the third duty solenoid valve (DSV) during the 4-3 shift.

On the other hand, control of the forward clutch pressure and servo release pressure through the third duty solenoid valve 1023 during the 4-3 gear shift is executed in accordance with the program shown in FIG. 38. First, at step S91, the computed pressure Ps is found. During the pre-charge period (Fp=1), the duty rate for the third duty solenoid valve 1023 is changed to 0% so as to swiftly fill the pressure lines leading to the pressure chamber of the forward clutch 51 and the servo release pressure chamber 54b of 2-4 brake 54 with operating pressure, through steps S92 and S93. When the pre-charge period is concluded (Fp=0), a decision is made at step S94 as to whether or not the turbine speed (Nt) has risen as high as the immediate shift-end turbine speed ($Nt_o-\Delta Nt$). During the rise of turbine speed (Nt) to that specific speed, the third duty solenoid valve 1023 is operated at a duty rate corresponding to the computed pressure at step S95. In this instance, the computed pressure Ps, which is in conformity with a thrust force of the return spring loaded in the forward clutch 41, maintains the piston of the forward clutch 41 in a state where the forward clutch 41 is just before locking when supplied to the pressure chamber of forward clutch 51. Subsequently, when the turbine speed (Nt) has reached the immediate shift-end turbine speed ($Nt_o-\Delta Nt$), the duty rate is decreasingly changed to 0% at a fixed rate through steps S96 and S97.

Figure 39:
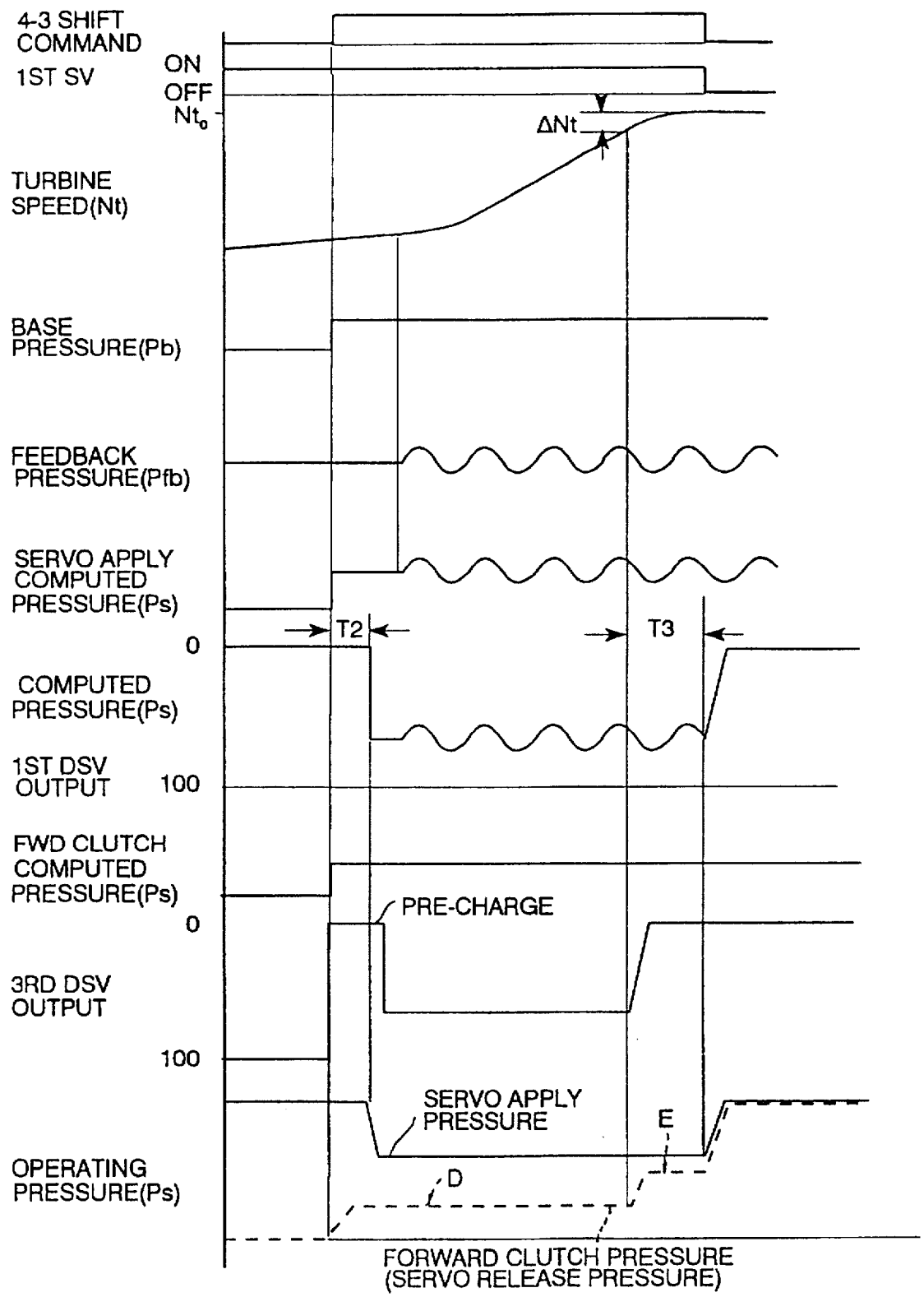
FIG. 39 is a time chart showing changes in various factors during the 4-3 shift.

With the control, while the forward clutch pressure is maintained at a level to place the forward clutch 51 immediately before locking during unlocking the 2-4 brake 44, as indicated by a label "D" in FIG. 39, it is raised to a specified level at a time the turbine speed (Nt) has risen as close as a final turbine speed after the gear shift resulting from slippage of the 2-4 brake 44 which is allowed through the feedback control of the servo apply pressure, locking the forward clutch 51. In this instance, since the forward clutch pressure has been immediately below a level for locking, the forward clutch 41 is coupled swiftly without a delay in response with the operating pressure rising via a specified level and duration time of levelled transitional pressure provided during a stroke of the solenoid piston.

A 4-2 gear shift is made by, while leaving the 2-4 brake 44 locked, unlocking the 3-4 clutch 43 and simultaneously locking the forward clutch 41. Accordingly, the discharge of the 3-4 clutch pressure through the second duty solenoid valve 1022 and the supply of the forward clutch pressure through the third duty solenoid valve 1023 are coincidentally controlled. Of these control the former discharge control is performed in feedback control.

During the 4-2 gear shift, in the hydraulic control circuit 1000, the first solenoid valve 1011 turns OFF, bringing the servo release pressure line 1121 into communication with the 3-4 clutch pressure line 1127 through the 3-4 shift valve 1005, thereby discharging the servo release pressure simultaneously with discharging the 3-4 clutch pressure.

Figure 40:
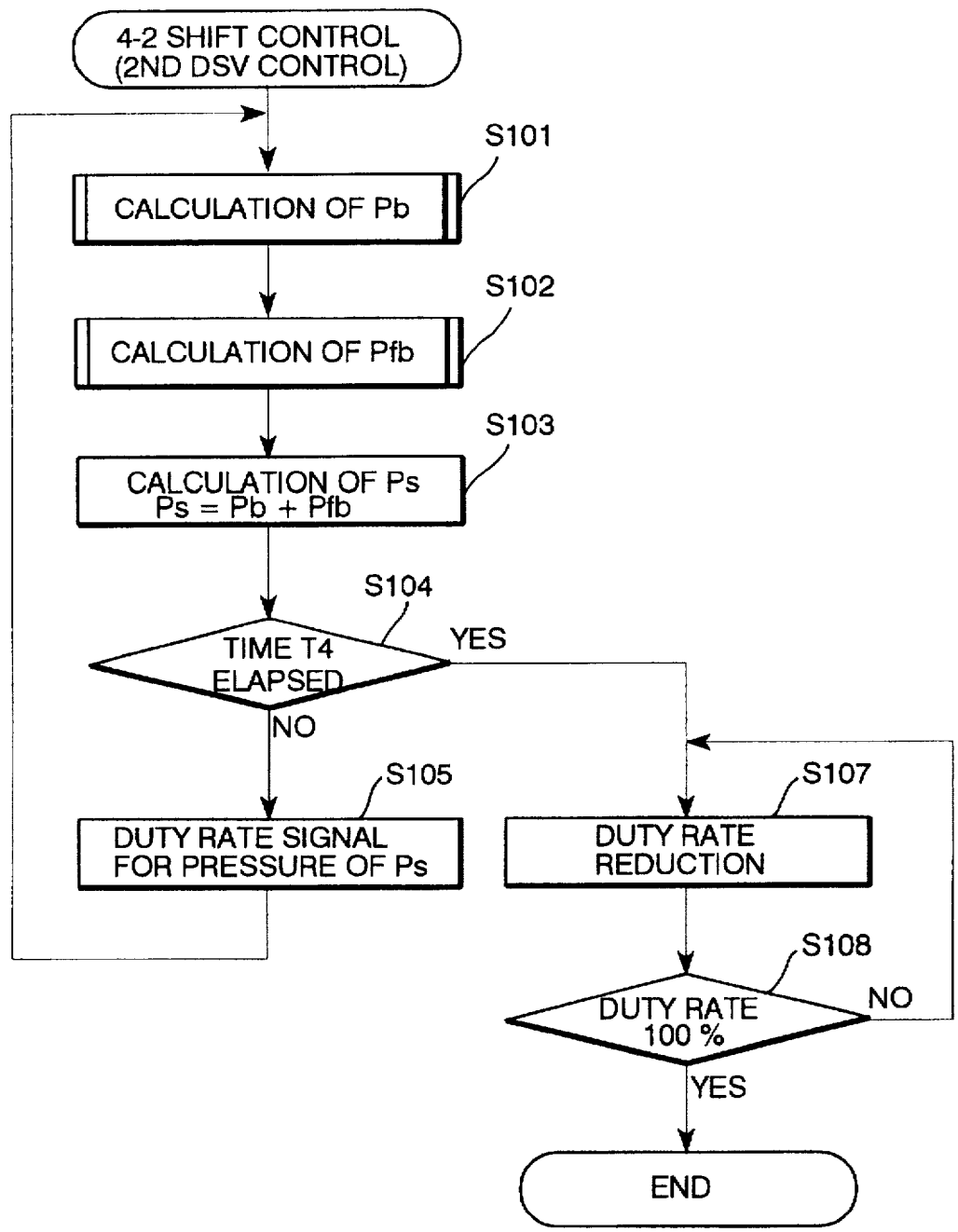
FIG. 40 is a flowchart illustrating a control sequence for the second duty solenoid valve (DSV) during a 4-2 shift.

Discharge control of the 3-4 clutch pressure through the second duty solenoid valve 1022 during the 4-2 gear shift is executed in accordance with the program shown in FIG. 40. Through steps S101 to S103, calculations of the base pressure Pb, feedback pressure Pfb and computed pressure Ps are made, respectively. Subsequently, a decision is made at step S104 as to whether or not a specified backup time T4 has elapsed after the turbine speed (Nt) has risen as high as the immediate shift-end turbine speed ($Nt_o-\Delta Nt$). Until a lapse of the specified backup time T4, the duty rate corresponding to the computed pressure Ps, which is found as described above, is proved for the second duty solenoid valve 1022 at step S105. In such a way the control is made of the 3-4 clutch pressure so as to cause a rise in turbine speed following the target turbine speed ($Nt_o$).

When the specified backup time T4 has elapsed after the attainment of the immediate shift-end turbine speed ($Nt_o-\Delta Nt$), the duty ratio is increasingly altered to 100% at a fixed rate through steps S107 and S108 so as to unlock the 3-4 clutch 53 completely. In this instance, the reason that the feedback control takes place until the specified backup time T4 has elapsed from the attainment of the immediate shift-end turbine speed ($Nt_o-\Delta Nt$) is the same as for the control of the servo apply pressure during the 4-3 gear shift described previously. However, the 4-2 gear shift differs from the case of the 4-3 gear shift in a point that the feedback control starts immediately after a shift command without passing any delay time.

Figure 41:
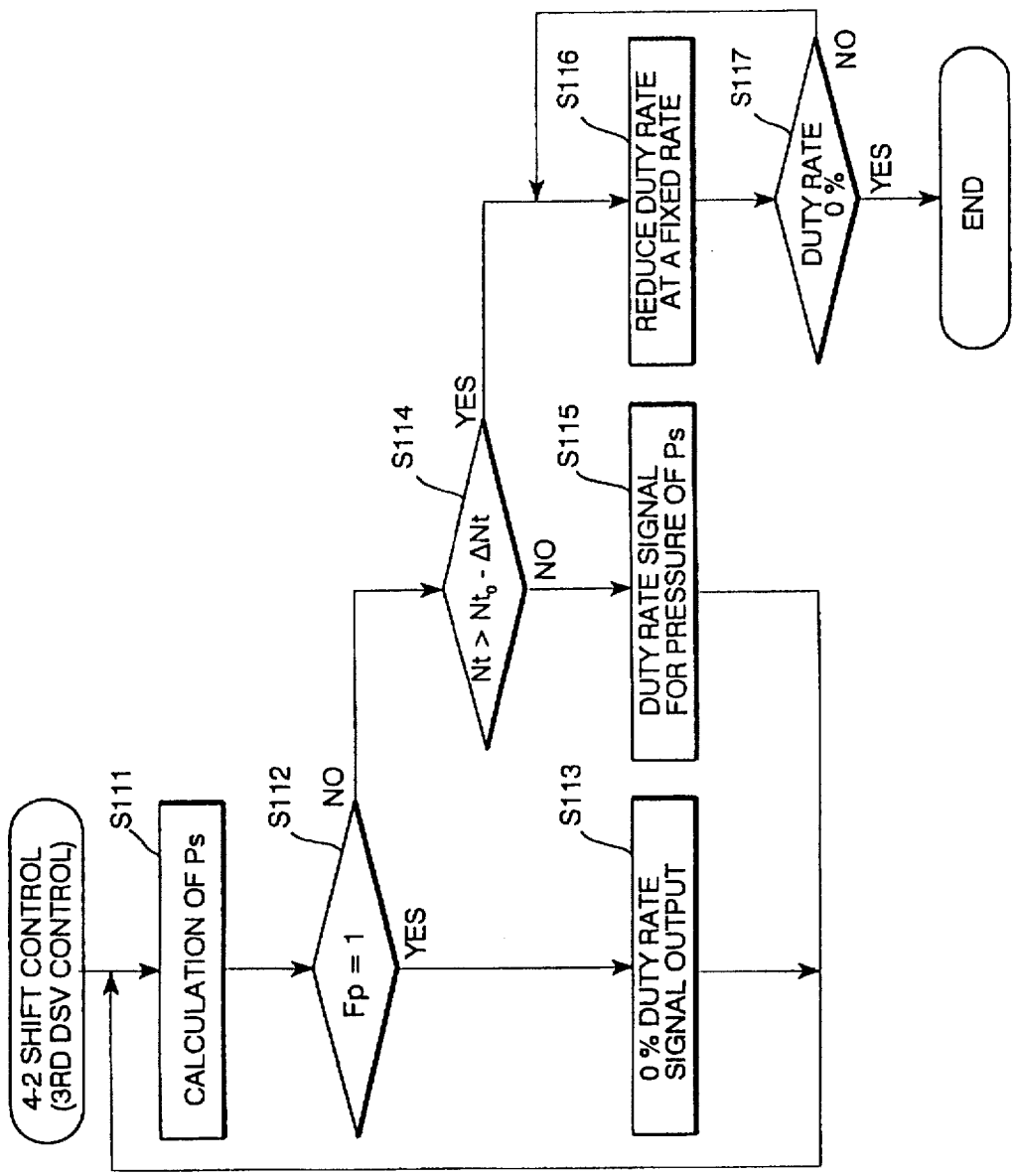
FIG. 41 is a flowchart illustrating a control sequence for the third duty solenoid valve (DSV) during the 4-2 shift.

Control of the supply of forward clutch pressure through the third duty solenoid valve 1023 during the 4-2 gear shift is executed in accordance with the program shown in FIG. 41. This control differs in a point that the control of pressure supply is made only for the forward clutch pressure from the control for the 4-3 gear shift in which both forward clutch pressure and servo release pressure are simultaneously controlled and, however, is just the same in all other respects as the control of the forward clutch pressure supply during the 4-3 gear shift of which the program is shown in FIG. 39.

Specifically, after finding the computed pressure Ps at step S111, the operating pressure is swiftly filled in the pressure line leading to the pressure chamber of forward clutch 41 by means of the third duty solenoid valve 1023 operating at a duty rate held at 0%, during the pre-charge interval (Fp=1), through steps S102 and S103. When the pre-charge control has concluded (Fp=0), a decision is made at step S104 as to whether or not the turbine speed (Nt) has risen as high as the immediate shift-end turbine speed ($Nt_o-\Delta Nt$). While the turbine speed (Nt) is rising toward the immediate shift-end turbine speed ($Nt_o-\Delta Nt$), the second duty solenoid valve 1022 is operated at a duty rate corresponding to the computed pressure Ps at step S105. In this case, the computed pressure Ps is also set immediately below a level appropriate for locking the forward clutch 41, likely for the 4-3 gear shift. When the turbine attains the immediate shift-end turbine speed ($Nt_o-\Delta Nt$), the duty ratio is decreasingly altered to 0% at a fixed rate through steps S106 and S107.

Figure 42:
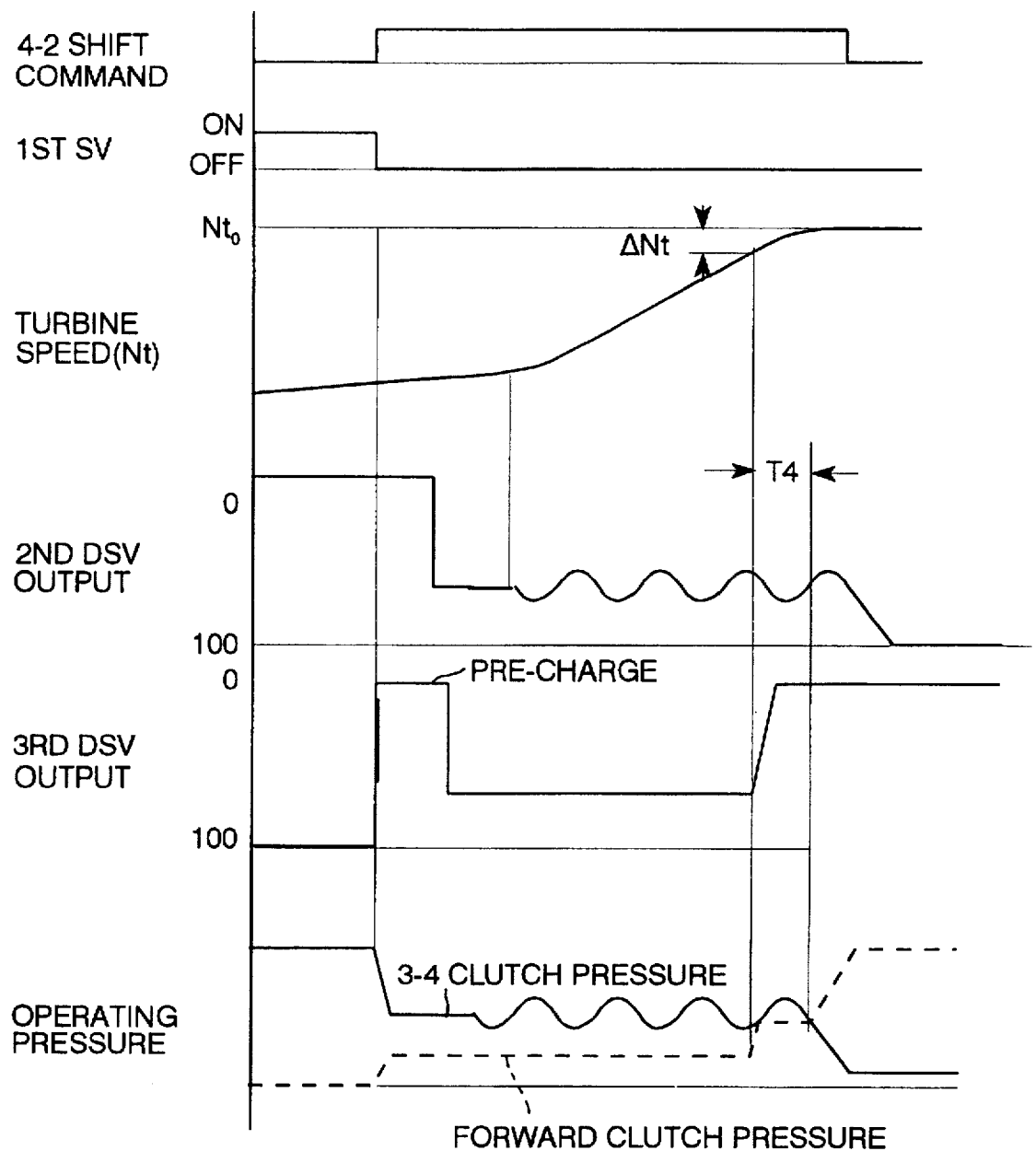
FIG. 42 is a time chart showing changes in various factors during the 4-2 shift.

With the pressure supply control, the forward clutch pressure is held immediately below a level for coupling the forward clutch 41 during slippage of the 3-4 clutch 43 which in turn is allowed through the feedback control, as shown in FIG. 42. Further, by means of the slippage of 3-4 clutch 43, the forward clutch pressure is raised to the specified level when the turbine speed (Nt) has reached the immediate shift-end turbine speed ($Nt_o-\Delta Nt$), so as to couple the forward clutch 41 quickly without accompanying any delay in response.

A 4-1 gear shift is achieved by, on one hand, unlocking both 2-4 brake 44 and 3-4 clutch 43 and, on the other hand, locking the forward clutch 41. Accordingly, what is controlled are: the discharge of servo apply pressure by means of the first duty solenoid valve 1021; the discharge of servo release pressure and 3-4 clutch pressure by means of the second duty solenoid valve 1022 with communication between the servo release pressure line 1121 and 3-4 clutch pressure line 1127 through the 3-4 shift valve 1005, and the supply of forward clutch pressure by means of the third duty solenoid valve 1023. In this case, because a torque demand 4-1 gear shift resulting from an increase in engine throttle opening is concluded through operation of the one-way clutch 46, the feedback control is not executed with respect to any operating pressure.

Figure 43:
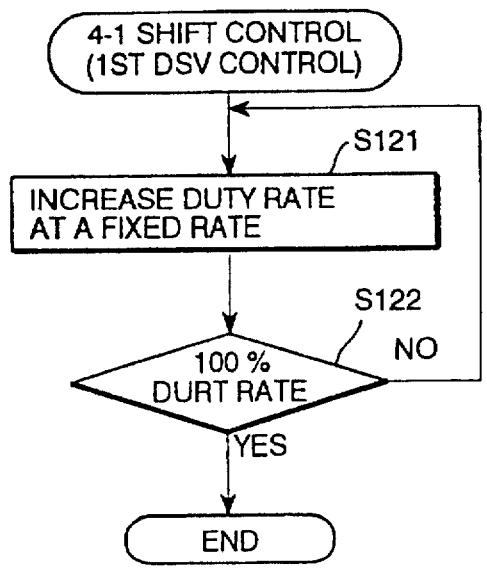
FIG. 43 is a flowchart illustrating a control sequence for the first duty solenoid valve (DSV) during a 4-1 shift.
Figure 46:
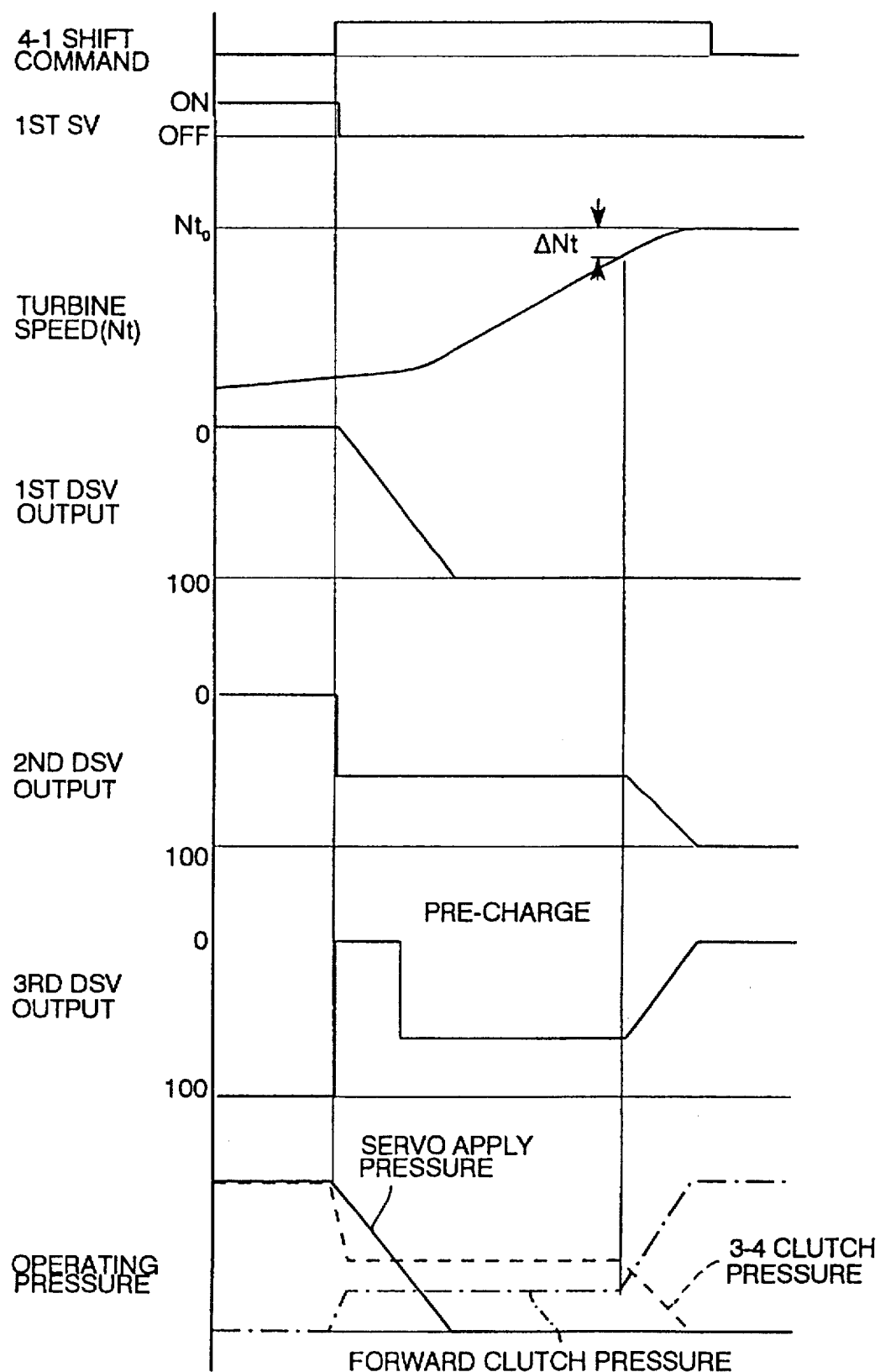
FIG. 46 is a time chart showing changes in various factors during the 4-1 shifting.

The discharge control of servo apply pressure by means of the first duty solenoid valve 1021 is executed in accordance with the program shown in FIG. 43. This control consists of only causing an increase in duty rate of the first duty solenoid valve 1021 from 0 to 100% at a fixed rate through steps S121 and S122 in response to an occurrence of a shift command. As a result, as shown in FIG. 46, the servo apply pressure is discharged relatively quickly at a fixed gradient or rate.

Figure 44:
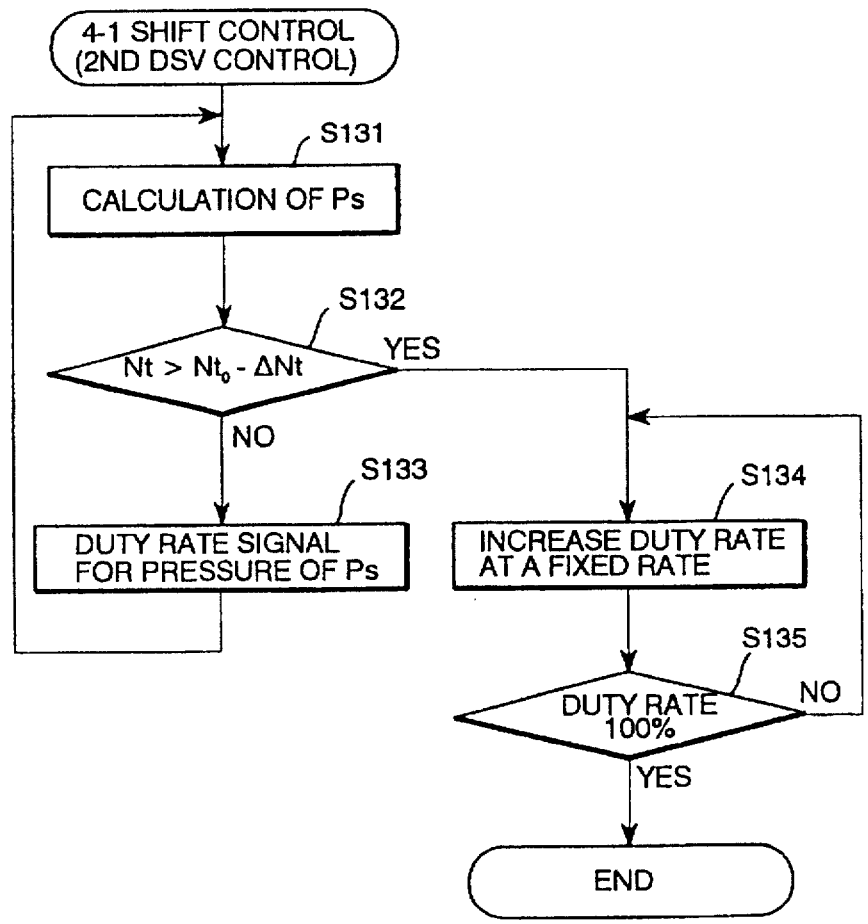
FIG. 44 is a flowchart illustrating a control sequence for the second duty solenoid valve (DSV) during the 4-1 shift.

In addition, the discharge control of servo release pressure and 3-4 clutch pressure through the second duty solenoid valve 1022 is executed in accordance with the program shown in FIG. 44. First, after founding the computed pressure Ps at step S131, a decision is made at step S132 as to whether or not the turbine speed (Nt) has reached as high as the immediate shift-end turbine speed ($Nt_o - \Delta Nt$). Until the immediate shift-end turbine speed ($Nt_o - \Delta Nt$) is attained, the second duty solenoid valve 1022 is operated at a duty rate corresponding to the computed pressure Ps at step S133. In this instance, the computed pressure Ps is found from a map which has been established such that the computed pressure becomes higher with an increase in turbine speed immediately prior to a gear shift. The 3-4 clutch 43 is allowed to slip suitably by the control of 3-4 clutch pressure through the second duty solenoid valve 1022 at a duty rate corresponding to the computed pressure Ps. That is, the turbine speed (Nt) is risen smoothly by allowing slippage of the 3-4 clutch 43 after the 2-4 brake 44 has been unlocked quickly.

When the turbine speed (Nt) reaches the immediate shift-end turbine speed ($Nt_o - \Delta Nt$), the duty ratio is increasingly altered to 100% at a fixed rate through steps S134 and S135. As a result, the 3-4 clutch 53 is completely unlocked.

Figure 45:
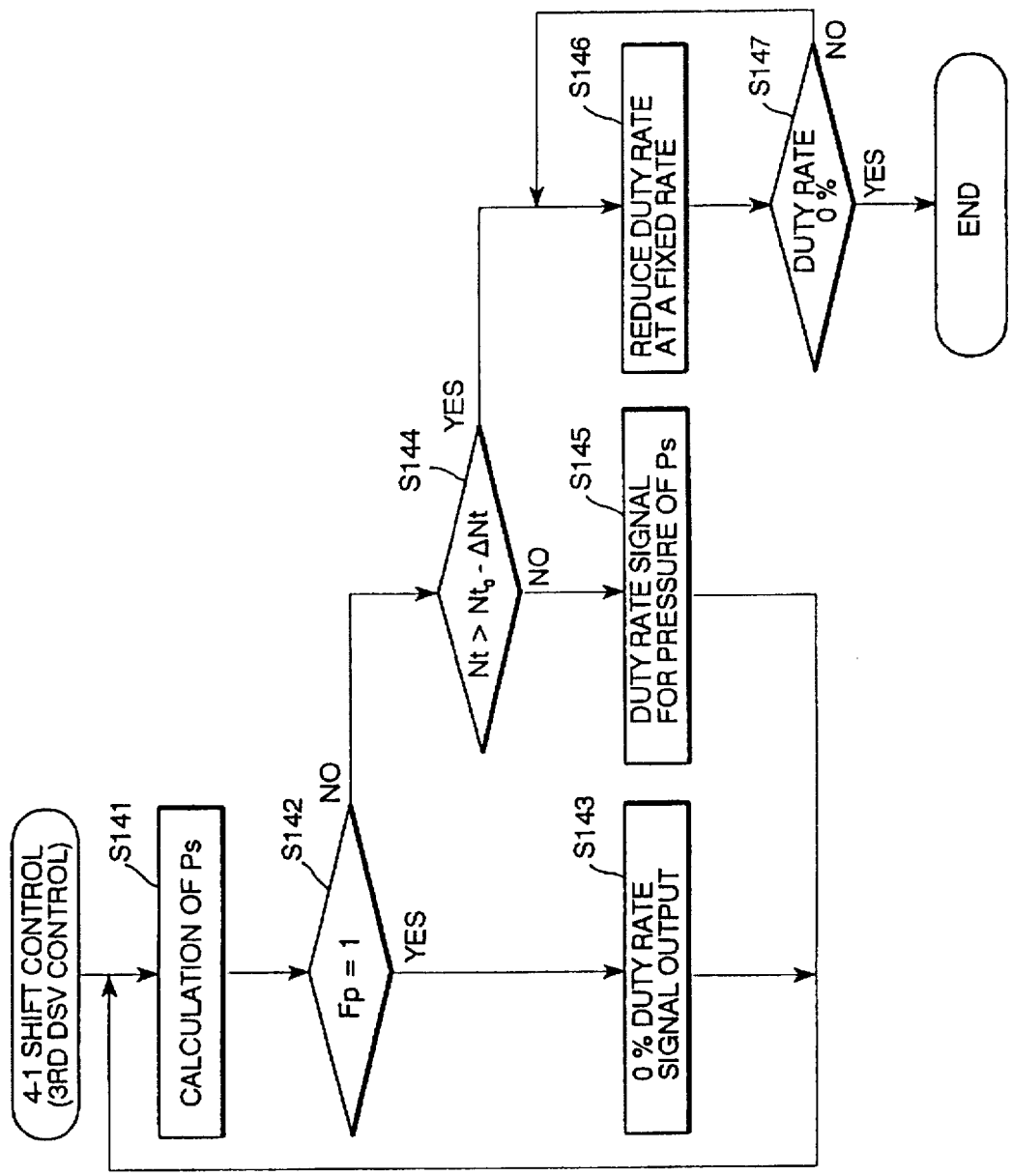
FIG. 45 is a flowchart illustrating a control sequence for the third duty solenoid valve (DSV) during the 4-1 shifting.

Supply control of forward clutch pressure through the third duty solenoid valve 1023 is executed in accordance with the program shown in FIG. 45. This control takes the same sequence as the control of the third duty solenoid valve 1023 during a 4-2 gear shift. That is, after finding the computed operating pressure Ps at step S141, during the pre-charge period (Fp=1), the operating pressure is fill quickly in the pressure line leading to the pressure chamber of forward clutch 41 through the third duty solenoid valve 1023 operating at a duty rate of 0% through steps S142 and S143. On the other hand, when the pre-charge period is concluded (Fp=0), a decision is made at step S144 as to whether or not the turbine speed (Nt) has risen as high as the immediate shift-end turbine speed ($Nt_o - \Delta Nt$). Until the attainment of the immediate shift-end, the second duty solenoid valve 1022 is operated at a duty rate corresponding to the computed pressure Ps at step S145. In this case, the computed pressure Ps is at the same level as that during the 4-3 gear shift or the 4-2 gear shift with respect to the fact that the operating pressure holds the forward clutch 41 in the state immediately prior to locking.

When the turbine speed (Nt) has risen as high as the speed immediately prior to completion of the immediate shift-end turbine speed ($Nt_o - \Delta Nt$), the duty rate is decreasingly altered to 0% at a fixed rate through steps S146 and S147. By means of this control, while the forward clutch pressure is held at a level which is appropriate to place the 3-4 clutch 53 in a state immediately prior to locking during the slippage control, as shown in FIG. 46, it is raised quickly when the turbine attains the immediate shift-end turbine speed ($Nt_o - \Delta Nt$) with a result of complete locking of the forward clutch 41.

As one mode of down-shifts, other than torque demand down-shifts which accompany an increase in engine throttle opening, there is an under-coast down-shift. As compared with a torque demand 4-3 down-shift in which the operating pressure for unlocking a friction coupling element, i.e. the 2-4 brake 44, is feedback control so as to raise the turbine speed (Nt) to a speed desired after the gear shift, the under-coast down-shift is achieved by controlling locking a friction coupling element, for instance the forward clutch 41 in an under-coast 4-3 down shift, so as thereby to raise the turbine speed (Nt). In this locking control, since the forward clutch 41 has a great capacity so as to be able to bear a large portion of torque during acceleration, it is essential for the forward clutch 41 to be given minute control with operating pressure at a low level during coasting where input torque to the forward clutch 41 is extremely small.

In another aspect, output characteristics of duty solenoid valves have a region where the duty solenoid valve experiences sudden changes in output pressure relative to changes in duty rate in a region of low pressure which are provided while the clutch piston is stroking. Due to that region of sudden output pressure changes, it is significantly difficult to control locking the forward clutch which is necessary to be performed within the low pressure region. For this reason, an accumulator is utilized to accomplish the locking control of the forward clutch 41 by means of the third duty solenoid valve 1023 with satisfaction during the under-coast 4-3 gear shift.

As shown in FIG. 18, when a 4-3 shift command is provided during coasting, the first solenoid valve 1021 is switched from ON to OFF, causing the 3-4 shift valve 1005 to shift the spool to the left end position as viewed in FIG. 18 so as thereby to bring the first accumulator 1041 into communication with the forward clutch pressure line 1119. Coincidentally, the feedback control is commenced over forward clutch pressure by means of the third duty solenoid valve 1023. Shifting the spool of 3-4 shift valve 1005 to the left end position provides communication between the servo release pressure line 1121 and 3-4 clutch pressure line 1127, so as to force 3-4 clutch pressure to enter the servo release pressure chamber 44b of 2-4 brake 44 as servo release pressure through the second duty solenoid valve 1022, thereby unlocking the 2-4 brake 44.

Figure 47:
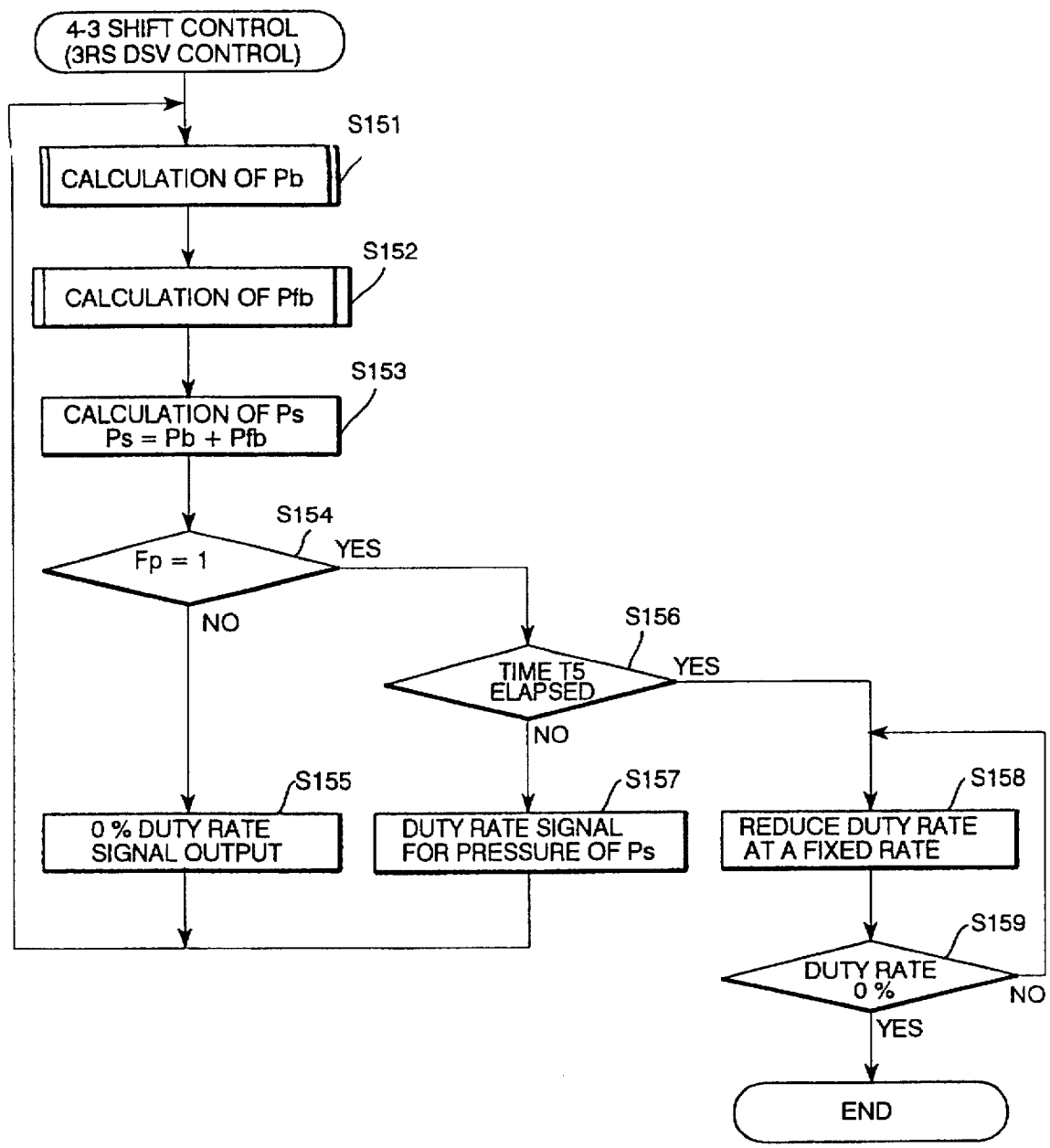
FIG. 47 is a flowchart illustrating a scheduled down-shift control sequence for the third duty solenoid valve (DSV) during a 4-3 shift.

Control of the supply of forward clutch pressure through the third duty solenoid valve 1023 during coasting is executed in accordance with the program shown in FIG. 47. First of all, through steps S151 and S152, calculations are made of the base pressure Pb and feedback pressure Pfb. Subsequently, at step S153, these pressure are added together in order to obtain the computed pressure Ps. Through steps S154 and S155, during the pre-charge period (Fp=1), the pre-charge control is executed, that is, the third duty solenoid valve 1023 is operated at a duty rate of 0%. When the pre-charge period is over (Fp=0), a decision is made at step S156 as to whether or not a specified backup time T5 has elapsed. Until a lapse of the backup time T5, at step S157, the third duty solenoid valve 1023 is operated at a duty rate corresponding to the computed pressure Ps. On the other hand, when the under-coast 4-3 gear shift is over, that is, the backup time T5 has elapsed, the duty ratio is reduced in a fixed rate until reaching a duty ratio of 0% through steps S158 and S159. In this instance, the calculations of those base pressure Pb and feedback pressure Pfb at steps S151 and S152, respectively, are executed in accordance with the same sequence as for the feedback control of servo apply pressure through the first duty solenoid valve 1021 during a torque demand 4-3 gear shift. Further, the feedback control is performed for the forward clutch pressure until a lapse of the backup time T5 after the attainment of the immediate shift-end turbine speed ($Nt_o - \Delta Nt$) in the same sequence as for the control of servo apply pressure during a torque demand 4-3 gear shift.

Figure 48:
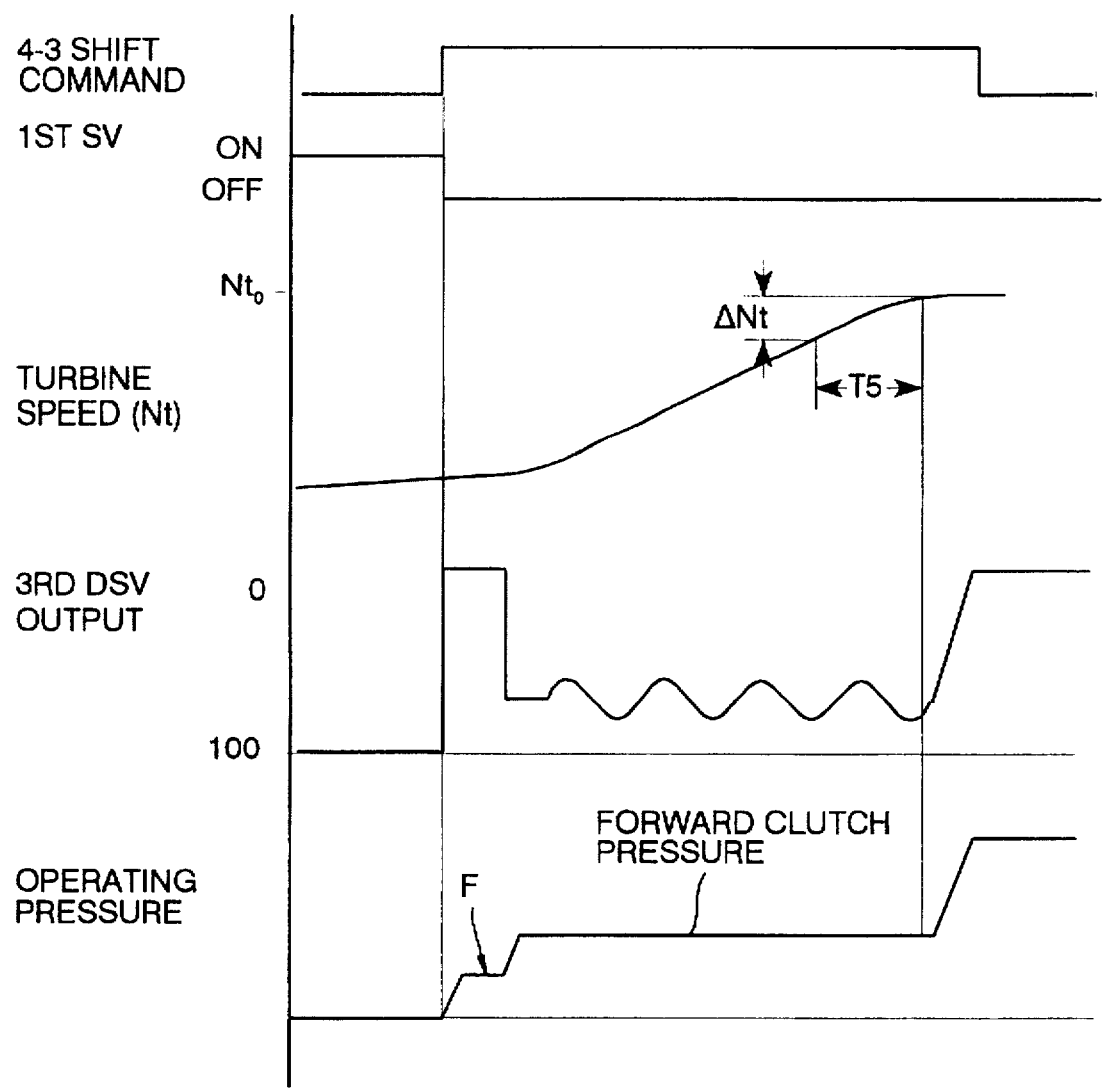
FIG. 48 is a time chart showing changes in various factors during the scheduled 4-3 shift.

With the forward clutch pressure control described above, as shown in FIG. 48, the turbine speed (Nt) increases during the control of forward clutch pressure. Particularly, performing the supply of operating pressure from the first accumulator 1041, in addition to the pre-charge control through the third duty solenoid valve 1023, enables the forward clutch pressure to raise up in a very short time at the beginning of the under-coast 4-3 gear shift, as indicated by a label "F". In addition, a dumping effect of the first accumulator 1041 mitigates a sharp change in output characteristics of the duty solenoid valve in the low pressure region, resulting in a smooth change in output pressure relative to changes in duty rate. With that control, the forward clutch pressure, which is particularly required to be controlled precisely in the low pressure region during the under-coast 4-3 gear shift, is satisfactorily realized.

In this instance, under-coast down-shifts, other than the 4-3 gear shift, do not require minute control, in particular, in the low pressure region and consequently, avoids any necessity of the feedback control such as described above.

Down-shifts to the first (1) gear in the low speed (L) range from any one of the second (2) gear to fourth (4) gear in the drive (D) range by manual operation of the shift lever will be hereafter described.

A down-shift from the second (2) gear in the drive (D) range to the first (1) gear in the low-speed (L) range (2-L1 gear shift) is achieved by unlocking the 2-4 brake 44 and locking the low reverse brake 45. In the hydraulic control circuit 1000, both first and second solenoid valves 1011 and 1012 switch from OFF to ON as shown in FIG. 20. Operating pressure is directed to the control port 1004a of bypass control valve 1004 through the first solenoid valve 1011, so as thereby to force the bypass control valve 1004 to shift the spool. Accompanying this, the operating pressure is directed and supplied to the control port 1003a of low-reverse shift valve 1003 through the second solenoid valve 1012 via the bypass control valve 1004, so as thereby to force the low-reverse shift valve 1003 to shift the spool. Resultingly, the pressure line 1114 downstream from the first duty solenoid valve 1021 is switched from communication with the servo apply pressure line 1115 to communication with the low-reverse brake pressure line 1116, enabling the discharge control of servo apply pressure and the supply control of low-reverse brake pressure through the first duty solenoid valve 1021 only.

Figure 49:
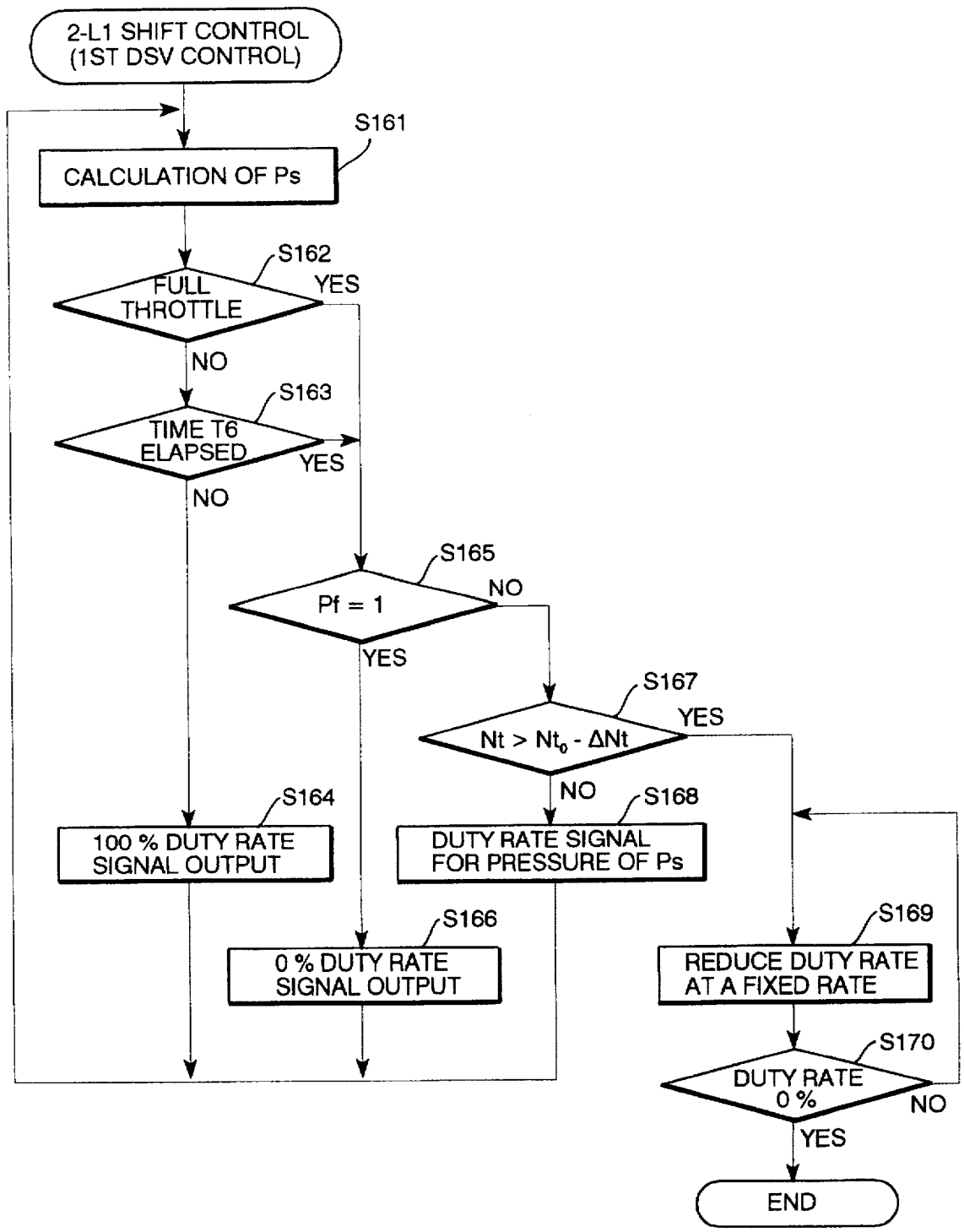
FIG. 49 is a flowchart illustrating a control sequence for the first duty solenoid valve (DSV) during a 2-L1 shift.

The control by means of the first duty solenoid valve 1021 during the 2-L1 manual down shift is executed in accordance with the program shown in FIG. 49. At step S161, the computed pressure Ps is found from the map. Similarly to the 3-4 clutch pressure map for 4-1 down shifts, this computed pressure Ps map defines the computed pressure which becomes higher as the turbine speed (Nt) prior to the gear shift becomes greater. Subsequently, a decision is made at step S162 as to whether or not the engine throttle opening is fully closed. When the engine throttle is not fully closed, the first duty solenoid valve 1021 is operated at a duty rate of 100% so as to be drained at its downstream side at step S163 if it is determined at step S164 that a specified delay time T6 has not elapsed. This is because, in the 2-L1 manual down shift during acceleration, the one-way clutch 46 is operated and, consequently, the transmission gear mechanism possibly experiences interlock if the low reverse brake pressure is supplied too early relative to discharging the servo apply pressure. For this reason, the low-reverse brake pressure is supplied after having completely discharged the servo apply pressure, so as thereby to prevent the transmission gear mechanism from interlocking. When the delay time T6 elapses, the control sequence proceeds to steps S165 and S166 for the pre-charge control.

Figure 50:
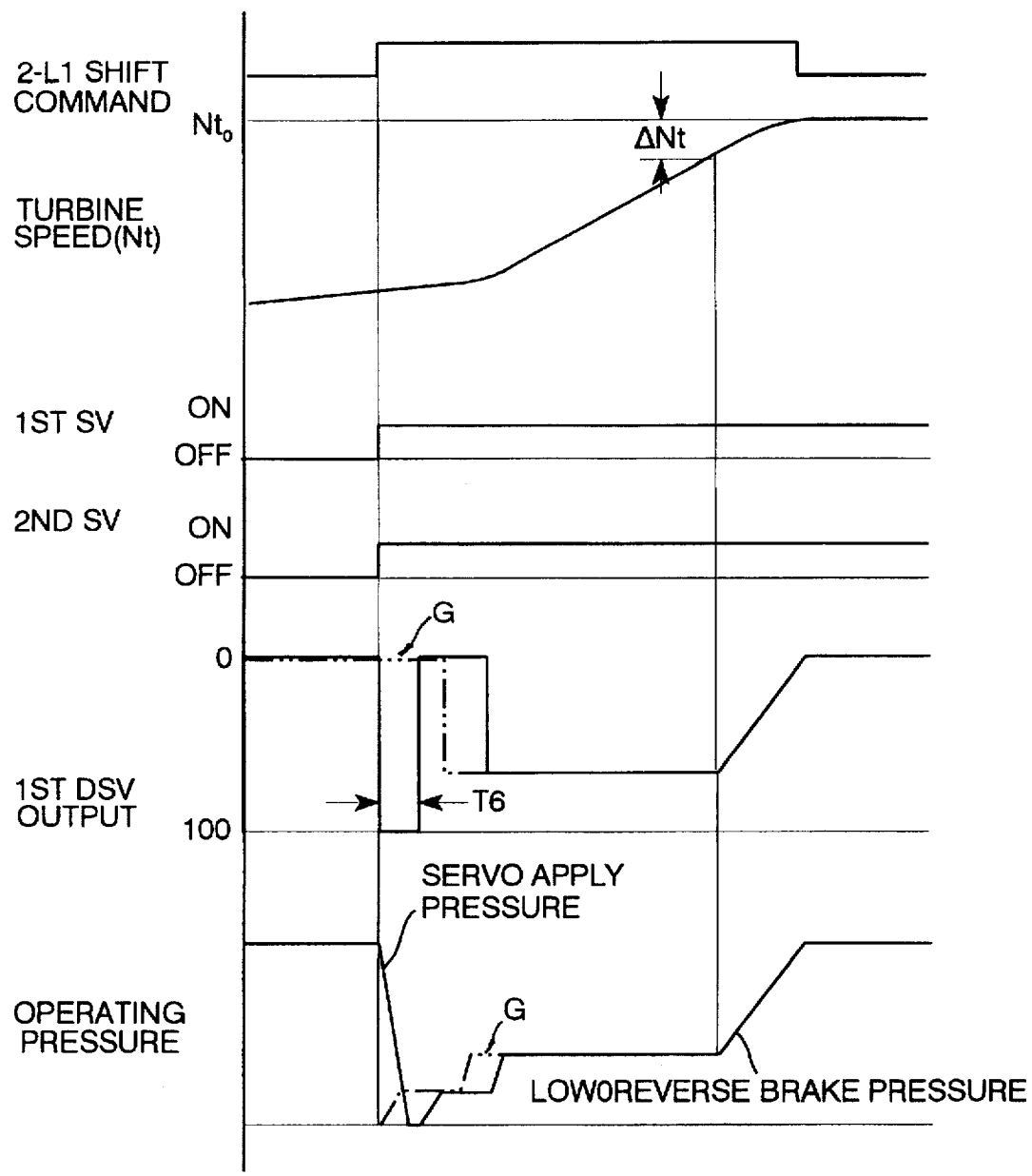
FIG. 50 is a time chart showing changes in various factors during the 2-L1 shift.

For the 2-L1 manual down shift with the engine throttle valve completely closed where the one-way clutch 46 does not operate and an immediate effect of engine brake is required, the pre-charge control is conducted promptly without following the delay time T6, using the servo apply pressure as the low-reverse brake pressure through steps S165 and S166, as indicated by label "G" in FIG. 50. That is, during the pre-charge period (FP=1), the first duty solenoid valve 1021 is operated at a duty rate of 0% so as thereby to fill promptly the pressure line leading to the pressure chamber of low-reverse brake 45 with the operating pressure.

In the hydraulic control circuit 1000, the operating pressure that is supplied the servo apply pressure chamber 44a of 2-4 brake 44 through the first duty solenoid valve 1021 in the second (2) gear is introduced into and accumulated in the second accumulator 1042 and then, supplied to the pressure chamber of low-reverse brake 45 through the low-reverse valve 1003 during the gear shift to the first (1) gear in the low-speed (L) range, so that the period of pre-charge control by the first duty solenoid valve 1021 is correspondingly shortened.

When the pre-charge control is concluded (Fp=0), a decision is made at step S167 as to whether the turbine speed (Nt) has reached the immediate shift-end turbine speed (Nt$_o$–ΔNt). Until the immediate shift-end turbine speed (Nt$_o$–ΔNt) is attained, the first duty solenoid valve 1021 is operated at a duty rate corresponding to the computed pressure at step S168, allowing the low-reverse brake 45 to cause appropriate slippage due to which an increase in turbine speed is caused. Subsequently, when the turbine speed (Nt) reaches the immediate shift-end turbine speed (Nt$_o$–ΔNt), the first duty solenoid valve 1021 is operated at a duty rate decreasingly altered to 0% at a fixed rate through steps S169 and S170 so as thereby to lock the low-reverse brake 45 completely.

A manual down shift to the first (1) gear in the low speed (L) range from the third (3) gear in the D range (3-L1 gear shift) is achieved as a result of locking the low reverse brake 45 by means of the first duty solenoid valve 1021 and unlocking the 3-4 clutch 43 by means of the second duty solenoid valve 1022. During the 3-L1 manual down shift, as was the case of the 2-L1 manual down shift, the first and second solenoid valves 1011 and 1012 are jointly switched from OFF to ON through the switch over of the bypass control valve 1004, causing the low reverse shift valve 1003 to switch the communication of pressure line 1114 downstream from the first duty solenoid valve 1021 from with the servo apply pressure line 1115 to with the low reverse brake pressure line 1116. By this means, control is accomplished for the discharge of servo apply pressure and the supply of low reverse brake pressure by means of the first duty solenoid valve 1021. However, during the 3-L1 manual down shift, since the relay valve 1007 is initially supplied with the 3-4 clutch pressure and consequently disconnects the communication between the first solenoid valve 1011 and bypass control valve 1004, the switch over of bypass control valve 1004 can not be accomplished even by means of the operating pressure from the first solenoid valve 1011, resulting in leaving the low reverse valve 1003 disabled to switch the communication of pressure line 1114 downstream from the first duty solenoid valve 1021.

For that reason, during the 3-L1 manual down shift, following jointly switching the first and second solenoid valves 1011 and 1012 to the ON state after the relay valve 1007 has shifted the spool to the right end position as shown in FIG. 20 as a result of discharging the 3-4 clutch pressure, the control of low reverse brake pressure supply through the first duty solenoid valve 1021 is effected. In this instance, discrimination of the spool position of relay valve 1007 is accomplished separately.

Figure 51:
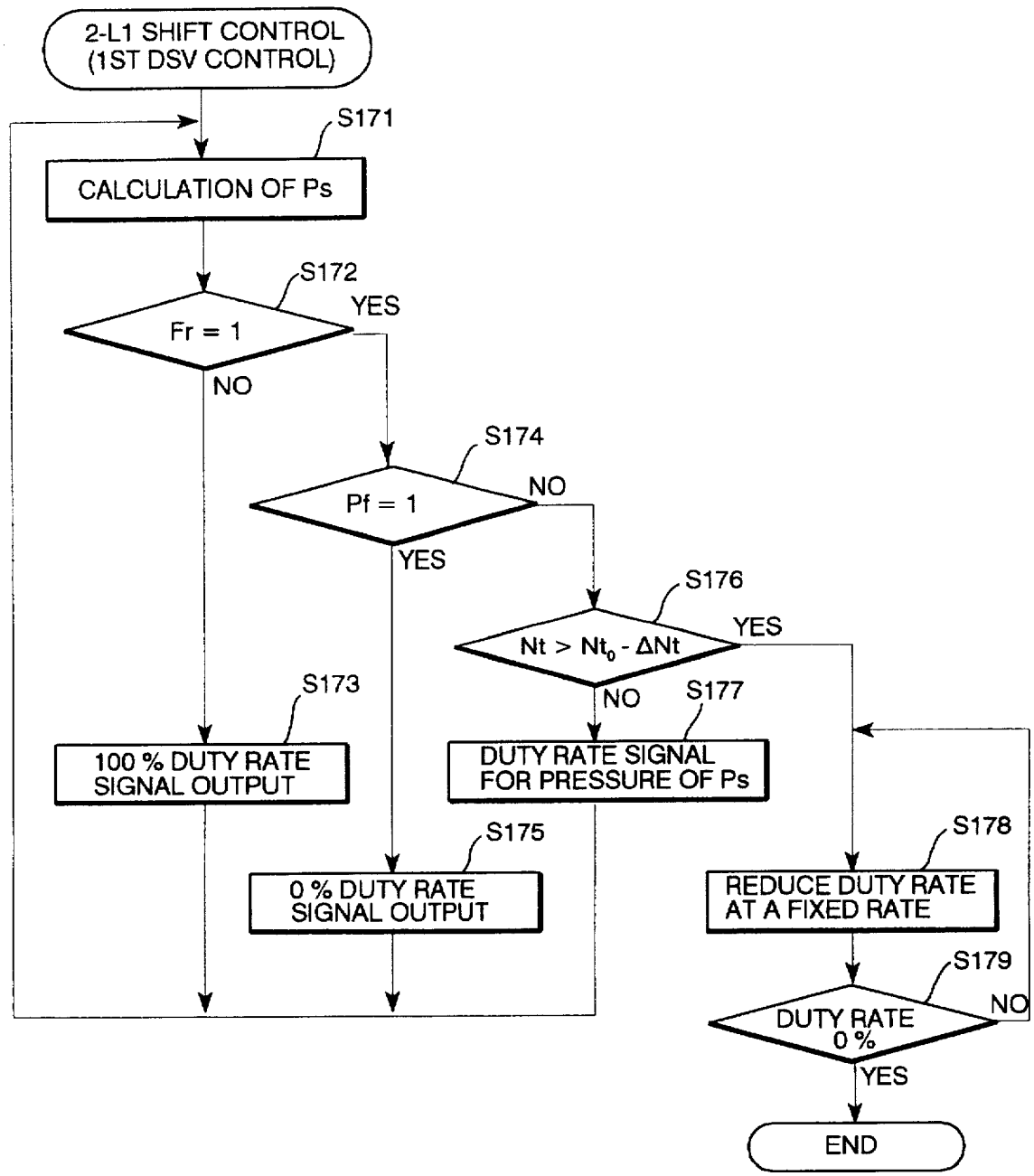
FIG. 51 is a flowchart illustrating a control sequence for the first duty solenoid valve (DSV) during a 3-L1 shift.
Figure 54:
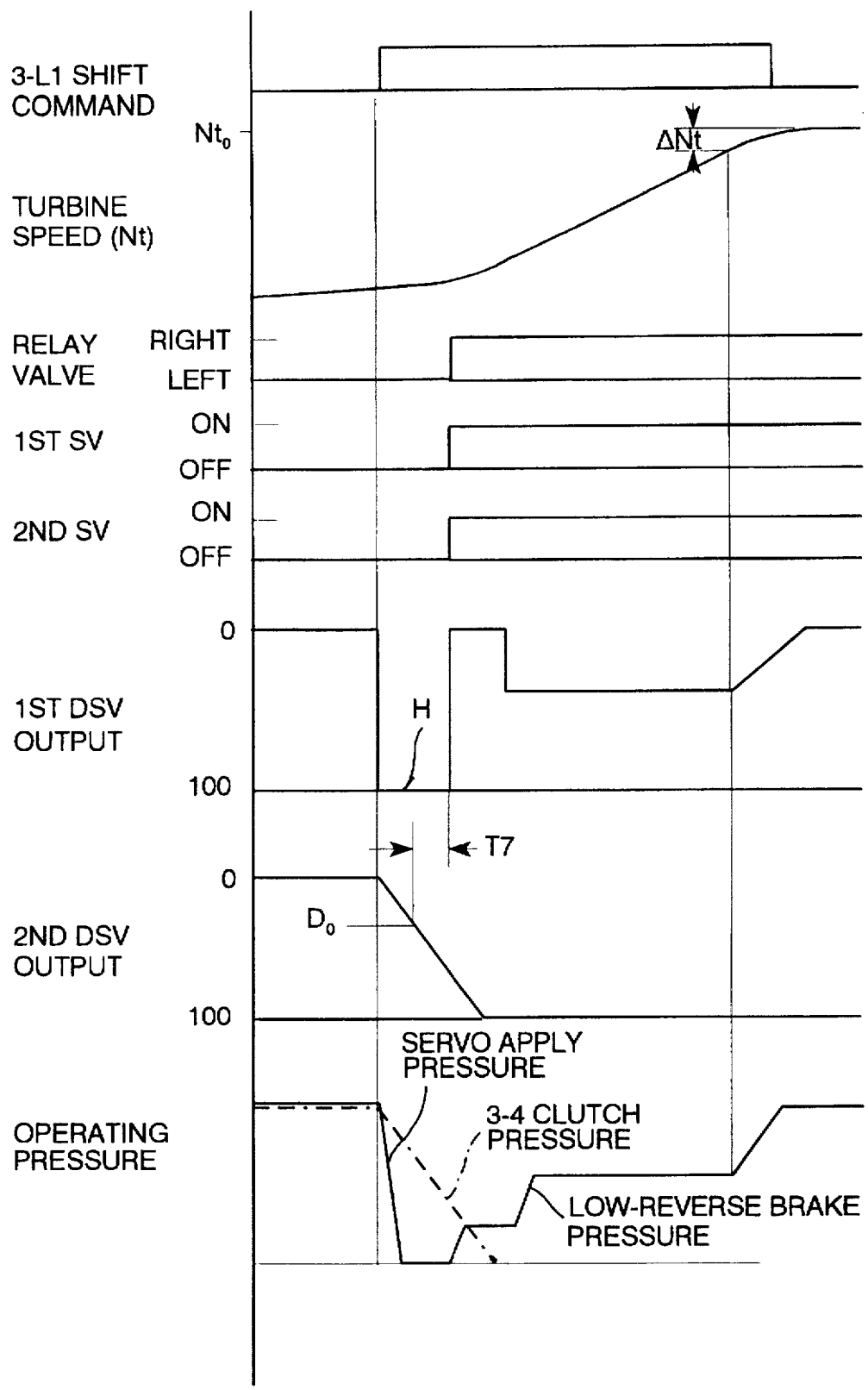
FIG. 54 is a time chart showing changes in various factors during the 3-L1 shift.

Control of the first duty solenoid valve 1021 during the 3-L1 manual down shift is executed in accordance with the program shown in FIG. 51. First of all, the computed pressure is found from a pressure map step S171. This pressure map is the same as that utilized for the 2-L1 manual down shift, which in turn defines computed pressure becoming higher with an increase in turbine speed prior to shifting. Subsequently, a decision is made at step S172 as to a relay valve position flag Fr. The relay valve position flag Fr indicates that, when it is up or set to 1, the relay valve 1007 has shifted its spool from the left end position to the right end position. If it is prior to shifting the spool (Fr=0), the first duty solenoid valve 1021 is operated at a duty rate held at 100% at step S173 so as thereby to drain its downstream side thereof. As was previously described, this is because, while the low reverse brake pressure can not be supplied prior to the spool shift, only the discharge of servo apply pressure is carried out as indicated by label "H" in FIG. 54. When the relay valve 1007 shifts its spool to the right end position (Fr=1), the control proceeds to pre-charge processes at steps S174 and S175. Specifically, during the period in which the pre-charge flag Fp has been up or set to 1, the first duty solenoid valve 1021 is operated at a duty rate held at 0% so as thereby to fill rapidly the pressure line leading to the pressure chamber of low reverse brake 45 with the operating pressure. On the other hand, when the pre-charge control is concluded (Fp=0), a decision is made at step S176 as to whether or not the turbine speed (Nt) has reached the immediate shift-end turbine speed (Nt$_o$–ΔNt). Before attainment of the immediate shift-end turbine speed (Nt$_o$–ΔNt), the first duty solenoid valve 1021 is operated at a duty rate corresponding to the computed pressure Ps at step S177. In this instance, the computed pressure Ps, which is given correspondingly to the turbine speed (Nt) immediately prior to shifting, allows the low reverse brake 45 to produce appropriate slippage necessary for the turbine to increase its speed.

Finally, when the turbine speed (Nt) reaches the immediate shift-end turbine speed (Nt$_o$–ΔNt), the duty rate is decreasingly altered at a fixed rate to 0% through steps S178 and S179. In such a way, the low reverse brake 45 is completely locked.

Figure 52:
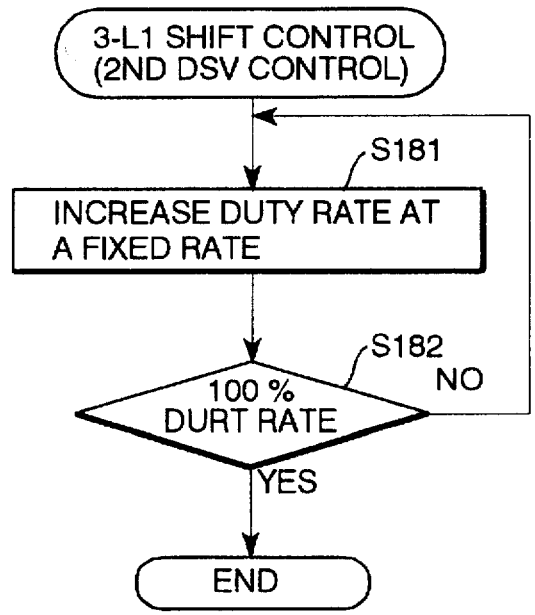
FIG. 52 is a flowchart illustrating a control sequence for the second duty solenoid valve (DSV) during the 3-L1 shift.

During the 3-L1 manual down shift, control of the discharge of 3-4 clutch pressure (as well as the servo release pressure) by means of the second duty solenoid valve 1022 is executed in accordance with the program shown in FIG. 52. Specifically, through steps S181 and S182, the duty rate of the second duty solenoid valve 1022 is increasingly altered at a fixed rate until reaching 100%. With this increasing duty rate, the 3-4 clutch pressure is discharged with a linear gradient or at a fixed rate following an occurrence of a shift command, unlocking the 3-4 clutch 53.

Figure 53:
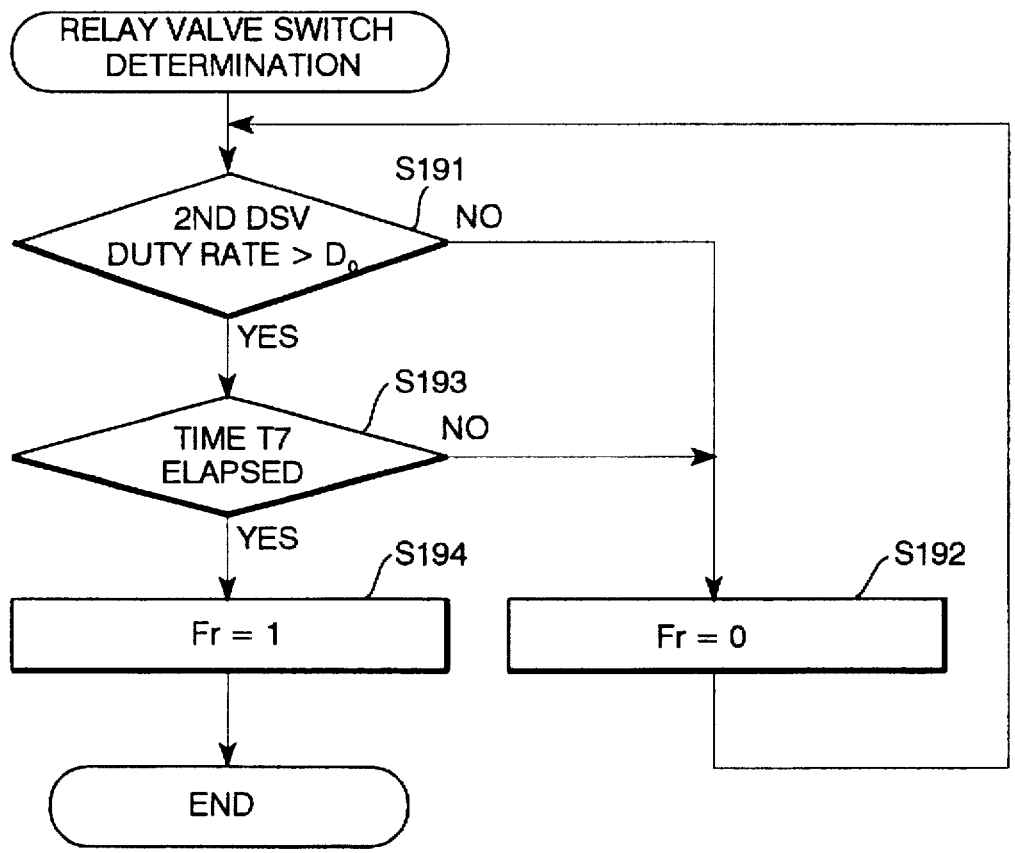
FIG. 53 is a flowchart illustrating a relay valve position determination sequence for a relay valve during the 3-L1 shift.

Switching the relay valve 1007 in spool position resulting from switching of the first and second solenoid valves 1011 and 1012 from OFF to ON which in turn is the necessary condition of commencement of the control of low reverse brake pressure by means of the first duty solenoid valve 1021 are judged in accordance with the program shown in FIG. 53. Specifically, first of all, a decision is made at step S191 as to whether or not the second duty solenoid valve 1022 is operating at a duty rate greater than a specified rate D$_0$, in other words, whether or not the 3-4 clutch pressure discharged by means of the second duty solenoid valve 1022 is less in level than a specific pressure corresponding to the expansion force of the return spring of relay valve 1007. Until it is reduced below the specific pressure, the relay valve position flag Fr is held down or set to 0 at step S192. When it becomes less in level then the specific pressure, i.e. the duty rate becomes greater then the specified rate, then, at step S193, a lapse of a specified time T7 is waited.

When the specified time T7 has elapsed, the relay valve position flag Fr is set to 1 at step S194 which is followed by turning ON of the first and second solenoid valves 1011 and 1012, starting the control of low reverse brake pressure.

A manual gear shift to the first (1) gear in the low-speed (L) range from the fourth (4) gear in the drive (D) range is achieved in almost the same sequence as the 3-L1 manual dow shift, with the exception that the locking of forward clutch 41 is needed.

Figure 55:
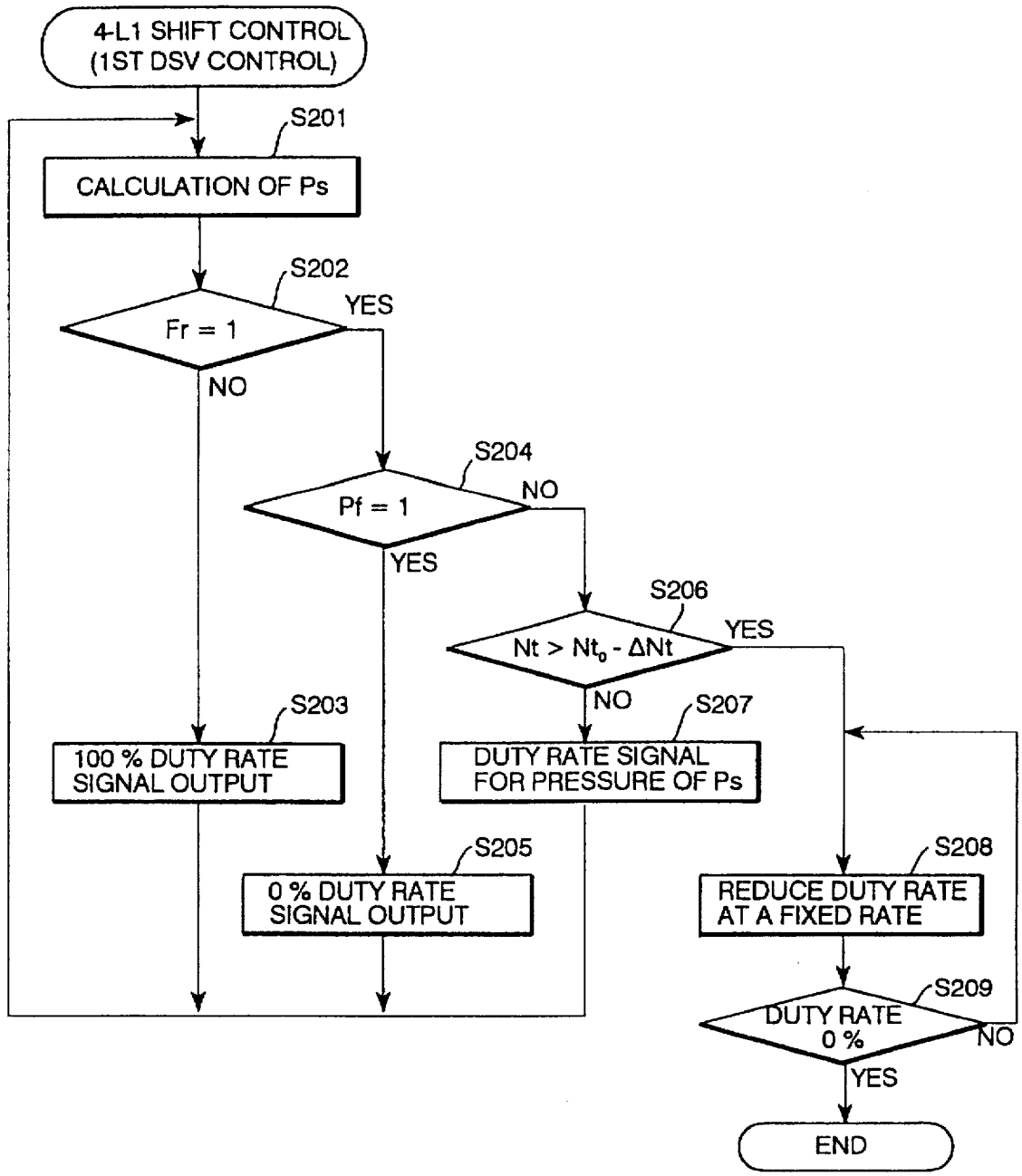
FIG. 55 is a flowchart illustrating a control sequence for the first duty solenoid valve (DSV) during a 4-L1 shift.

Control of the 4-L1 manual down shift by means of controlling the first duty solenoid valve 1021 is executed in accordance with the program shown in FIG. 55. At step S201, the computed pressure Ps is found from a map similar to that used for the 2-L1 manual down shift, following which, the first duty solenoid valve 1021 is operated at a duty rate held at 100% so as thereby to discharge the servo apply pressure quickly until it is determined the relay valve 1007 has switched (Fr=0) through steps S202 and S203. When the relay valve 1007 has switched (Fr=1), the pre-charge control is executed by operating the first duty solenoid valve 1021 at a duty rate of 0% for the pre-charge period (Fp=1) through steps S204 and S205. On the other hand, when the pre-charged period is over (Fp=0), then, at step S206, a decision is made as to whether or not the turbine speed (Nt) has reached the immediate shift-end turbine speed (Nt$_o$–ΔNt). Before the turbine speed (Nt) reaches the immediate shift-end turbine speed (Nt$_o$–ΔNt), the first duty solenoid valve 1021 is operated at a duty rate altering corresponding to the computed pressure Ps.

With this control, the low reverse brake 45 is allowed to produce appropriate slippage for providing an increase in turbine speed. Subsequently, when the turbine speed (Nt) reaches the immediate shift-end turbine speed (Nt$_o$–ΔNt), the first duty solenoid valve 1021 is operated at a duty rate decreasingly altering at a fixed rate to 0% through steps S208 and S209 with a result of locking completely the low reverse brake 45.

Figure 56:
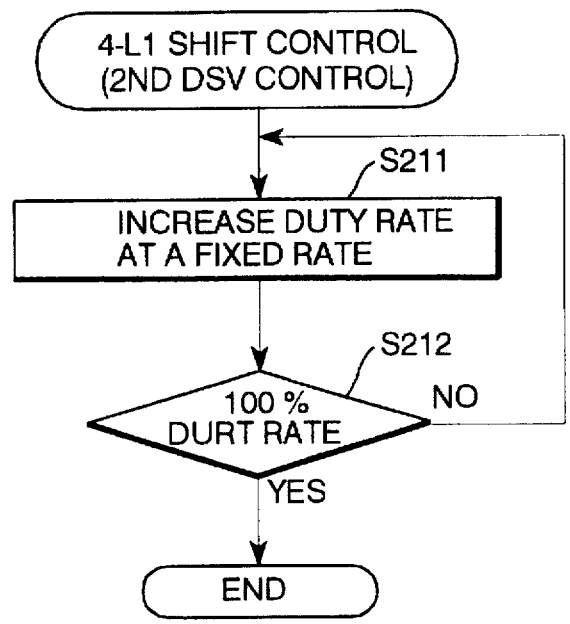
FIG. 56 is a flowchart illustrating a control sequence for the second duty solenoid valve (DSV) during the 4-L1 shift.

During the 4-L1 manual down shift, control is executed for discharging the 3-4 clutch pressure (as well as the servo release pressure) through the second duty solenoid valve 1022 in accordance with the program shown in FIG. 56. Following having increasingly altered the duty rate of the second duty solenoid valve 1022 at a fixed rate to 100% through steps S201 and S202. By means of this control, the 3-4 clutch pressure is discharged at a linear gradient or fixed rate following an occurrence of a shift command, causing the 3-4 clutch 43 to unlock.

Figure 57:
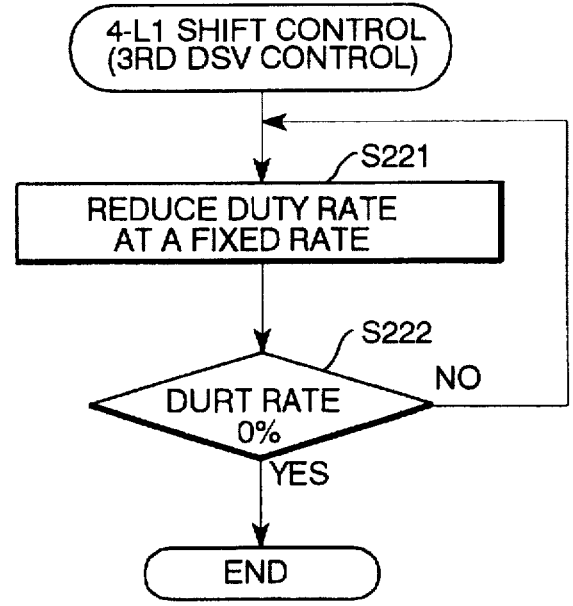
FIG. 57 is a flowchart illustrating a control sequence for the third duty solenoid valve (DSV) during the 4-L1 shift.
Figure 58:
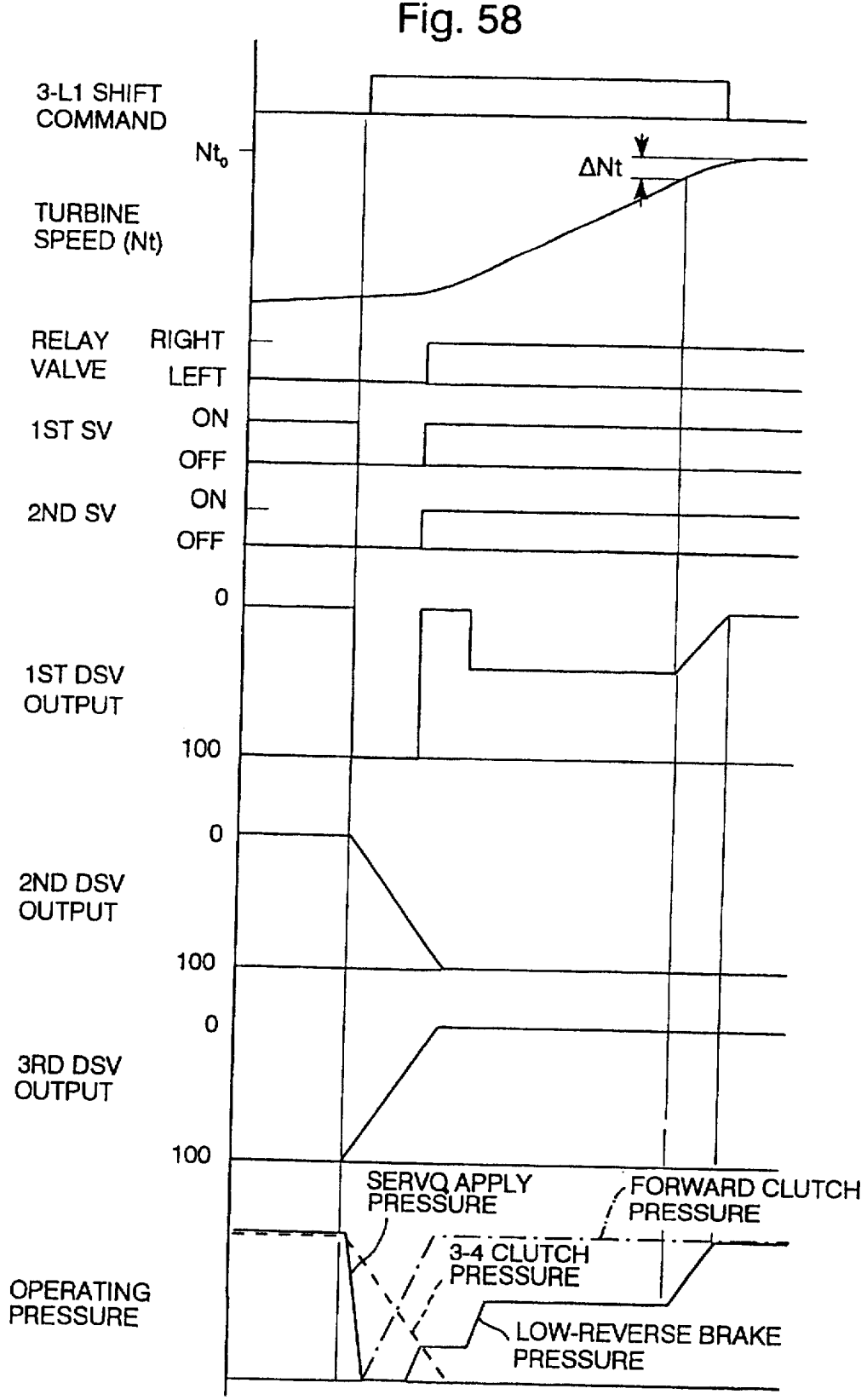
FIG. 58 is a time chart showing changes in various factors during the 4-L1 shift.

Together, control is executed for the forward clutch pressure by means of the third duty solenoid valve 1023 in accordance with the program shown in FIG. 57. Through steps S211 and S212, the duty rate for the third duty solenoid valve 1023 is decreasingly altered at a fixed rate until it reaches 0%. As a result of the linear increase in duty rate, the forward clutch pressure is discharged at a linear gradient or fixed rate following an occurrence of a shift command, causing the forward clutch 41 to lock. In this instance, the forward clutch 41 locks in advance of the locking of low reverse brake 45 but after the unlocking of 2-4 brake 44 by means of the first duty solenoid valve 1021, i.e. during a neutral state, it is not necessary for the forward clutch pressure to be minutely feedback controlled.

Figure 59:
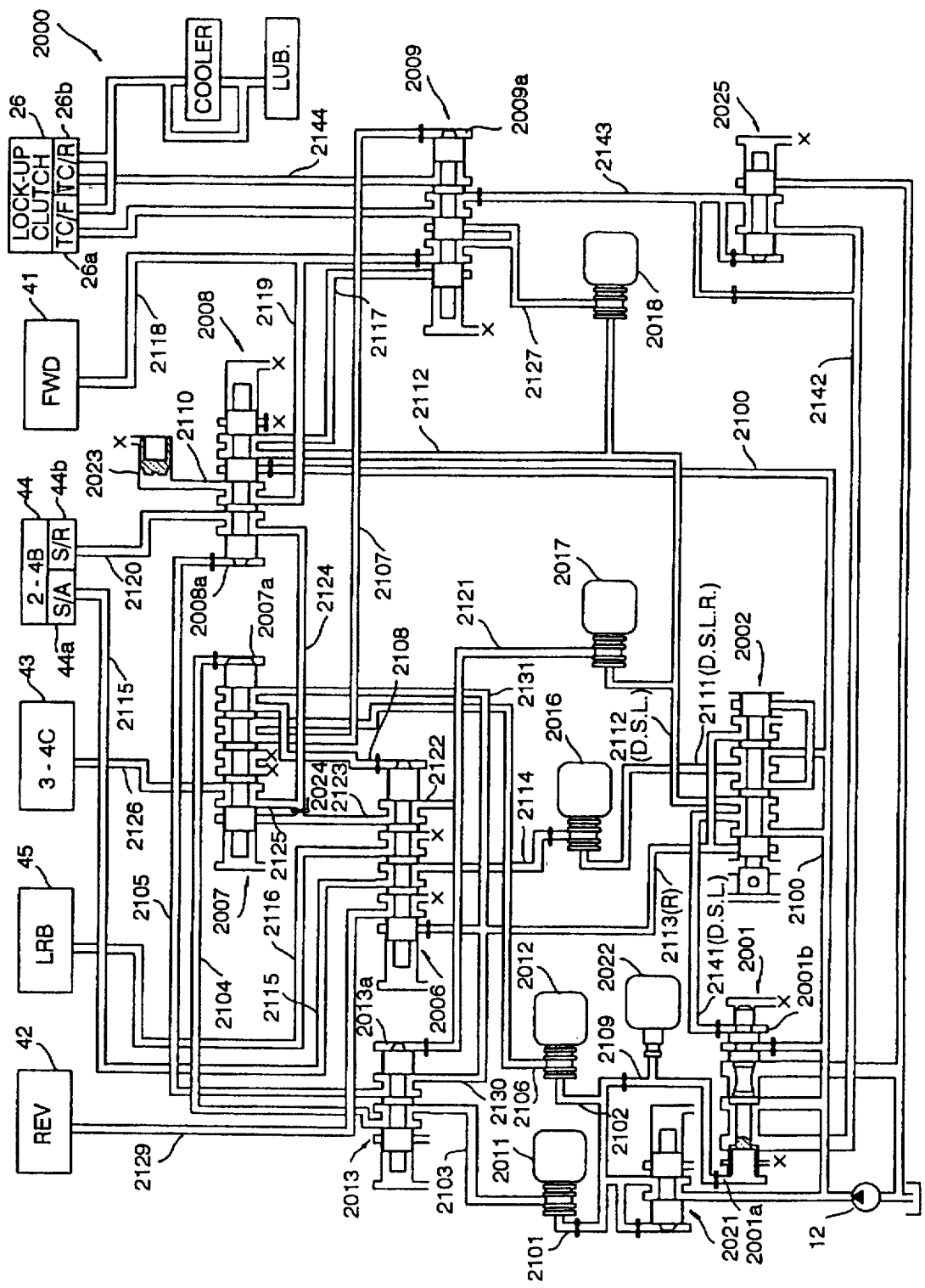
FIG. 59 is a hydraulic control circuit incorporated in the automatic transmission according to a further preferred embodiment of the present invention.

FIG. 59 shows a basic structure of a hydraulic pressure control circuit 2000 in accordance with a further embodiment of the present invention, in which friction coupling elements and various valves per se are the same in structure and operation as those in the previously described hydraulic pressure control circuits. The hydraulic pressure control circuit 2000 includes various valves as essential elements. The valves includes at least a regulator valve 2001 for generating a line pressure, a manual shift valve 2002 for shifting ranges of the automatic transmission 10 according to manual range selections through a shift lever, a low reverse shift valve 2006 for switching pressure lines leading to the friction coupling elements 41–45 during gear shifts, a bypass control valve 2007, a 3-4 shift valve 2008, a lock-up control valve 2009, first and second solenoid valves 2011 and 2012 for causing these valves 2006–2009, a relay valve 2013 for changing destination of operating pressure provided by means of the first and second solenoid valves 2011 and 2012, and first to third duty solenoid valves 2016–2018 for generating, regulating and discharging and supplying operating pressure relating to the friction coupling elements 41–45. Those solenoid valves 2011, 2012 and 2016–1018 are of a three-way type having operating modes, namely a communication mode where hydraulic pressure is allowed to flow in a pressure line from the upstream side to the downstream side and vice versa and a drain mode where hydraulic pressure is drawn from the downstream pressure line. In the drain mode, the valve shuts off its related upstream pressure line. Each of the solenoid valves 2011 and 2012 opens the upstream and downstream pressure lines when it turns ON; and each of the duty solenoid valves 2016–2018 provides communication between its upstream and downstream pressure lines when it turns OFF or operates at a duty rate of 0%. Further, each duty solenoid valve 2016–2018 regulates upstream pressure according to a duty rate and delivers it as downstream pressure. Each solenoid valve is the same in structure and operation as that in the hydraulic pressure control circuit 1000 previously described.

The regulator valve 2001 regulates operating pressure discharged by the oil pump 12 to a specified level of line pressure which in turn is delivered to the manual shift valve 2002 through a main pressure line 2100 and also to a solenoid reducing valve (which is hereafter referred to simply as a reducing valve) 2021 and the 3-4 shift valve 2008. The line pressure is reduced by the reducing valve 2021 to a fixed pressure level and then, delivered to both first and second solenoid valves 2011 and 2012 through pressure lines 2101 and 2102, respectively. When the first solenoid valve 2011 is ON, the fixed level of line pressure is directed thereby to the relay valve 2013 through a pressure line 2103 and, when the relay valve 2013 holds its spool in the right end position as viewed in FIG. 59, further directed to the control port 2007a of bypass control valve 2007 as pilot pressure through a pressure line 2104. As a result, the bypass control valve 2007 shifts its spool to the left end position as viewed in FIG. 59. On the other hand, when the relay valve 2013 holds the spool in the left end position, the fixed level of line pressure is delivered to the control port 2008a of 3-4 shift valve 2008 as pilot pressure through a pressure line 2105 and forces the 3-4 shift valve 2008 to shift the spool to the right end position.

When the second solenoid valve 2012 is ON, the fixed level of line pressure from the reducing valve 2021 is delivered to the bypass control valve 2007 through a pressure line 2106 and, when the bypass control valve 2007 holds its spool in the right end position, further directed to the control port 2009a of lock-up control valve 2009 as pilot pressure through a pressure line 2107. As a result, the line pressure causes the lock-up control valve 2009 to shift the spool to the left end position. On the other hand, when the bypass control valve 2007 holds the spool in the left end position, the fixed level of line pressure is delivered to the control port 2006a of low-reverse shift valve 2006 as pilot pressure through a pressure line 2108 and forces the low-reverse shift valve 2006 to shift the spool to the left end position.

Further, the fixed level of line pressure from the reducing valve 2021 is also delivered to the regulation port 2001a of regulator valve 2001 through a pressure line 2109. In this instance, the fixed level of line pressure is regulated according to, for instance, engine load by means of a linear solenoid valve 2022 installed in the pressure line 2109. In this way, the line pressure is regulated according to engine load by means of the regulator valve 2001. The main pressure line 2100 leading to the 3-4 shift valve 2008 is held in communication with an accumulator 2023 through a pressure line 2110 when the 3-4 shift valve 2008 holds its spool in the right end position, so as thereby to introduce the line pressure into the accumulator 2023.

The line pressure delivered to the manual shift valve 2002 through the main pressure line 2100 is introduced into a first output pressure line 2111 and a second output pressure line 2112 in each of forward ranges, i.e. the drive (D) range, slow speed (S) range and low speed (L) range; into the first output pressure line 2111 and a third output pressure line 2113 in the reverse (R) range; and into the third output pressure line 2113 in the neutral (R) range. The first output pressure line 2111 leads for delivery of the line pressure to the first duty solenoid valve 2016 as control source pressure. The first duty solenoid valve 2016 leads at its downstream side to the low reverse shift valve 2006 through a pressure line 2114 and, when the low reverse shift valve 2006 holds the spool in the right end position, further leads to the servo apply pressure chamber 44a of 2-4 brake 44 through the servo apply pressure line 2115. The second output pressure line 2112 leads for the supply of line pressure to both second duty solenoid valve 2017 and third duty solenoid valve 2018 as control source pressure, the first duty solenoid valve 1021 and further leads to the 3-4 shift valve 2008. When the second output pressure line 2112, which leads to the 3-4 shift valve 2008, holding the spool in the left end position, it further leads to the lock-up shift valve 2009 through the pressure line 2117 and, when the lock-up shift valve 2009 holds the spool in the left end position, further leads to the pressure chamber of forward clutch 41 through the pressure line 2118. A pressure line 2119 branching off from the forward clutch pressure line 2118 leads to the 3-4 shift valve 2008 which in turn the 3-4 shift valve 2008 holds the spool in the left end position, selectively provides communication of the pressure line 2119 with the accumulator 2023 through the pressure line 2110 when holding the spool in the right end position and communication of the pressure line 2119 with the servo release pressure chamber 44b of 2-4 brake 44 through the servo release pressure line 2120.

The second duty solenoid valve 1022, which is supplied with control source pressure through the second output pressure line 2112, leads at its downstream side to the control port 2013a of relay valve 2013 through a pressure line 2121 and supplies pilot pressure with which the relay valve 2013 is forced to shift its spool to the left end position. A pressure line 2122 branching off from the pressure line 2121 leads to the low-reverse shift valve 2006 which further leads to the pressure line 2123 when holding the spool in the right end position. Branching off from the pressure line 2124 which branches off from the pressure line 2123 through an orifice 2024 is a pressure line 2125 which in turn leads to the bypass control valve 2007. The pressure line 2125 further leads to the pressure chamber of 3-4 shift valve 2008 when the bypass control valve 2007 holds the spool in the right end position. Further, the pressure line 2123 leads directly to the bypass control valve 2007 which in turn provides communication of the pressure line 2123 with the pressure line 2124 through the pressure line 2125, when holding the spool in the left end position.

The third duty solenoid valve 2028, which is supplied with control source pressure through the second output pressure line 2112, leads at the downstream side to the lock-up control valve 2009 through a pressure line 2127. The lock-up control valve 2009 selectively provides communication of the third duty solenoid valve 2018 with the forward clutch pressure line 2118 when holding the spool in the right end position and communication of the third duty solenoid valve 2018 with the front pressure chamber 26a of lock-up clutch 26 through a pressure line 2128 when holding the spool in the left end position.

The third output pressure line 2113 leads to the low reverse shift valve 2006 and delivers the line pressure to it. The low reverse shift valve 2006 directs the line pressure to the pressure chamber of reverse clutch 42 through a reverse clutch pressure line 2129 when holding the spool in the left end position. A pressure line 2130 branching off from the third output pressure line leads to the relay valve 2013 which in turn deliver the line pressure to the control port 2008a of 3-4 shift valve 2008 as pilot pressure when holding the spool in the right end position so as thereby to force the 3-4 shift valve to shift the spool to the right end position. A pressure line 2131 branching off from the third output pressure line 2113 leads to the bypass control valve 2007 which in turn delivers the line pressure to the control port 2006a of low reverse shift valve 2006 through the pressure line 2108 as pilot pressure, when holding the spool in the right end position, so as thereby to force the low reverse shift valve 2006 to shift the spool to the left end position. As well as the first to third output pressure lines 2111–2113, a pressure line 2124 extends from the manual shift valve 2002 and delivers the line pressure to the reducing port 2001b of regulator valve 2001 in each of the forward (D, S and L) ranges, Consequently, the line pressure is regulated to a level lower in these forward ranges than in the reverse (L) range.

The hydraulic pressure control circuit 2000 is further provided with a converter relief valve 2025 which in turn regulates the operating pressure introduced from the regulator valve 2001 through a pressure line 2142 to a fixed level and delivers it to the lock-up control valve 2009 through a pressure line 2143. The fixed level of operating pressure is directed selectively to the front pressure chamber 26a of lock-up clutch 26 through the pressure line 2128 when the lock-up control valve 2009 shifts the spool to the right end position and the rear pressure chamber 26b of lock-up clutch 26 through a pressure line 2144 when the lock-up control valve 2009 shifts the spool to the left end position.

The hydraulic pressure control circuit 2000 is substantially the same in structure as the previous embodiment of hydraulic pressure control circuit 1000 and consequently, operates in the same manner as the hydraulic pressure control circuit 1000 with the same effect.

It is to be understood that although the present invention has been described with respect to preferred embodiments thereof, various other embodiments and variants may occur to those skilled in the art, which are within the spirit and scope of the present invention, and such other embodiments and variants are intended to be covered by the following claims.

What is claimed:

1. A hydraulic pressure control system for an automatic transmission of a type having a plurality of friction coupling elements which are selectively operated with operating pressure for placing the automatic transmission having first and second gears for a low speed gear range and at least third and fourth gears for a high speed gear range into desired gears, a specific one of said friction coupling elements being differed in operated condition between said high speed gear range and said low speed gear range, said hydraulic pressure control system comprising:

operating pressure supply means for supplying operating pressure to said friction coupling elements;

a first switching valve capable of switching over between two operative conditions of transmission of said operating pressure to one of said friction coupling element in said high speed gear range;

a second switching valve capable of switching over between two operative conditions of transmission of said operating pressure to another one of said friction coupling elements in said low speed gear range;

solenoid valve means for providing control pressure with which each of said first switching valve and said second switching valve is switched over from one of said operative conditions to another of said operative conditions; and pressure connecting means for selectively connecting and disconnecting alternatively transmission of said control pressure to said first switching valve and said second switching valve; respectively-according to and during a rise of said operating pressure to said specific friction coupling element.

2. A hydraulic pressure control system as defined in claim 1, wherein said specific friction coupling element comprises a 3-4 clutch, at least which is locked in a gear of said high speed gear range and is unlocked in a gear of said low speed gear range, said one friction coupling element comprises a 2-4 brake of a type having a brake apply pressure chamber and a brake release pressure chamber, at least which is locked in said second gear and said fourth gear when said operating pressure is supplied to said brake apply pressure chamber only, and unlocked in said first gear and said third gear when said operating pressure is released from both said brake apply pressure chamber and said brake release pressure chamber, when said operating pressure is supplied to both said brake apply pressure chamber and said brake release pressure chamber, and when said operating pressure is supplied to said brake release pressure chamber only, and said another friction coupling element comprises a low-reverse brake, which is locked in at least said first gear in which engine brake is available.

3. A hydraulic pressure control system as defined in claim 2, wherein said first switching valve connects transmission of said operating pressure to said brake release pressure chamber in one of said operative conditions of said first switching valve and disconnects transmission of said operating pressure to said brake release pressure chamber in another of said operative conditions of said first switching valve, and said second switching valve connects transmission of said operating pressure to said low-reverse brake in one of said operative conditions of said second switching valve and disconnects transmission of said operating pressure to said low-reverse brake in another of said operative conditions of said second switching valve.

4. A control system as defined in claim 1, wherein said specific friction coupling element comprises a 3-4 clutch, at least which is locked in a gear of said high speed gear range and is unlocked in a gear of said low speed gear range, said one friction coupling element comprises a lock-up clutch for mechanically coupling a torque converter incorporated in said automatic transmission together, and said another friction coupling element comprises a low-reverse brake locked in at least said first gear in which engine brake is available.

5. A hydraulic pressure control system as defined in claim 4, wherein said first switching valve connects transmission of said operating pressure to said lock-up clutch in one of said operative conditions of said first switching valve and disconnects transmission of said operating pressure to said lock-up clutch in another of said operative conditions of said first switching valve, and said second switching valve connects transmission of said operating pressure to said low-reverse brake in one of said operative conditions of said second switching valve and disconnects transmission of said operating pressure to said low-reverse brake in another of said operative conditions of said second switching valve.

6. A hydraulic pressure control system for an automatic transmission of a type having a plurality of friction coupling elements which are selectively locked and unlocked with hydraulic operating pressure for changing transmission paths through which driving power from a power source is transmitted in said automatic transmission, said friction coupling elements including at least a first friction coupling element, a second friction coupling element which is controlled to lock while said first friction coupling element is locked, and a third friction coupling element which is controlled to lock while said first friction coupling element is unlocked, said hydraulic pressure control system comprising:

first operating pressure supply means for supplying said operating pressure to said first friction coupling element;

second operating pressure supply means for supplying said operating pressure to said second friction coupling element;

third operating pressure supply means for supplying said operating pressure to said third friction coupling element;

first switching means for switching over between two operative conditions of transmission of said operating pressure to said second friction coupling element;

second switching means for switching over between two operative conditions of transmission of said operating pressure to said third friction coupling element;

control pressure providing means for providing control pressure with which each of said first switching means and said second switching means is switched over to an operative conditions where each said switching means connects transmission of said operating pressure to said respective friction coupling elements to another operative condition where each said switching means disconnects transmission of said operating pressure to said respective friction coupling elements; and pressure connecting means for selectively connecting transmission of said control pressure to said first switching means and said second switching means according to and during a rise of said operating pressure to said first friction coupling element.

7. A hydraulic pressure control system as defined in claim 6, wherein said control pressure providing means comprises pressure developing means for developing a specified level of source pressure as said control pressure and a solenoid valve for connecting and disconnecting transmission of said control pressure to said pressure connecting means.

8. A hydraulic pressure control system as defined in claim 6, wherein said pressure connecting means comprises a shift valve having a spool shiftable between two operative positions according to which said pressure connecting means selectively connects and disconnects transmission of said control pressure to said first switching means and said second switching means, and a return spring for forcing said spool to one of said operative positions, said spool being applied with said operating pressure supplied to said first friction coupling means so as thereby to shift to another of said operative positions against said return spring.

9. A hydraulic pressure control system as defined in claim 6, wherein each of said first switching means and said second switching means comprises a shift valve having a spool shiftable between two operative positions according to which said operative conditions are provided, respectively, and a return spring for forcing said spool to one of said operative positions, said spool being applied with said control pressure so as thereby to shift to another of said operative positions against said return spring.

10. A hydraulic pressure control system as defined in claim 6, wherein said second switching means comprises sub-control pressure providing means for providing sub-control pressure, sub-switching means for transmission of said sub-control pressure while connection of transmission of said control pressure is made by said pressure connecting means to said second switching means, and switching means for switching over transmission of said operating pressure between connection to and disconnection from said third friction coupling element.

11. A hydraulic pressure control system as defined in claim 10, wherein said sub-control pressure developing means develops a specified level of source pressure as said sub-control pressure and a solenoid valve for connecting and disconnecting transmission of said sub-control pressure to said switching means.

12. A hydraulic pressure control system as defined in claim 11, wherein said sub-control pressure switching means comprises a solenoid valve shiftable between two operative positions according to said control pressure, said sub-control pressure being delivered in one of said operative positions and being withdrawn in another of said operative positions.

13. A hydraulic pressure control system as defined in claim 6, wherein said second friction coupling element is operated in at least a high speed gear range, and said third friction coupling element is operated in at least a low speed gear range.

14. A hydraulic pressure control system as defined in claim 13, wherein said first friction coupling element comprises a3-4 clutch, at least which is locked in third and fourth gears for said high speed gear range and unlocked in first and second gears for said low speed gear range, said second friction coupling element comprises a 2-4 brake, at least which is locked in said second gear and said fourth gear and unlocked in said first gear and said third gear, and said third friction coupling element comprises a low-reverse brake, which is locked in at least said first gear in which engine brake is available.

15. A hydraulic pressure control system as defined in claim 14, wherein each of said first switching means and said second switching means comprises a shift valve having a spool shiftable between two operative positions according to which said operative conditions are provided, respectively, and a return spring for forcing said spool to one of said operative positions, said spool being applied with said control pressure so as thereby to shift to another of said operative positions against said return spring.

16. A hydraulic pressure control system as defined in claim 13, wherein said first friction coupling element comprises a3-4 clutch, at least which is locked in third and fourth gears for said high speed gear range and is unlocked in first and second gears for said low speed gear range, said second friction coupling element comprises a lock-up clutch for mechanically locking a torque converter incorporated in said automatic transmission, and said third friction coupling element comprises a low-reverse brake locking in at least said first gear in which engine brake is available.

17. A hydraulic pressure control system as defined in claim 16, wherein each of said first switching means and said second switching means comprises a shift valve having a spool shiftable between two operative positions according to which said operative conditions are provided, respectively, and a return spring for forcing said spool to one of said operative positions, said spool being applied with said control pressure so as thereby to shift to another of said operative positions against said return spring.

18. A hydraulic pressure control system as defined in claim 6, further comprising sub-control pressure providing means for providing sub-control pressure, sub-switching means comprising a shift valve having a spool shiftable between two operative positions according to which transmission of said sub-control pressure is connected and disconnected, respectively, and a return spring for forcing said spool to one of said operative positions, said spool being applied with said control pressure supplied to said first friction coupling element so as thereby to shift to another of said operative positions against said return spring, wherein said pressure connecting means comprises a valve having a spool on which said sub-control pressure from said sub-switching means is exerted in one direction and a return spring for forcing said spool to shift to in another direction against said sub-control pressure.

19. A hydraulic pressure control system as defined in claim 18, wherein said first friction coupling element comprises a3-4 clutch, at least which is locked in third and fourth gears for said high speed gear range and is unlocked in first and second gears for said low speed gear range, said second friction coupling element comprises a lock-up clutch for mechanically locking a torque converter incorporated in said automatic transmission, said third friction coupling element comprises a low-reverse brake locking in at least said first gear in which engine brake is available, wherein each of said first switching means and said second switching means comprises a shift valve having a spool shiftable between two operative positions according to which said operative conditions are provided, respectively, and a return spring for forcing said spool to one of said operative positions, said spool being applied with said control pressure so as thereby to shift to another of said operative positions against said return spring, said sub-control pressure switching means switches said operative position to one where transmission of said sub-control pressure is connected while transmission of said operating pressure is disconnected from said 3-4 clutch and to another where transmission of said sub-control pressure is disconnected while transmission of said operating pressure is connected to said3-4 clutch, and further said pressure connecting means connects transmission of said control pressure to said second switching means so as to cause said second switching means to switch over to said one of said operative positions where said second switching means connects transmission of said operating pressure supplied by said third operating pressure supply means to said low-reverse brake while said sub-control pressure switching means takes said one of said operative positions and connects transmission of said control pressure to said first switching means so as to cause said first switching means to switch over to said one of said operative conditions where said second switching means connects transmission of said operating pressure supplied by said second operating pressure supply means to said lock-up clutch while said sub-control pressure switching means takes said another of said operative positions.

20. A hydraulic pressure control system as defined in claim 19, wherein said sub-control pressure providing means is interrupted to provide said sub-control pressure in said second gear where said sub-control pressure switching means switches said sub-control pressure over to delivery while transmission of said operating pressure is disconnected from said 3-4 clutch.

21. A hydraulic pressure control system as defined in claim 6, wherein each of said first to third operating pressure supply means comprises a duty solenoid valve.

22. A hydraulic pressure control system for an automatic transmission of a type having a plurality of friction coupling elements which are selectively locked and unlocked with hydraulic operating pressure for changing power transmission paths of the automatic transmission through which source power is transmitted in said automatic transmission, said friction coupling elements including at least a first friction coupling element, a second friction coupling element which is controlled to lock while said first friction coupling element is locked, a third friction coupling element which is controlled to lock while said first friction coupling element is unlocked, and a fourth friction coupling means which is controlled to lock while said first friction coupling element is locked and said third friction coupling element is unlocked, said hydraulic pressure control system comprising:

first operating pressure supply means for supplying said operating pressure to said first friction coupling element;

second operating pressure supply means for supplying said operating pressure to said second friction coupling element;

third operating pressure supply means for supplying said operating pressure to said third friction coupling element;

fourth operating pressure supply means for supplying said operating pressure to said third friction coupling element;

first control pressure providing means for providing first control pressure to allow one of said second friction coupling element, said third friction coupling element and said fourth friction coupling element to operate;

second control pressure providing means for providing second control pressure to control one of said third friction coupling element and said fourth friction coupling element to operate;

first switching means for switching over between two operative conditions of transmission of said operating pressure to said second friction coupling element according to said first control pressure;

second switching means for switching over between two operative conditions of transmission of said operating pressure to said third friction coupling element according to said second control pressure;

third switching means for switching over between two operative conditions of transmission of said operating pressure to said fourth friction coupling element according to said second control pressure;

first control pressure connecting means for selectively connecting transmission of said second control pressure to said second and said third switching means; and second control pressure connecting means for selectively connecting transmission of said first control pressure to said first control pressure connecting means and said first switching means according to said operating pressure supplied to said first friction coupling element;

said first control pressure connecting means selectively connecting transmission of said second control pressure to said second and said third switching means when said second control pressure connecting means connects transmission of said first control pressure to said first control pressure connecting means.

23. A hydraulic pressure control system as defined in claim 22, wherein said first friction coupling element comprises a 3-4 clutch, at least which is locked in a gear of said high speed gear range and is unlocked in a gear of said low speed gear range, said second friction coupling element comprises a 2-4 brake, which is at least which is locked in said second gear and said fourth gear and unlocked in said first gear and said third gear, said third friction coupling element comprises a low-reverse brake, which is locked in at least said first gear in which engine brake is available, said fourth friction coupling element comprises a lock-up clutch for mechanically locking a torque converter incorporated in said automatic transmission, and each of said first to third switching means comprises a shift valve having a spool shiftable between two operative positions according to which said operative conditions of operating pressure transmission are selectively provided, and a return spring for forcing said spool to one of said operative positions, said spool being applied with said control pressure so as thereby to shift to another of said operative positions against said return spring.

24. A hydraulic pressure control system as defined in claim 23, wherein said second control pressure connecting means connects transmission of said first control pressure to said first control pressure connecting means while said first operating pressure supply means does not supply said operating pressure to said 3-4 clutch and to said first switching means while said first operating pressure supply means supplies said operating pressure to said 3-4 clutch, and said first control pressure connecting means connects transmission of said second control pressure to said second switching means so as to cause said second switching means to provides one of said operative conditions where transmission of said operating pressure is connected to said low-reverse brake when said second control pressure connecting means connects transmission of said first control pressure to said first control pressure connecting means and to said third switching means so as to cause said third switching means to provides one of said operative conditions where transmission of said operating pressure is connected to said lock-up clutch when said second control pressure connecting means disconnects transmission of said first control pressure to said first control pressure connecting means.

25. A hydraulic pressure control system as defined in claim 23, wherein said first control pressure providing means is interrupted to provide said first control pressure in said second gear where said second control pressure connecting means connects transmission of said first control pressure while transmission of said operating pressure is disconnected from said 3-4 clutch.

* * * * *